United States Patent
Skoff et al.

(10) Patent No.: US 12,366,153 B2
(45) Date of Patent: Jul. 22, 2025

(54) WELL CONSTRUCTION EQUIPMENT FRAMEWORK

(71) Applicant: Schlumberger Technology Corporation, Sugar Land, TX (US)

(72) Inventors: Gregory Michael Skoff, Cambridge (GB); Crispin Chatar, Menlo Park, CA (US); Velizar Vesselinov, Sugar Land, TX (US); Cheolkyun Jeong, Sugar Land, TX (US); Fatma Mahfoudh, Cambridge (GB); Sergey Makarychev-Mikhailov, Cambridge (GB); Oleh Petryshak, Poltava (UA); Yezid Arevalo Romero, Katy, TX (US); Yingwei Yu, Katy, TX (US); Georgia Kouyialis, New York, NY (US)

(73) Assignee: Schlumberger Technology Corporation, Sugar Land, TX (US)

( * ) Notice: Subject to any disclaimer, the term of this patent is extended or adjusted under 35 U.S.C. 154(b) by 107 days.

(21) Appl. No.: 17/811,931

(22) Filed: Jul. 12, 2022

(65) Prior Publication Data
US 2023/0017966 A1    Jan. 19, 2023

Related U.S. Application Data

(60) Provisional application No. 63/220,882, filed on Jul. 12, 2021.

(51) Int. Cl.
*E21B 44/00* (2006.01)
*E21B 7/04* (2006.01)
(Continued)

(52) U.S. Cl.
CPC ............... *E21B 44/00* (2013.01); *E21B 7/04* (2013.01); *G06F 16/2468* (2019.01);
(Continued)

(58) Field of Classification Search
CPC .... E21B 2200/20; E21B 2200/22; E21B 7/04; E21B 44/00; G06F 16/245;
(Continued)

(56) References Cited

U.S. PATENT DOCUMENTS 6,424,919 B1 * 7/2002 Moran .................... E21B 44/00
702/6
11,091,989 B1 * 8/2021 De Oliveira .......... E21B 49/005
(Continued)

FOREIGN PATENT DOCUMENTS

WO       2014062174 A1    4/2014

OTHER PUBLICATIONS

Search Report and Written Opinion of International Patent Application No. PCT/US2022/036817 dated Nov. 3, 2022, 13 pages.
(Continued)

*Primary Examiner* — Robert W Beausoliel, Jr.
*Assistant Examiner* — Cheryl M Shechtman
(74) *Attorney, Agent, or Firm* — Jeffrey D. Frantz

(57) ABSTRACT

A method can include receiving input for a drilling operation that utilizes a bottom hole assembly and drilling fluid; generating a set of offset drilling operations using historical feature data, where the historical feature data are processed by computing feature distances; performing an assessment of the offset drilling operations as characterized by at least feature distance-based similarity between the drilling operation and the offset drilling operations; and outputting at least one recommendation for selection of one or more of a component of the bottom hole assembly and the drilling fluid based on the assessment.

19 Claims, 40 Drawing Sheets

(51) Int. Cl.
*G06F 16/2458* (2019.01)
*G06F 16/28* (2019.01)

(52) U.S. Cl.
CPC ........ *G06F 16/285* (2019.01); *E21B 2200/20* (2020.05); *E21B 2200/22* (2020.05)

(58) Field of Classification Search
CPC .............. G06F 16/2468; G06F 16/248; G06F 16/285; G06F 3/0484; G06F 17/16; G06F 18/24; G06F 30/27; G06F 16/90335
See application file for complete search history.

(56) References Cited

U.S. PATENT DOCUMENTS

| | | | |
|---|---|---|---|
| 2001/0042642 A1 | 11/2001 | King | |
| 2005/0236184 A1 | 10/2005 | Veeningen et al. | |
| 2007/0021857 A1 | 1/2007 | Huang | |
| 2008/0040084 A1* | 2/2008 | Huang | G06F 30/20 703/7 |
| 2014/0121972 A1* | 5/2014 | Wessling | E21B 41/00 702/6 |
| 2018/0241764 A1* | 8/2018 | Nadolski | H04L 63/20 |
| 2019/0003297 A1* | 1/2019 | Brannigan | G06F 18/22 |
| 2019/0114538 A1* | 4/2019 | Ng | G06N 3/08 |
| 2019/0147125 A1 | 5/2019 | Yu | |
| 2019/0353012 A1* | 11/2019 | Al Gharbi | E21B 44/06 |
| 2020/0032638 A1 | 1/2020 | Ezzeddine | |
| 2021/0293139 A1* | 9/2021 | Kharaa | G01V 5/10 |
| 2022/0018221 A1* | 1/2022 | Zhang | E21B 43/00 |
| 2022/0025759 A1* | 1/2022 | Magana-Mora | E21B 19/10 |
| 2022/0154570 A1* | 5/2022 | Mehta | E21B 45/00 |

OTHER PUBLICATIONS

Yan et al., "Similarity evaluation of stratum anti-drilling ability and a new method of drill bit selection", Petroleum Exploration and Development, Apr. 2021, vol. 48, issue 2, pp. 450-459, pp. 450-458 and figures 1-4.

Verma, V. K. et al., "Efficient Feature Transformations for Discriminative and Generative Continual Learning", arXiv:2013.13558v1, Retrieved from the Internet at: [URL:https://www.researchgate.net/publication/350397832_Efficient_Feature_Transformations_for_Discriminative_and_Generative_Continual_Learning], Mar. 25, 2021, 14 pages.

Skoff, G. et al., "Machine Learning-Based Drilling System Recommender: Towards Optimal BHA and Fluid Technology Selection", IADC/SPE-212559-MS presented at the SPE/IADS International Drilling Conference and Exhibition, Stavanger, Norway, 2023, 16 pages.

Hemker, K. et al., "GAMMA FACET: A New Approach for Universal Explanations of Machine Learning Models", Retrieved from the Internet at [URL:https://medium.com/bcggamma/gamma-facet-a-new-approach-for-universal-explanations-of-machine-learning-models-b566877e7812], Jan. 12, 2021, 9 pages.

* cited by examiner

Fig. 9

GUI 1000

Bit Parameters

Bit Diameter (in)
8.50

Blade Count
6

Cutter Diameter (mm)
16

Cutter Technology Type
AxeBlade ▽

Body Material Type
Matrix ▽

Scoring Weights

P50Avg ROP (ft/hr)
0.5

P50 Drilling Distance (ft)
0.5

Sum Drilling Distance (ft)
0.5

Scoring Weights

P50ROP Improvement (%)

P50Footage Improvement (%)

Total Footage (ft)

Run Success Rate (%)

Severe Dull Rate (%)

DRILLING FLUID RECOMMENDATION SUMMERY TABLE

RANKED PERFORMANCE FACTORS, SEE WARNING UNDER HELP BUTTON.

| | FLUID FAMILY | PREVALENCE | SIMILARITY | DRILLING ROP | REMEDIAL TIME | FLUID TREATMENTS | FLUID COMPLEXITY | ADDITIVES COST | AVERAGE RANK |
|---|---|---|---|---|---|---|---|---|---|
| 8 | A | 1 | 6 | 8 | 3 | 9 | 7 | 7 | 6 |
| 0 | B | 2 | 2 | 6 | 4 | 3 | 2 | 3 | 3 |
| 1 | C | 2 | 3 | 5 | 5 | 5 | 2 | 1 | 3 |
| 10 | D | 4 | 9 | 11 | 6 | 8 | 6 | 10 | 8 |
| 9 | E | 5 | 7 | 7 | 8 | 6 | 8 | 4 | 6 |
| 2 | F | 6 | 9 | 2 | 11 | 4 | 6 | 8 | 7 |
| 6 | G | 7 | 6 | 3 | 9 | 1 | 4 | 6 | 5 |
| 4 | H | 8 | 9 | 1 | 2 | 11 | 11 | 11 | 9 |
| 3 | I | 10 | 1 | 9 | 2 | 2 | 1 | 2 | 3 |
| 5 | J | 10 | 11 | 4 | 7 | 7 | 9 | 5 | 8 |
| 7 | K | 10 | 4 | 10 | 10 | 10 | 10 | 9 | 9 |

[DOWNLOAD RECOMMENDATION SUMMARY TABLE]

Fig. 33

WELL CONSTRUCTION EQUIPMENT FRAMEWORK

RELATED APPLICATIONS

This application claims priority to and the benefit of a US Provisional Application having Ser. No. 63/220,882, filed 12 Jul. 2021, which is incorporated by reference herein.

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore (e.g., a borehole) may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning and/or development can occur over one or more phases, which can include an exploration phase that aims to identify and assess an environment (e.g., a prospect, a play, etc.), which may include drilling of one or more bores (e.g., one or more exploratory wells, etc.). For production of hydrocarbons from a reservoir, one or more wells can be drilled and completed. In various instances, planning or re-planning may occur as one or more wells are being drilled, completed, etc.

SUMMARY

A method can include receiving input for a drilling operation that utilizes a bottom hole assembly and drilling fluid; generating a set of offset drilling operations using historical feature data, where the historical feature data are processed by computing feature distances; performing an assessment of the offset drilling operations as characterized by at least feature distance-based similarity between the drilling operation and the offset drilling operations; and outputting at least one recommendation for selection of one or more of a component of the bottom hole assembly and the drilling fluid based on the assessment. A system can include a processor; memory accessible to the processor; processor-executable instructions stored in the memory and executable by the processor to instruct the system to: receive input for a drilling operation that utilizes a bottom hole assembly and drilling fluid; generate a set of offset drilling operations using historical feature data, where the historical feature data are processed by computing feature distances; perform an assessment of the offset drilling operations as characterized by at least feature distance-based similarity between the drilling operation and the offset drilling operations; and output at least one recommendation for selection of one or more of a component of the bottom hole assembly and the drilling fluid based on the assessment. One or more computer-readable storage media can include computer-executable instructions executable to instruct a computing system to: receive input for a drilling operation that utilizes a bottom hole assembly and drilling fluid; generate a set of offset drilling operations using historical feature data, where the historical feature data are processed by computing feature distances; perform an assessment of the offset drilling operations as characterized by at least feature distance-based similarity between the drilling operation and the offset drilling operations; and output at least one recommendation for selection of one or more of a component of the bottom hole assembly and the drilling fluid based on the assessment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 9 illustrates an example of a graphical user interface;

FIG. 10 illustrates an example of a graphical user interface;

FIG. 12 illustrates an example of a graphical user interface;

FIG. 18 illustrates an example of a graphical user interface;

FIG. 29 illustrates an example of a graphical user interface and an example of a workflow;

FIG. 33 illustrates an example of a graphical user interface;

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
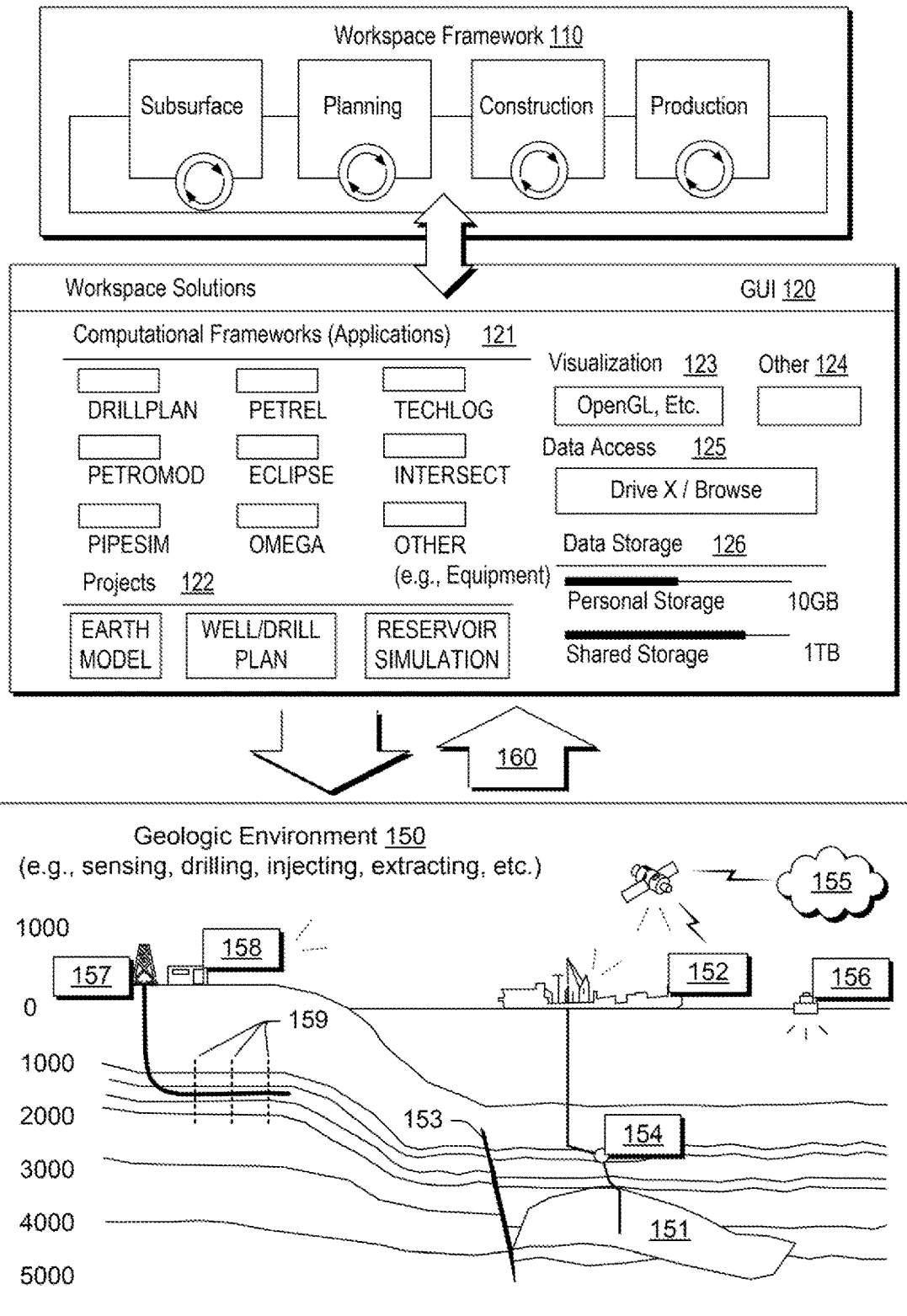
FIG. 1 illustrates an example of a system and examples of equipment in a geologic environment.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, INTERSECT, PIPESIM and OMEGA frameworks (Schlumberger Limited, Houston, Texas). As to another type of framework, consider, for example, an equipment framework (EF), which may be operable in combination with one or more other frameworks to make determinations as to equipment (e.g., for use in one or more field operations, etc.). In such an example, an EF may provide feedback such that another framework can operate on output of the EF, for example, to revise a plan, revise a control scheme, etc.

The DRILLPLAN framework provides for digital well construction planning and includes features for automation of repetitive tasks and validation workflows, enabling improved quality drilling programs (e.g., digital drilling plans, etc.) to be produced quickly with assured coherency. As an example, where an EF can generate recommendations for drilling equipment, the EF may be operatively coupled to the DRILLPLAN framework. In such an example, interactions may exist, which may be automatic. For example, consider an EF that can dynamically generate recommendations responsive to progression of a plan being generated by a framework such as the DRILLPLAN framework.

The PETREL framework can be part of the DELFI cognitive E&P environment (Schlumberger Limited, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The OMEGA framework includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density. The OMEGA framework also includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools. Various features can be included for processing various types of data such as, for example, one or more of: land, marine, and transition zone data; time and depth data; 2D, 3D, and 4D surveys; isotropic and anisotropic (TTI and VTI) velocity fields; and multicomponent data.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace. As an example, the GUI 120 of FIG. 1 may be a GUI of the DELFI framework.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1 D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

As an example, a framework that can simulate drilling, drilling equipment behaviors, etc., may be utilized. For example, consider the IDEAS framework, which utilizes the finite element method (FEM) to model various physical phenomena, which can include reaction force at a bit (e.g., using a static, physics-based model). The IDEAS framework can include an IDEAS2 simulator wrapper, an IDEAS2 configuration file and an IDEAS2 DLL (dynamic link library). A FEM simulation can utilize a grid or grids that discretize one or more physical domains. Equations such as, for example, continuity equations, are utilized to represent physical phenomena. The IDEAS framework provides for numerical experimentation that approximates real-physical experimentation. In various instances, a framework can be a simulator that performs simulations to generation simulation results that approximate results that have occurred, are occurring or may occur in the real-world. In the context of drilling, such a framework can provide for execution of scenarios that can be part of a workflow or workflows as to planning, control, etc. As to control, a scenario may be based on data acquired by one or more sensors during one or more well construction operations such as, for example, directional drilling. In such an approach, determinations can be made using scenario result(s) that can directly and/or indirectly control one or more aspects of directional drilling. For example, consider control of sliding and/or rotating as modes of performing directional drilling.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

Figure 2:
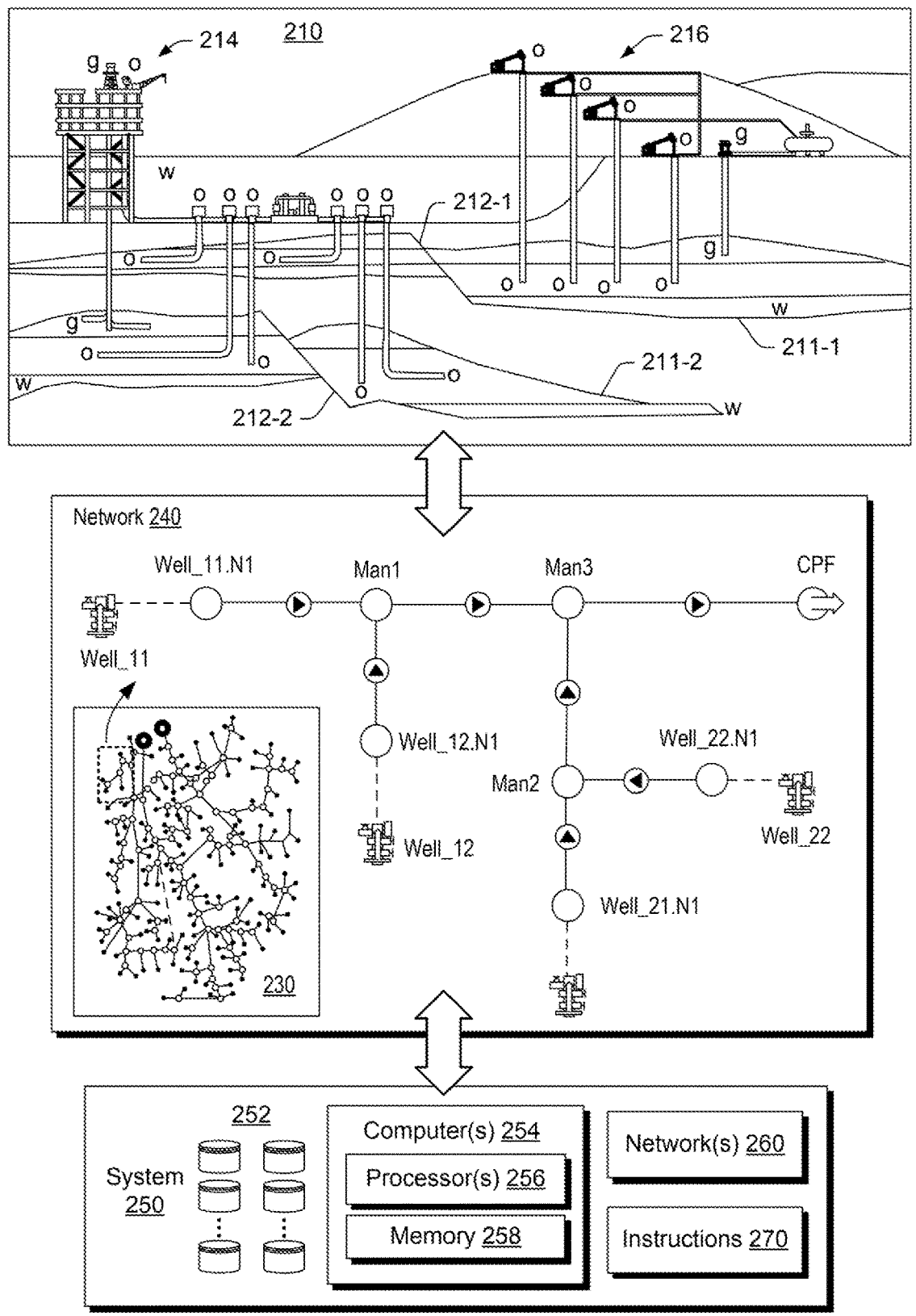
FIG. 2 illustrates an example of a system and examples of equipment in a geologic environment.

FIG. 2 shows an example of a geologic environment 210 that includes reservoirs 211-1 and 211-2, which may be faulted by faults 212-1 and 212-2, an example of a network of equipment 230, an enlarged view of a portion of the network of equipment 230, referred to as network 240, and an example of a system 250. FIG. 2 shows some examples of offshore equipment 214 for oil and gas operations related to the reservoir 211-2 and onshore equipment 216 for oil and gas operations related to the reservoir 211-1.

In the example of FIG. 2, the various equipment 214 and 216 can include drilling equipment, wireline equipment, production equipment, etc. For example, consider the equipment 214 as including a drilling rig that can drill into a formation to reach a reservoir target where a well can be completed for production of hydrocarbons. In such an example, one or more features of the system 100 of FIG. 1 may be utilized. For example, consider utilizing the DRILLPLAN framework to plan, execute, etc., one or more drilling operations.

In FIG. 2, the network 240 can be an example of a relatively small production system network. As shown, the network 240 forms somewhat of a tree like structure where flowlines represent branches (e.g., segments) and junctions represent nodes. As shown in FIG. 2, the network 240 provides for transportation of oil and gas fluids from well locations along flowlines interconnected at junctions with final delivery at a central processing facility.

In the example of FIG. 2, various portions of the network 240 may include conduit. For example, consider a perspective view of a geologic environment that includes two conduits which may be a conduit to Man1 and a conduit to Man3 in the network 240.

As shown in FIG. 2, the example system 250 includes one or more information storage devices 252, one or more computers 254, one or more networks 260 and instructions 270 (e.g., organized as one or more sets of instructions). As to the one or more computers 254, each computer may include one or more processors (e.g., or processing cores) 256 and memory 258 for storing the instructions 270 (e.g., one or more sets of instructions), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, information that may be stored in one or more of the storage devices 252 may include information about equipment, location of equipment, orientation of equipment, fluid characteristics, etc.

As an example, the instructions 270 can include instructions (e.g., stored in the memory 258) executable by at least one of the one or more processors 256 to instruct the system 250 to perform various actions. As an example, the system 250 may be configured such that the instructions 270 provide for establishing a framework, for example, that can perform modeling, simulation, etc. As an example, one or more methods, techniques, etc. may be performed using one or more sets of instructions, which may be, for example, the instructions 270 of FIG. 2.

Various equipment that may be at a site can include rig equipment. For example, consider rig equipment that includes a platform, a derrick, a crown block, a line, a traveling block assembly, drawworks and a landing (e.g., a monkeyboard). As an example, the line may be controlled at least in part via the drawworks such that the traveling block assembly travels in a vertical direction with respect to the platform. For example, by drawing the line in, the drawworks may cause the line to run through the crown block and lift the traveling block assembly skyward away from the platform; whereas, by allowing the line out, the drawworks may cause the line to run through the crown block and lower the traveling block assembly toward the platform. Where the traveling block assembly carries pipe (e.g., casing, etc.), tracking of movement of the traveling block may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe located at or near the center of a derrick or a mast and to throw a line around the pipe and pull it back into its storage location (e.g., fingerboards), for example, until it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced. As an example, a trip that pulls equipment out of a borehole may be referred to as pulling out of hole (POOH) and a trip that runs equipment into a borehole may be referred to as running in hole (RIH).

Figure 3:
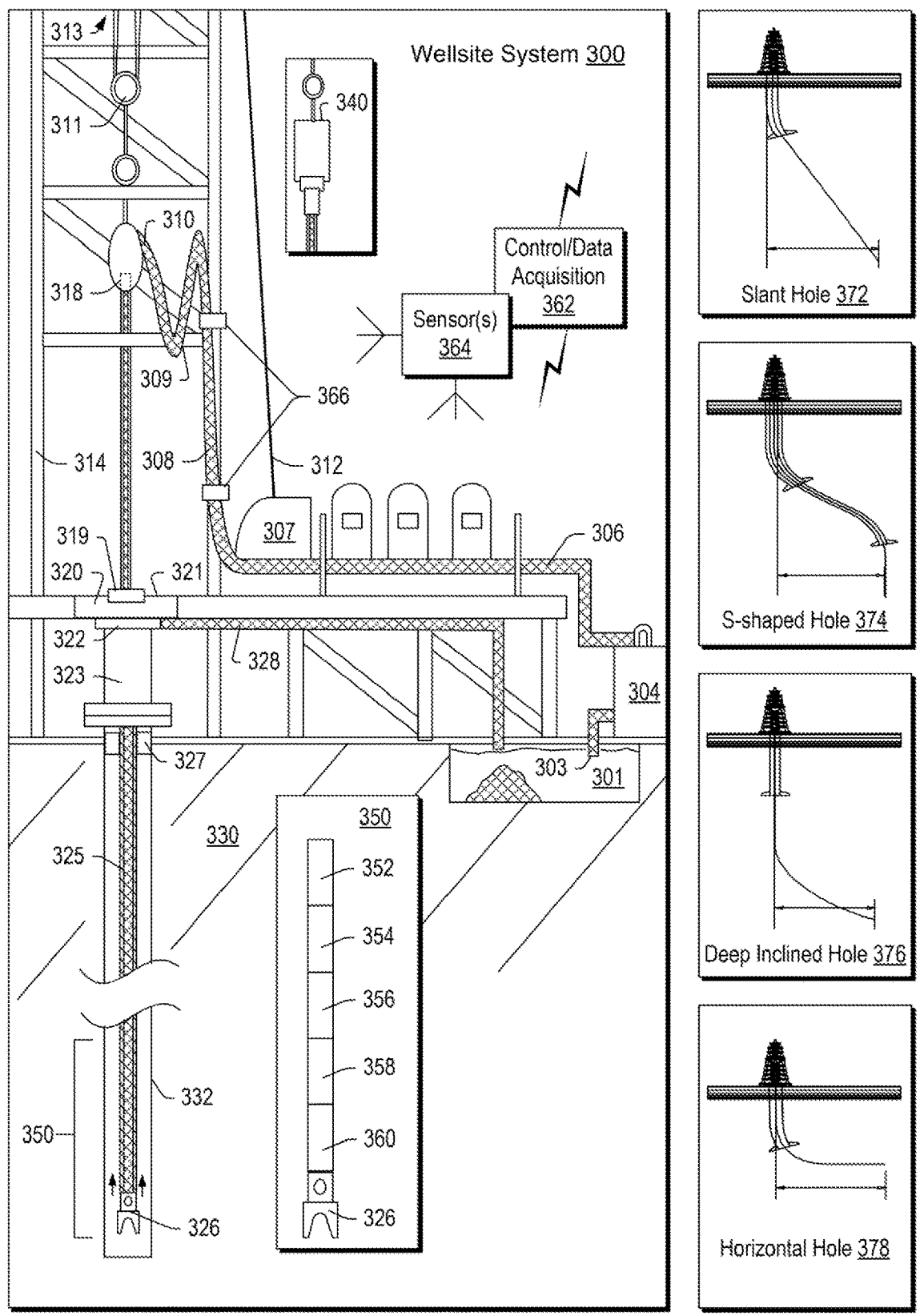
FIG. 3 illustrates examples of equipment and examples of hole types.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventors (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use one or more directional drilling techniques, equipment, etc.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the traveling block 311 and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or the top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud (e.g., and cuttings) may be returned to the mud tank 301, for example, for recirculation (e.g., with processing to remove cuttings, etc.).

The mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drillstring 325 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drillstring 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measurement-while-drilling (MWD) module 356, an optional module 358, a rotary-steerable system (RSS) and/or motor 360, and the drill bit 326. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 354 may be housed in a suitable type of drill collar and can contain one or a plurality of selected types of logging tools. It will also be understood that more than one LWD and/or MWD module can be employed, for example, as represented at by the module MWD 356 of the drillstring assembly 350. Where the position of an LWD module is mentioned, as an example, it may refer to a module at the position of the LWD module 354, the MWD module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD module 356 may include equipment for generating electrical power, for example, to power various components of the drillstring 325. As an example, the MWD tool 354 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 300. As an example, a sensor or sensor may be at an offset wellsite where the wellsite system 300 and the offset wellsite are in a common field (e.g., oil and/or gas field).

As an example, one or more of the sensors 364 can be provided for tracking pipe, tracking movement of at least a portion of a drillstring, etc.

As an example, the system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p)

applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 4:
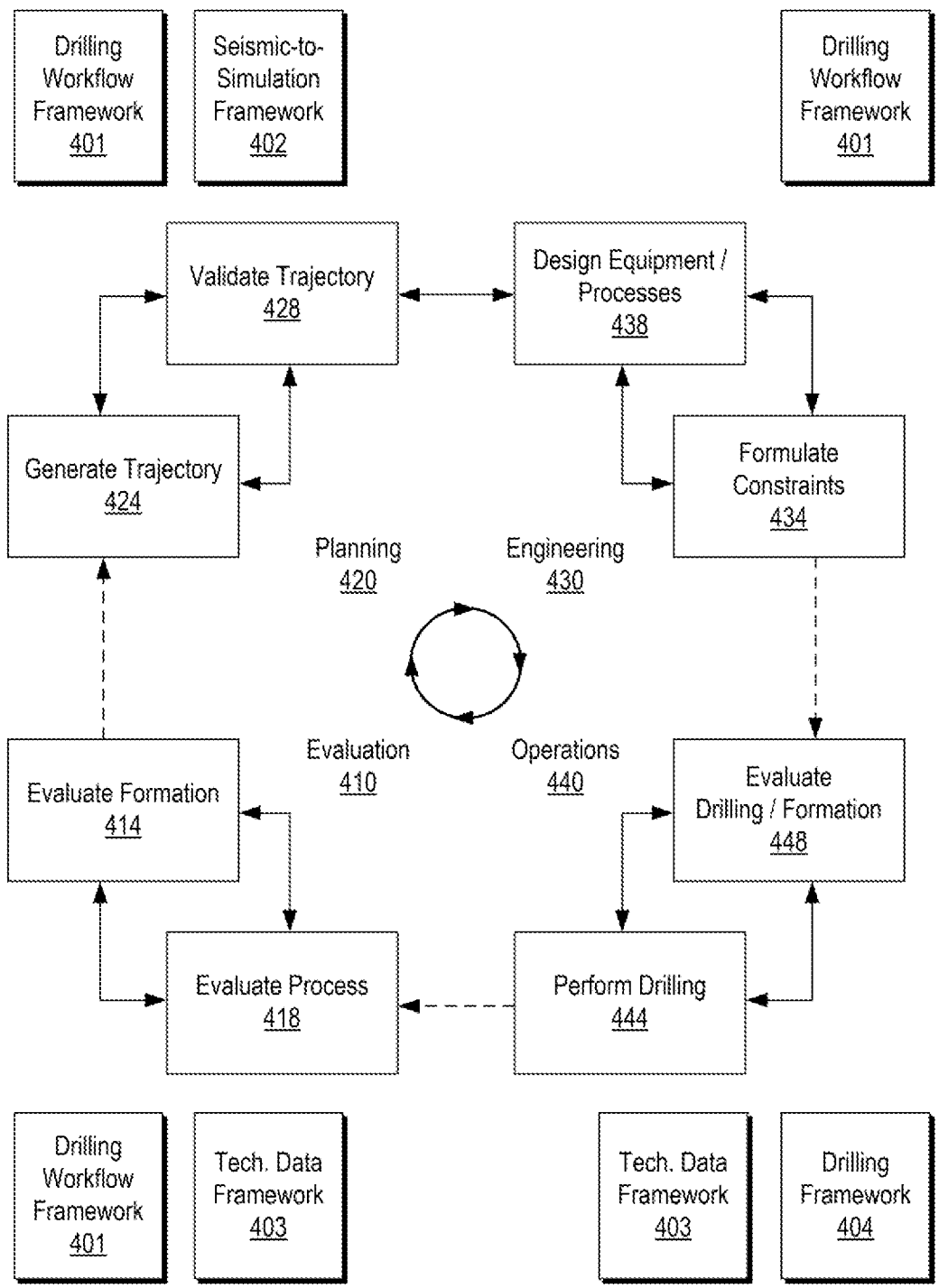
FIG. 4 illustrates an example of a system.

FIG. 4 shows an example of a system 400 that includes various equipment for evaluation 410, planning 420, engineering 430 and operations 440. For example, a drilling workflow framework 401, a seismic-to-simulation framework 402, a technical data framework 403 and a drilling framework 404 may be implemented to perform one or more processes such as a evaluating a formation 414, evaluating a process 418, generating a trajectory 424, validating a trajectory 428, formulating constraints 434, designing equipment and/or processes based at least in part on constraints 438, performing drilling 444 and evaluating drilling and/or formation 448.

In the example of FIG. 4, the seismic-to-simulation framework 402 can be, for example, the PETREL framework (Schlumberger, Houston, Texas) and the technical data framework 403 can be, for example, the TECHLOG framework (Schlumberger, Houston, Texas).

As an example, the system 400 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL framework, for example, that operates on seismic data, seismic attribute(s), etc.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

As an example, various aspects of a workflow may be completed automatically, may be partially automated, or may be completed manually, as by a human user interfacing with a software application that executes using hardware (e.g., local and/or remote). As an example, a workflow may be cyclic, and may include, as an example, four stages such as, for example, an evaluation stage (see, e.g., the evaluation equipment 410), a planning stage (see, e.g., the planning equipment 420), an engineering stage (see, e.g., the engineering equipment 430) and an execution stage (see, e.g., the operations equipment 440). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 414). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 424), which may involve execution of one or more G&G software packages. Examples of such software packages include the PETREL framework. As an example, a G&G service provider may determine a well trajectory or a section thereof, based on, for example, one or more model(s) provided by a formation evaluation (e.g., per the evaluation block 414), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 428). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO framework tools (Schlumberger, Houston, Texas), and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 434). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 444 and 448). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 418). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc., basis.

Well planning can include determining a path of a well (e.g., a trajectory) that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 5:
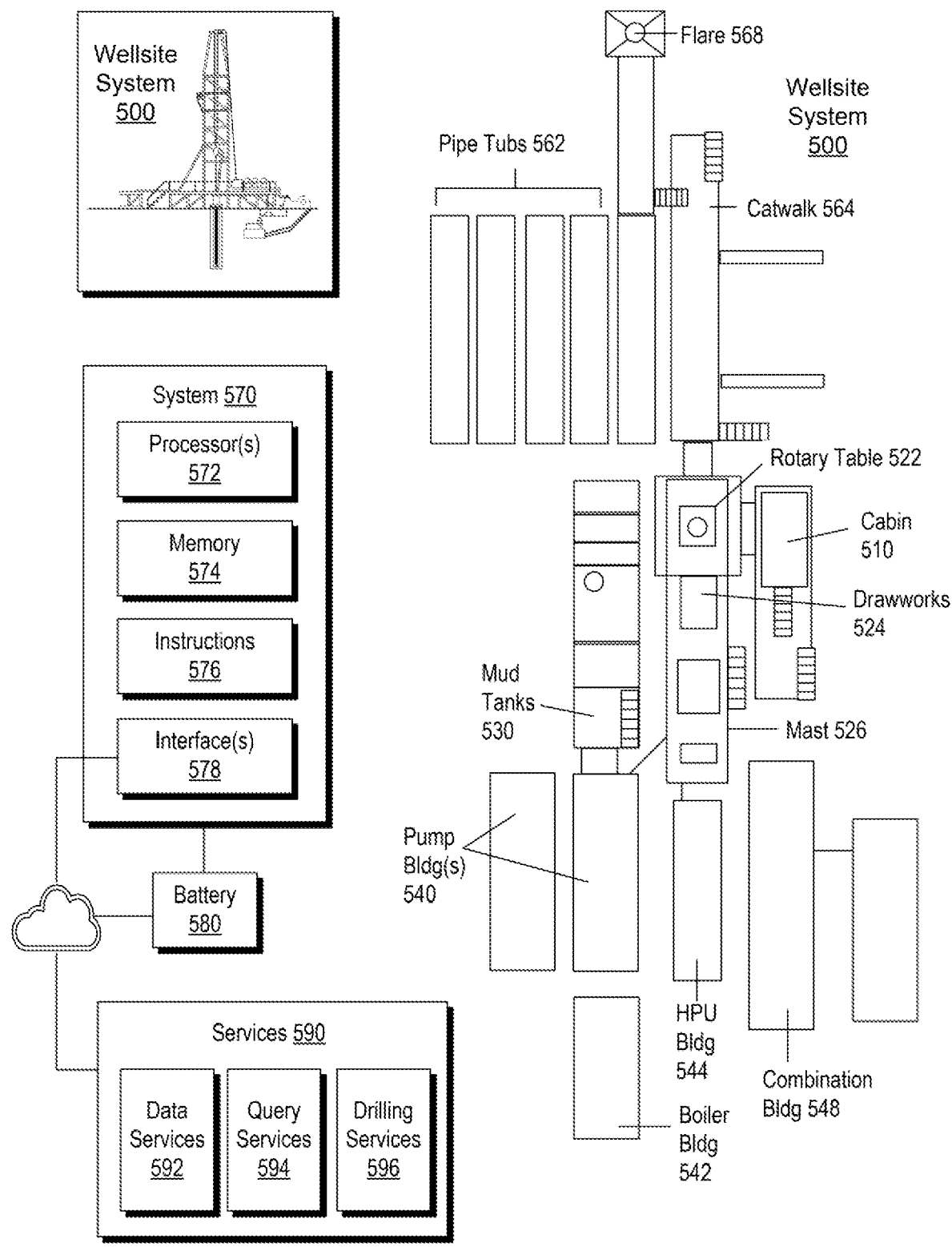
FIG. 5 illustrates an example of a wellsite system and an example of a computing system.

FIG. 5 shows an example of a wellsite system 500, specifically, FIG. 5 shows the wellsite system 500 in an approximate side view and an approximate plan view along with a block diagram of a system 570.

In the example of FIG. 5, the wellsite system 500 can include a cabin 510, a rotary table 522, drawworks 524, a mast 526 (e.g., optionally carrying a top drive, etc.), mud tanks 530 (e.g., with one or more pumps, one or more shakers, etc.), one or more pump buildings 540, a boiler building 542, an HPU building 544 (e.g., with a rig fuel tank, etc.), a combination building 548 (e.g., with one or more generators, etc.), pipe tubs 562, a catwalk 564, a flare 568, etc. Such equipment can include one or more associated functions and/or one or more associated operational risks, which may be risks as to time, resources, and/or humans.

As shown in the example of FIG. 5, the wellsite system 500 can include a system 570 that includes one or more processors 572, memory 574 operatively coupled to at least one of the one or more processors 572, instructions 576 that can be, for example, stored in the memory 574, and one or more interfaces 578. As an example, the system 570 can include one or more processor-readable media that include processor-executable instructions executable by at least one of the one or more processors 572 to cause the system 570 to control one or more aspects of the wellsite system 500. In such an example, the memory 574 can be or include the one or more processor-readable media where the processor-executable instructions can be or include instructions. As an example, a processor-readable medium can be a computer-readable storage medium that is not a signal and that is not a carrier wave.

FIG. 5 also shows a battery 580 that may be operatively coupled to the system 570, for example, to power the system 570. As an example, the battery 580 may be a back-up battery that operates when another power supply is unavailable for powering the system 570. As an example, the battery 580 may be operatively coupled to a network, which may be a cloud network. As an example, the battery 580 can include smart battery circuitry and may be operatively coupled to one or more pieces of equipment via a SMBus or other type of bus.

In the example of FIG. 5, services 590 are shown as being available, for example, via a cloud platform. Such services can include data services 592, query services 594 and drilling services 596. As an example, the services 590 may be part of a system such as the system 400 of FIG. 4.

As an example, the system 570 may be utilized to generate one or more rate of penetration drilling parameter values, which may, for example, be utilized to control one or more drilling operations.

Figure 6:
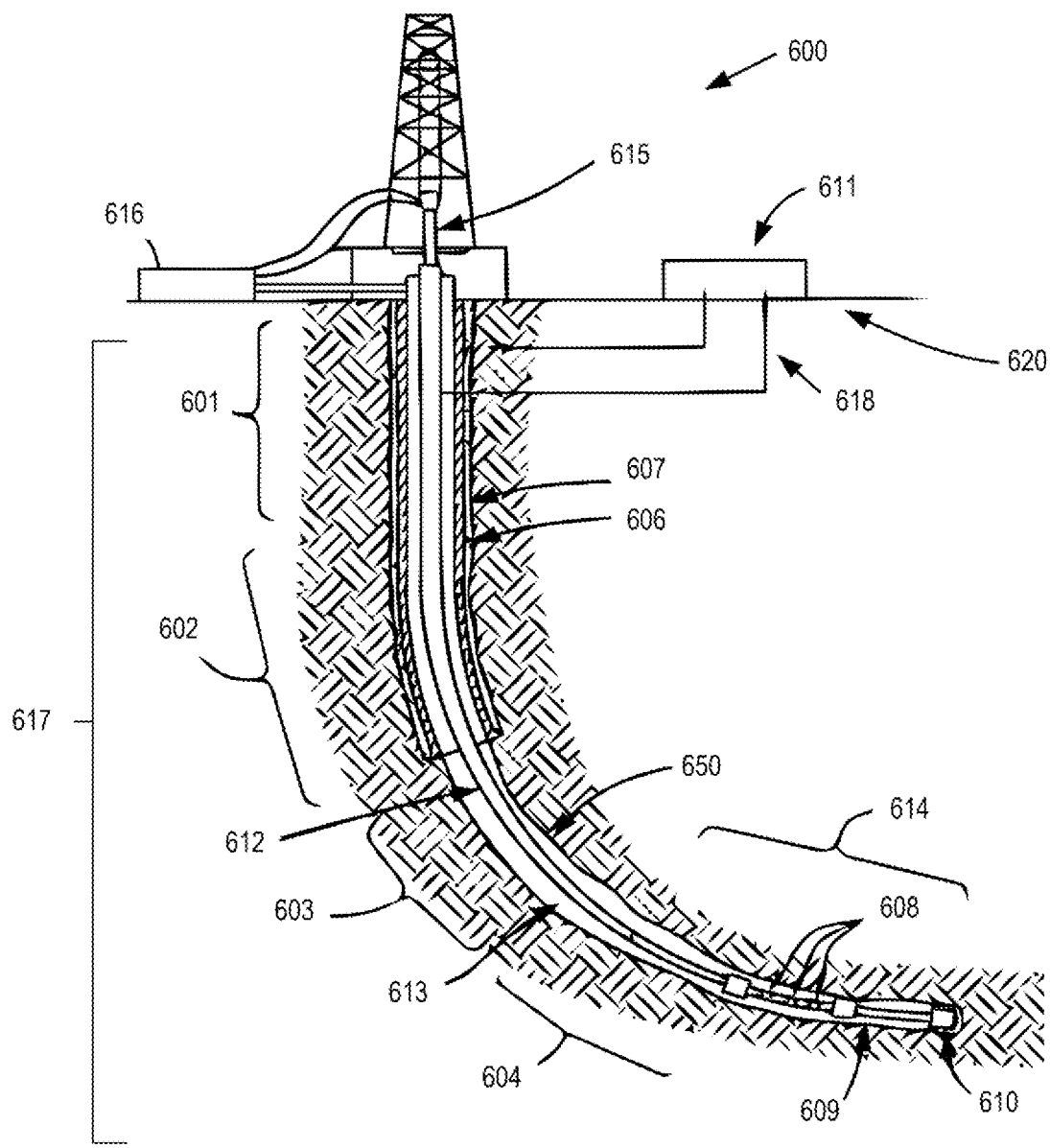
FIG. 6 illustrates an example of equipment in a geologic environment.

FIG. 6 shows a schematic diagram depicting an example of a drilling operation of a directional well in multiple sections. The drilling operation depicted in FIG. 6 includes a wellsite drilling system 600 and a field management tool 620 for managing various operations associated with drilling a bore hole 650 of a directional well 617. The wellsite drilling system 600 includes various components (e.g., drillstring 612, annulus 613, bottom hole assembly (BHA) 614, kelly 615, mud pit 616, etc.). As shown in the example of FIG. 6, a target reservoir may be located away from (as opposed to directly under) the surface location of the well 617. In such an example, special tools or techniques may be used to ensure that the path along the bore hole 650 reaches the particular location of the target reservoir.

As an example, the BHA 614 may include sensors 608, a rotary steerable system (RSS) 609, and a bit 610 to direct the drilling toward the target guided by a pre-determined survey program for measuring location details in the well. Furthermore, the subterranean formation through which the directional well 617 is drilled may include multiple layers (not shown) with varying compositions, geophysical characteristics, and geological conditions. Both the drilling planning during the well design stage and the actual drilling according to the drilling plan in the drilling stage may be performed in multiple sections (see, e.g., sections 601, 602, 603 and 604), which may correspond to one or more of the multiple layers in the subterranean formation. For example, certain sections (e.g., sections 601 and 602) may use cement 607 reinforced casing 606 due to the particular formation compositions, geophysical characteristics, and geological conditions.

In the example of FIG. 6, a surface unit 611 may be operatively linked to the wellsite drilling system 600 and the field management tool 620 via communication links 618. The surface unit 611 may be configured with functionalities to control and monitor the drilling activities by sections in real time via the communication links 618. The field management tool 620 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 618 according to a drilling operation workflow. The communication links 618 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real time data associated with one or more operations such as, for example, a drilling operation or drilling operations. As an example, consider the PERFORM toolkit framework (Schlumberger Limited, Houston, Texas).

As an example, a service can be or include one or more of OPTIDRILL, OPTILOG and/or other services marketed by Schlumberger Limited, Houston, Texas.

The OPTIDRILL technology can help to manage downhole conditions and BHA dynamics as a real time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO framework).

The OPTILOG technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Texas), which may include information from various operations (e.g., drilling operations) as associated with various drill bits, drilling conditions, formation types, etc.

As an example, one or more QTRAC services (Schlumberger Limited, Houston Texas) may be provided for one or more wellsite operations. In such an example, data may be acquired and stored where such data can include time series data that may be received and analyzed, etc.

As an example, one or more M-I SWACO services (M-I L.L.C., Houston, Texas) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX services (e.g., via the ONE-TRAX software platform, M-I L.L.C., Houston, Texas) may be provided for one or more wellsite operations. In such an example, data may be acquired and stored where such data can include time series data that may be received and analyzed, etc.

As an example, various operations can be defined with respect to WITS or WITSML, which are acronyms for well-site information transfer specification or standard (WITS) and markup language (WITSML). WITS/WITSML specify how a drilling rig or offshore platform drilling rig can communicate data. For example, as to slips, which are an assembly that can be used to grip a drillstring in a relatively non-damaging manner and suspend the drillstring in a rotary table, WITS/WITSML define operations such as "bottom to slips" time as a time interval between coming off bottom and setting slips, for a current connection; "in slips" as a time interval between setting the slips and then releasing them, for a current connection; and "slips to bottom" as a time interval between releasing the slips and returning to bottom (e.g., setting weight on the bit), for a current connection.

Well construction can occur according to various procedures, which can be in various forms. As an example, a procedure can be specified digitally and may be, for example, a digital plan such as a digital well plan. A digital well plan can be an engineering plan for constructing a wellbore. As an example, procedures can include information such as well geometries, casing programs, mud considerations, well control concerns, initial bit selections, offset well information, pore pressure estimations, economics and special procedures that may be utilized during the course of well construction, production, etc. While a drilling procedure can be carefully developed and specified, various conditions can occur that call for adjustment to a drilling procedure.

As an example, an adjustment can be made at a rigsite when acquisition equipment acquire information about conditions, which may be for conditions of drilling equipment, conditions of a formation, conditions of fluid(s), etc. Such an adjustment may be made on the basis of personal knowledge of one or more individuals at a rigsite. As an example, an operator may understand that conditions call for an increase in mudflow rate, a decrease in weight on bit, etc. Such an operator may assess data as acquired via one or more sensors (e.g., torque, temperature, vibration, etc.). Such an operator may call for performance of a procedure, which may be a test procedure to acquire additional data to understand better actual physical conditions and physical phenomena that may occur or that are occurring. An operator may be under one or more time constraints, which may be driven by physical phenomena, such as fluid flow, fluid pressure, compaction of rock, borehole stability, etc. In such an example, decision making by the operator can depend on time as conditions evolve. For example, a decision made at one fluid pressure may be sub-optimal at another fluid pressure in an environment where fluid pressure is changing. In such an example, timing as to implementing a decision as an adjustment to a procedure can have a broad ranging impact. An adjustment to a procedure that is made too late or too early can adversely impact other procedures compared to an adjustment to a procedure that is made at an optimal time (e.g., and implemented at the optimal time).

Figure 7:
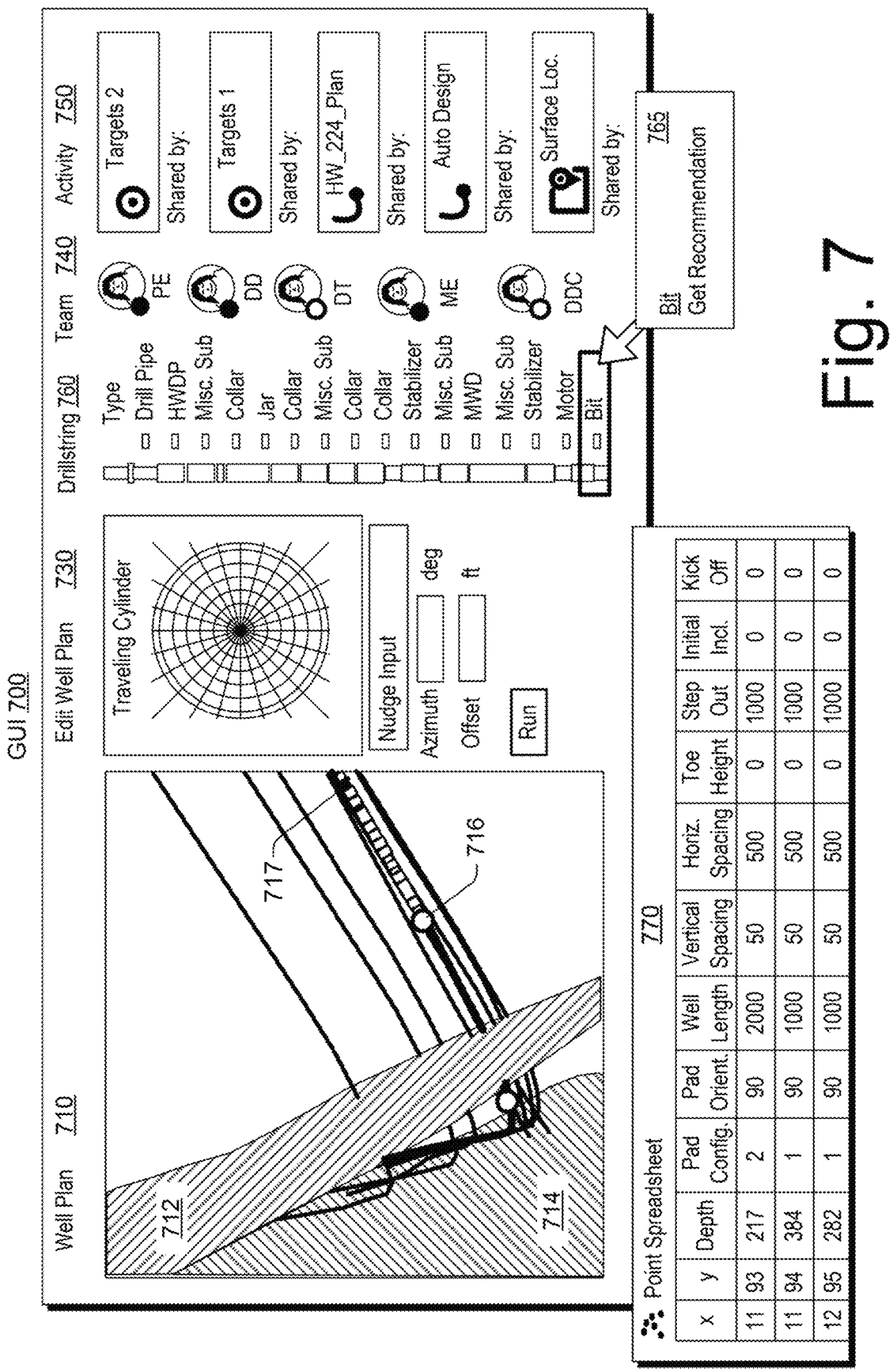
FIG. 7 illustrates an example of a graphical user interface.

FIG. 7 shows an example of a graphical user interface (GUI) 700 that includes information associated with a well plan. Specifically, the GUI 700 includes a panel 710 where surfaces representations 712 and 714 are rendered along with well trajectories where a location 716 can represent a position of a drillstring 717 along a well trajectory. The GUI 700 may include one or more editing features such as an edit well plan set of features 730. The GUI 700 may include information as to individuals of a team 740 that are involved, have been involved and/or are to be involved with one or more operations. The GUI 700 may include information as to one or more activities 750.

As shown in the example of FIG. 7, the GUI 700 can include a graphical control of a drillstring 760 where, for example, various portions of the drillstring 760 may be selected to expose one or more associated parameters (e.g., type of equipment, equipment specifications, operational history, etc.). In the example of FIG. 7, the drillstring 760 graphical control includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation).

As an example, a workflow can include utilizing the graphical control of the drillstring 760 to select and/or expose information associated with a component or components such as, for example, a bit and/or a mud motor. In the example of FIG. 7, a graphical control 765 is shown that can be rendered responsive to interaction with the graphical control of the drillstring 760, for example, to select a type of component and/or to specify one or more features of the drillstring 760 (e.g., for training a neural network model, etc.). As to the graphical control 765, it may be utilized to get a recommendation for a component such as a drill bit and/or one or more other components of the drillstring 760 and optionally drilling fluid (e.g., mud). For example, consider a workflow that can utilize an equipment framework (EF) that can generate equipment recommendations. In such an example, interactions with the GUI 700 may provide for automated selection and/or input-based selection of one or more pieces of equipment and/or drilling fluid.

As explained, a drill bit may be rotated via one or more mechanisms (e.g., rotary drive, top drive, mud motor, etc.). Such modes of operation can be associated with particular types of energy utilization. As an example, the GUI 700 can include one or more fields and/or pop-ups that can be generated based at least in part on output of an EF. For example, consider the graphical control 765 being highlighted as to a particular type bit that will make a field operation (e.g., drilling) more efficient. As an example, an EF can output a schedule, which may be a schedule associated with stages of drilling, for example, where one type of drill bit is utilized for one stage (e.g., section, etc.) and another type of drill bit is utilized for another stages (e.g., another section, etc.). As an example, a schedule may be a replacement schedule where a replacement bit may or may not be the same as an existing bit of a drillstring. As an example, an EF may generate one or more drilling equipment recommendations dynamically during performance of drilling operations (e.g., drilling, tripping, etc.) and/or one or more drilling fluid recommendations dynamically during performance of drilling operations (e.g., drilling, tripping, etc.).

FIG. 7 also shows an example of a table 770 as a point spreadsheet that specifies information for a plurality of wells. As shown in the example table 770, coordinates such as "x" and "y" and "depth" can be specified for various features of the wells, which can include pad parameters, spacings, toe heights, step outs, initial inclinations, kick offs, etc.

Figure 8:
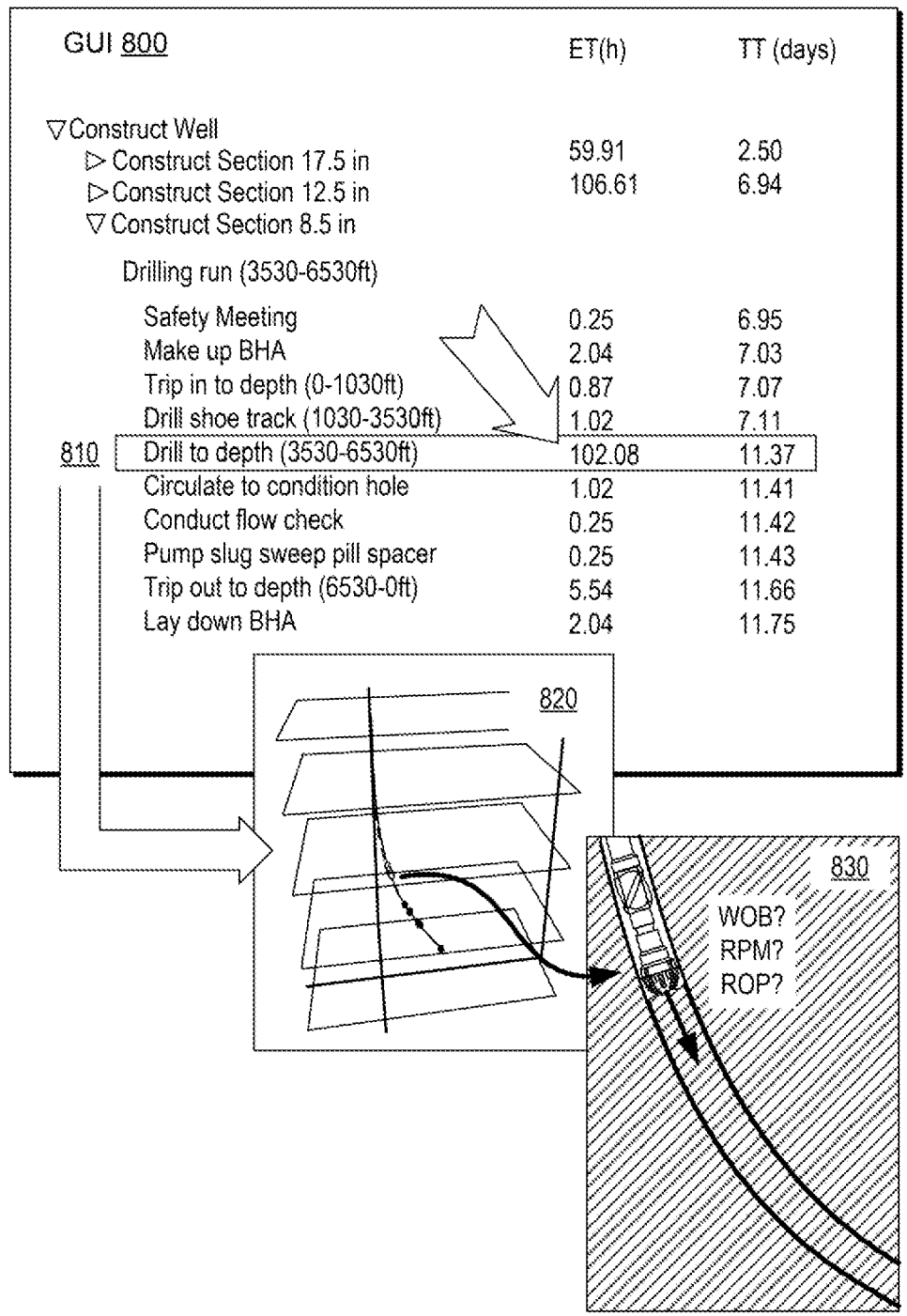
FIG. 8 illustrates an example of a graphical user interface.

FIG. 8 shows an example of a graphical user interface 800 that includes various types of information for construction of a well where times are rendered for corresponding actions. In the example of FIG. 8, the times are shown as an estimated time (ET) in hours and a total or cumulative time (TT), which is in days. Another time may be a clean time, which can be for performing an action or actions without occurrence of non-productive time (NPT) while the estimated time (ET) can include NPT, which may be determined using one or more databases, probabilistic analysis, etc. In the example of FIG. 8, the total time (TT or cumulative time) may be a sum of the estimated time column. As an example, during execution and/or replanning the GUI 800 may be rendered and revised accordingly to reflect changes. As shown in the example of FIG. 8, the GUI 800 can include selectable elements and/or highlightable elements. As an example, an element may be highlighted responsive to a signal that indicates that an activity is currently being performed, is staged, is to be revised, etc. For example, a color coding scheme may be utilized to convey information to a user via the GUI 800.

As to the highlighted element 810 ("Drill to depth (3530-6530 ft)") the estimated time is 102.08 hours, which is greater than four days. For the drilling run for the 8.5 inch section of the borehole, the highlighted element 810 is the longest in terms of estimated time. FIG. 8 also shows a GUI 820 for a borehole trajectory and a GUI 830 of a drillstring with a drill bit where drilling may proceed according to a weight on bit (WOB) and a rotational speed (RPM) to achieve a rate of penetration (ROP). In the example of FIG. 8, the GUI 830 and parameters thereof may be associated with drill bit performance (e.g., ROP, wear, remaining life, etc.).

As an example, the GUI 830 may be operatively coupled to an equipment framework (EF) such that, for example, variations in RPM and/or WOB can be visualized with respect to drill bit performance, which may provide for optimizations, control, etc. As an example, an ROP may be associated with wear where an optimal ROP may be an ROP that considers wear (e.g., in relationship to a depth to be drilled, etc.).

As an example, the GUI 800 can be operatively coupled to one or more systems that can assist and/or control one or more drilling operations. For example, consider a system that generates rate of penetration values, which may be, for example, rate of penetration set points. Such a system may be an automation assisted system and/or a control system. For example, a system may render a GUI that displays one or more generated rate of penetration values and/or a system may issue one or more commands to one or more pieces of equipment to cause operation thereof at a generated rate of penetration (e.g., per a WOB, a RPM, etc.). As an example, a time estimate may be given for the drill to depth operation using manual, automated and/or semi-automated drilling. For example, where a driller enters a sequence of modes, the time estimate may be based on that sequence; whereas, for an automated approach, a sequence can be generated (e.g., an estimated automated sequence, a recommended estimated sequence, etc.) with a corresponding time estimate. In such an approach, a driller may compare the sequences and select one or the other or, for example, generate a hybrid sequence (e.g., part manual and part automated, etc.).

As an example, a framework environment can include an option for execution of a framework that may run in the background, foreground or both. For example, consider executing the DRILLPLAN framework in the example system 100 of FIG. 1 where an equipment framework (EF) can be optionally instantiated for foreground and/or background execution that can assess information of the DRILLPLAN framework with respect to equipment choices, drilling fluid system choices, etc. In such an example, the equipment framework (EF) may act in response by making suggestions and/or changes.

Figure 9:
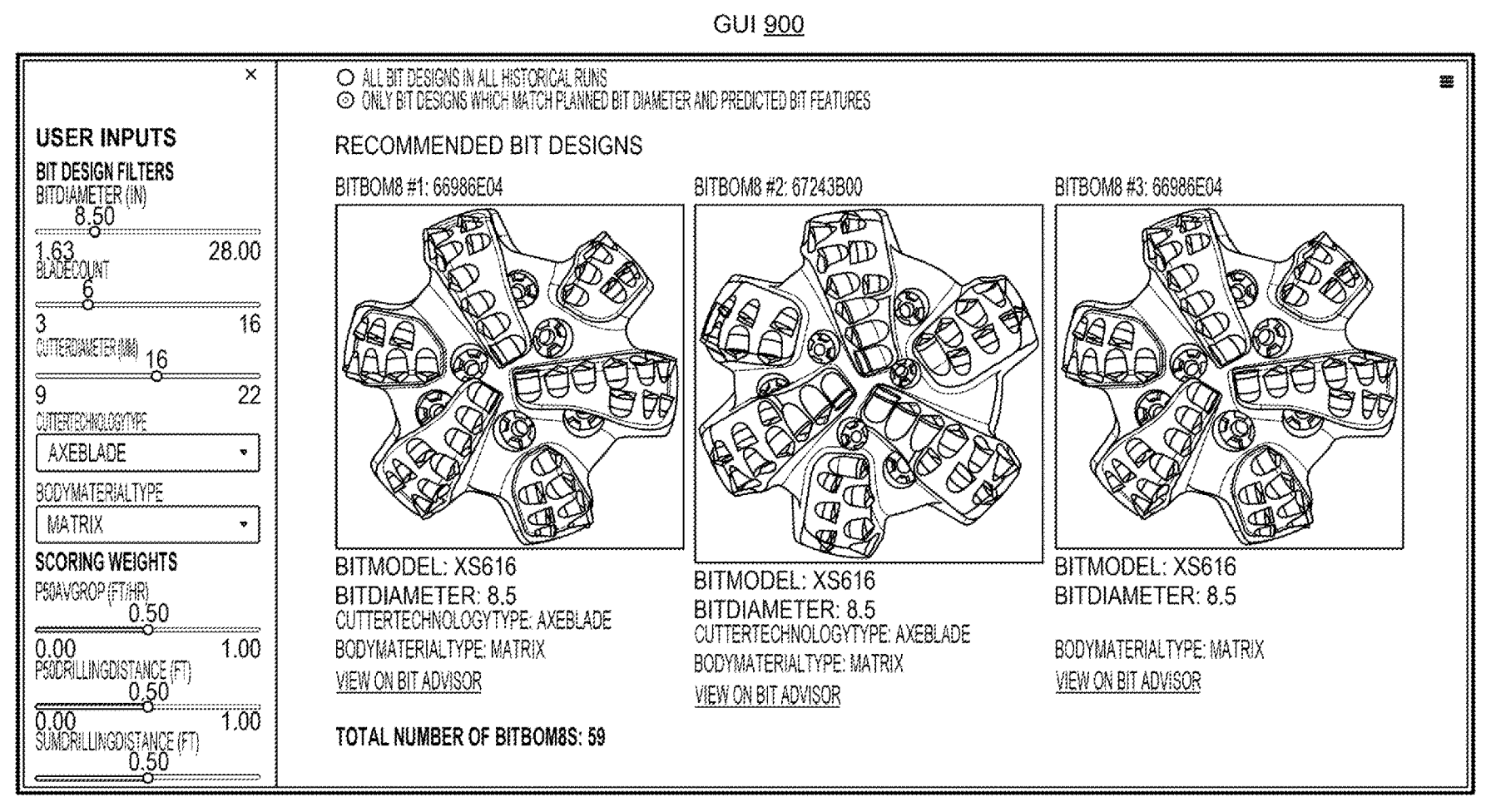

FIG. 9 shows an example of a graphical user interface (GUI) 900 that includes various input graphics and various output graphics. As an example, the GUI 900 may be operatively coupled to a system that can generate a GUI such as the GUI 700 of FIG. 7. For example, consider the GUI 765 as including a control that can cause rendering of a GUI such as the GUI 900. In such an example, a bit may be selected automatically and/or via user interaction from a variety of bits.

In the example of FIG. 9, the recommended bits can be rendered graphically and/or via actual photographs. As an example, the GUI 900 can include features to render views of a bit, which may be 2D or 3D. In such an approach, a user may interact with the GUI 900 to adjust a view, to zoom in, rotate, etc.

In the example of FIG. 9, the GUI 900 can include various user inputs that can be adjustable via use of sliders, drop-down menus, etc. As shown, user inputs can include weights such as scoring weights.

FIG. 10 shows an example of a GUI 1000 that may be part of the GUI 900 and/or otherwise operatively coupled to a GUI that can provide output such as bit recommendations. The GUI 1000 includes various bit parameters, which may be defined using one or more limits, ranges, etc. As shown, inputs can include bit diameter, blade count, cutter diameter, cutter technology type, body material type, along with one or more scoring weights (e.g., P50 average ROP, P50 drilling distance, sum of drilling distance, etc.). The GUI 1000 can be utilized for various interactions. For example, consider adjustment to one or more of the scoring weights such that results may be updated. In such an approach, a user may aim to achieve one or more desired plan objectives with higher probability, for example, to complete a section without having to trip out due to a bit related issue (e.g., excessive bit wear, etc.). In the example of FIG. 10, bit diameter is rendered at the top as it may have the largest impact on results and, for example, can correspond to a diameter of a particular section of a planned trajectory, a particular run, etc.

As mentioned, a bit can be part of a BHA where the BHA may include a motor and/or other directional drilling feature(s). As an example, a loop may exist where upon selection of a particular bit, an equipment framework can check and/or recommend one or more other BHA components. For example, certain mud motors may be operable with certified bits such that upon selection of a mud motor and/or a bit, a recommendation or recommendations can be generated for a corresponding bit and/or mud motor.

Figure 11:
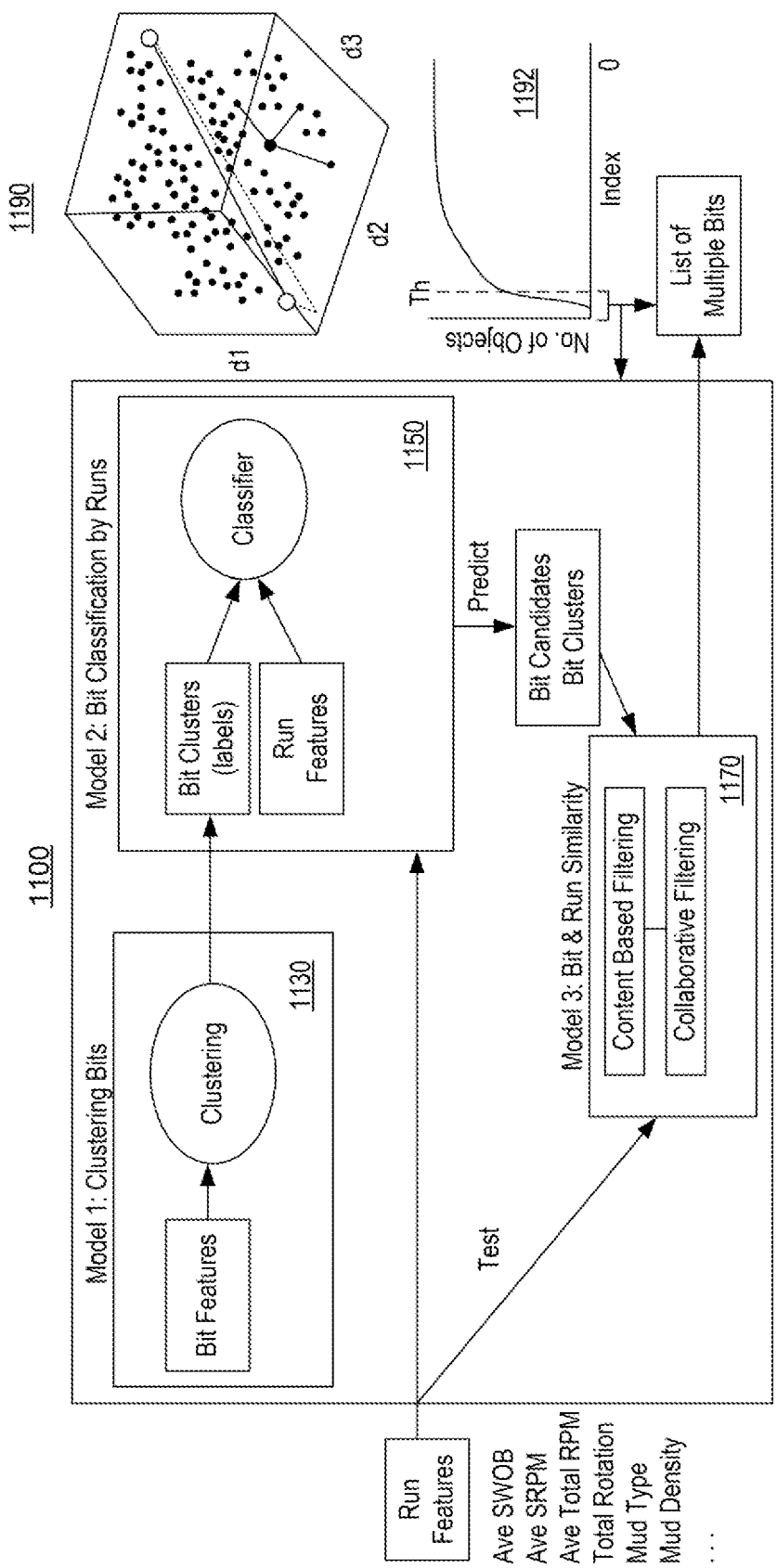
FIG. 11 illustrates an example of a system.

FIG. 11 shows an example of a system 1100 that can generate equipment recommendations. For example, the system 1100 may be an equipment framework that can recommend equipment, which can include bits and/or other equipment.

In the example of FIG. 11, the system 1100 includes various models, including a model 1130 for clustering bits, a model for classifications by runs 1150 and a model for bits and runs 1170. As shown, a model may be a machine learning model that can be trained via one or more types of learning methodologies. For example, the model 1130 may be trained using unsupervised learning and the model 1150 may be trained using supervised learning. In such examples, a trained model can be utilized to make predictions based on input.

As shown, the model 1130 can be trained via clustering using bit features where, for example, a prediction can be output to the model 1150, which may utilize bit clusters (e.g., labels) and run features where labels and features may be utilized by a classifier. As shown, the model 1150 can output predictions such as bit candidates and bit clusters. As shown, the model 1170 can perform content based filtering via a content based filtering component that can generate output for a collaborative filtering component, where the collaborative filtering component can generate recommendations, for example, a set of bits (see, e.g., the GUI 900).

As to particular run features that can be utilized as system input (e.g., framework input, etc.), consider one or more of surface weight on bit (SWOB), surface RPM (SRPM), total RPM, total rotation, mud type, mud density, etc.

The system 1100 may be utilized to as a recommender of drilling equipment for one or more planned wells/drilling runs. As an example, the system 1100 may be utilized in a planning framework, for example, by one or more users that are planning a well, drilling of a section, etc.

As to types of equipment that may be recommended, consider one or more of the following as some examples: drill bit design, downhole motor power section configuration, downhole drive type (e.g., none (rotary), downhole motor, RSS, RSS w/ downhole motor, etc.), BHA design (e.g., list of drillstring components/tools, etc.), fluid system (e.g., fluid type and/or properties), mud pumps, etc.

As an example, a recommendation system may or may not utilize clustering. For example, an offset similarity index (OSI) may be utilized, which may be implemented optionally without clustering. For example, consider a feature space that includes features relevant for object similarity where features may or may not be continuous (e.g., consider continuous and/or discrete features). In such an example, weighting factors may be defined and assigned to each feature. For example, for intervals and drilling fluid recommendations, features can include aspects such as country, well water depth, top and bottom measured depths, top and bottom true vertical depths, bit size, maximum interval inclination, maximum bottomhole circulation temperature, etc. Other features may also be selected such as, for example, well coordinates, operators, plays, formations, downhole tools, etc.

As to relevant features for a target object (e.g., an interval, etc.), these may be entered by a user as input parameters where target object data can be added to a historical dataset. If some features are yet unknown for the target object, the feature space may be revised. Optionally, internal checks of consistency of input can be run to reduce entrance of non-physical or non-practical values (e.g., measured depth<true vertical depth, etc.).

As an example, various non-numerical and/or non-continuous features (e.g., discrete) in a feature space may be encoded and/or continualized via one or more techniques. As an example, a method can include encoding of categorical features. If a reasonably small number of values are missing in a feature, imputation may be performed to fill in one or more gaps.

As an example, features may be normalized, for example, using min-max scaling to provide for ranging of 0 and 1.

Such normalization can make features importance/weights initially even. As explained, user-defined weighting factors (e.g., weighting scores, etc.) may be applied to one or more normalized features (e.g., via multiplication, etc.). With normalized and optionally weighted features, objects in a historical dataset can be represented by points in a multidimensional space, which may be of two or more dimensions. In such a multidimensional space, inter-point distances can be characteristics of points (dis)similarity where, the smaller the distance, the smaller is the difference between points properties. Conversely, where the distance is larger, the larger is the difference between points properties.

As an example, distances and (dis)similarities can be computed using one or more techniques. As an example, one or more techniques may be utilized for continuous and/or discrete feature spaces. As an example, feature spaces with numerical and continuous features may be Euclidian. In various examples, pre-processing using a continualization technique may be utilized, which may be for numerical and/or non-numerical features. As to some examples of techniques for generation of distances/(dis)similarity, consider one or more of Euclidian, standardized Euclidean, squared Euclidean, Manhattan (e.g., cityblock), Minkowski, cosine, matching, Hamming, Levenshtein, Bray-Curtis, Canberra, Chebyshev, Jaccard, Dice, Sorensen-Dice, Jensen-Shannon, Kulsinski, Mahalanobis, Rogers-Tanimoto, Russell-Rao, Sokal-Michener, Sokal-Sneath, and Yule.

FIG. 11 shows an example of a multidimensional space 1190 that includes dimensions d1, d2 and d3, which can be normalized dimensions that range from 0 to 1 (e.g., or −1 to +1, etc.). In the multidimensional space 1190, the features are continuous normalized, non-weighted features where the large open circles represent extreme points with the estimated maximum distance between them while the large filled circle is a target object. FIG. 11 also shows an example of a plot 1192 of number of objects (e.g., log) versus index value, which may range from 1 to 0 (e.g., or +1 to −1, etc.). As shown, when closer to 1, fewer objects can be selected, which may be directly output as a list of multiple bits and/or fed into one or more models in the example of FIG. 11. As explained, the plot can include a log scale for number of objects such that a stark difference can be readily discerned and an appropriate threshold value (Th) utilized. As an example, the approach illustrated in the space 1190 and the plot 1192 may be integrated into the system 1100 for one or more purposes. For example, consider applying such an approach prior to clustering, after classifying, as part of filtering, etc.

As explained, in a multidimensional space, various objects can appear as points. In various examples, a method can include identifying two extreme points in a multidimensional space of historical data (e.g., where a target object is excluded), which can be with respect to an origin of coordinates. The distance between these points can be referred to as an estimated maximum distance (in the case of intervals this is also the estimated maximum dissimilarity between historical intervals). The estimated maximum distance can be used, as finding it demands computation of N distances, where N is the number of objects in the dataset. Finding the true maximum distance, however, demands computation of $N^2/2$ inter-point distances (e.g., building a so-called distance matrix), which can be computationally expensive.

One or more techniques may be utilized for estimation of the maximum distance. For example, the distance between two points closest to the opposite corners of a multidimensional space can be used, or an estimate based on the screening of distances between points closest to each corner.

Distances between a target object and historical objects in a database may be computed and normalized (e.g., divided, etc.) by the estimated maximum distance, to thereby generate a dissimilarity index. The offset similarity index (OSI) can be computed, for example, as: OSI=1−dissimilarity index. For identical objects, the OSI index can be equal to 1 and for the most dissimilar ones it can be equal to 0.

As an example, a user can enter target interval parameters for an upcoming drilling job and submit them to a system where the OSI can be computed, for example, on the fly for historical intervals based on the input. In such an example, preselected offset intervals with a default OSI of 0.9 can be rendered to a display. In such an example, the index can be changed by the user to focus the analysis on more (or less) similar offset intervals, for example, by interaction with a slider graphic control. Reducing the OSI value can be expected to return more intervals (e.g., objects), but with less similarity, and setting the index to zero allows the user to review the intervals (e.g., objects) available in the database.

As an example, once an OSI is defined and the user satisfied with the initial number of intervals for analysis, one or more additional filters can be applied to narrow down the offset interval selection. As to filters, consider, for example, one or more of the following as may be suitable for drilling fluid (mud) recommendations: drilling fluid (mud) type (water-based (WMB) or non-aqueous fluid (NAF)), well offshore or onshore, the service company office, operator, drilling fluid density (mud weight), and the drilling year. As an example, factors for drilling fluid may include, for example, factors such as water-based, oil-based, disposal, overall availability, interaction with equipment, etc. After applying one or more filters, a user can more particularly analyze results. As an example, a GUI may render various graphics such as, for example, a series of pie charts giving the offset interval selection overview to simplify assessment of interval distributions by attributes, as drilling fluid families, countries, and operators. While drilling fluid is mentioned, an OSI approach can be utilized for one or more pieces of equipment, one or more types of fluids, etc. As an example, a method can include ranking objects according to OSI values.

As shown in FIG. 11, the system 1100 may utilize content-based filtering and/or collaborative filtering as part of a recommendation process (see, e.g., the block 1170 of FIG. 11, etc.), which may be applied to output of a machine learning model and/or output of a similarity index generator.

As an example, a system may provide for candidate generation. For example, given a query, a system can generate a set of relevant candidates. Where content-based filtering is implemented, similarity between items can be utilized to recommend items similar to what may be desirable, suitable, etc. In the context of a user on a video platform, consider an approach where, if user A watches two cute cat videos, then the system can recommend cute animal videos to that user. Where collaborative filtering is implemented, a system can utilize similarities between queries and items simultaneously to provide recommendations. For example, again in a video context, if user A is similar to user B, and user B likes video 1, then the system can recommend video 1 to user A (e.g., even if user A hasn't seen the videos similar to video 1).

Content-based filtering and collaborative filtering can utilize an embedding space. For example, content-based and collaborative filtering can involve mapping each item and each query (or context) to an embedding vector in a common embedding space $E=\mathbb{R}^d$. An embedding space may be low-dimensional space (e.g., where d is smaller than the size of a corpus) that captures some latent structure of an item or a query set. In some instances, an embedding space may be referred to as a latent space as it can capture latent "structure". As to similarity, items that are similar can be close in an embedding space where "closeness" can be defined by a similarity measure (e.g., a similarity metric or metrics).

As to similarity measures, a similarity measure can be a function s $E \times E \rightarrow \mathbb{R}$ that takes a pair of embeddings and returns a scalar measuring their similarity. In such an example, the embeddings can be used for candidate generation as follows: given a query embedding $q \in E$, the system looks for item embeddings $x \in E$ that are close to q, that is, embeddings with high similarity s(q, x).

To determine the degree of similarity, a system may utilize, for example, one or more of the following: cosine, dot product, Euclidean distance, etc. For example, cosine can be the cosine of the angle between the two vectors s(q, x)=cos(q, x); dot product can be the dot product of two vectors s(q, x)=$\|x\|\|q\|$cos(q, x) (the cosine of the angle multiplied by the product of norms). Thus, if the embeddings are normalized, then dot-product and cosine coincide; and Euclidean distance can be that of a distance in a Euclidean space s(q, x)=$\|q-x\|$ where a smaller distance can mean higher similarity. Note that when the embeddings are normalized, the squared Euclidean distance can coincide with dot-product (and cosine) up to a constant.

As an example, a system can provide for comparing similarity measures, which may provide for ranking. As an example, one or more similarity measures may be utilized, which may be suitable for one or more types of equipment. Compared to the cosine, the dot product similarity is sensitive to the norm of the embedding. That is, the larger the norm of an embedding, the higher the similarity (for items with an acute angle) and the more likely the item is to be recommended. This can affect recommendations as follows: items that appear very frequently in a training set tend to have embeddings with large norms. If capturing frequency information is desirable, then a system may utilize dot product. However, in a manner where frequent items do not end up dominating the recommendations. As an example, a system may utilize one or more variations of a measure, for example, consider an approach that places less emphasis on the norm of the item. For example, consider s(q, x)=$\|q\|^\alpha \|x\|^\alpha$ cos(q, x) for a value of a in a range such as from 0 to unity; and items that appear very rarely may not be updated frequently during training. Consequently, if they are initialized with a large norm, a system may recommend rare items over more relevant items. To reduce such behavior, attention can be focused on embedding initialization, and using appropriate regularization.

As an example, a system can consider a "user" and an "item". In such an example, consider a planned well or run to be the "user" and the equipment used/recommended as the "item". As such recommendations may be presented to a user through a user interface, a system may also consider an "actual user".

As explained above with respect to content-based filtering and collaborative filtering in the video examples, user choices are utilized to make recommendations. As to the system 1100, rather than an exclusive focus on user choices, a focus can be on performance such as, for example, historical performance of items. In such an approach, the historical performance of a particular drill bit can be ascertained via a database that includes performance data associated with the particular drill bit. Where such a database or databases include performance data for a variety of drill bits, then a system can make recommendations as to drill bits from amongst the variety of drill bits where recommendations may aim to improve or meet desired performance (e.g., drilling performance, etc.). As an example, a system can utilize a combination of foci, for example, historical performance and user feedback. As an example, a system may include one or more features for user input that can help guide an equipment framework (EF) in making recommendations. In such an example, user input may include actual user preferences as to what type of equipment, what type of performance, etc.

The system 1100 can be a bit design recommender system that can recommend a list of polycrystalline diamond compact (PDC) bit designs for a planned drilling run. A bit design can include various features such as, for example, one or more of cutter types, cutter layout, and blade geometry. Such features can be considered in the IDEAS framework for integrated dynamic design and analysis. As explained, a system may provide for recommendations as to one or more pieces of equipment, one or more drilling fluids, etc.

Analyses via the IDEAS framework and field experience show that dynamically stable bit designs can be associated with a variety of drilling systems, including directional drilling systems. As an example, the system 1100 can be suitable for use for rotary steerable system (RSS) and/or steerable motor BHA systems. Factors such as stability, torque, stick/slip, etc., may be taken into account. A suitable bit design can help to reduce number of trips. For example, a suitable bi design may help to reduce shock and vibration, which can cause wear that may demand tripping out, bit replacement and tripping in.

Figure 12:
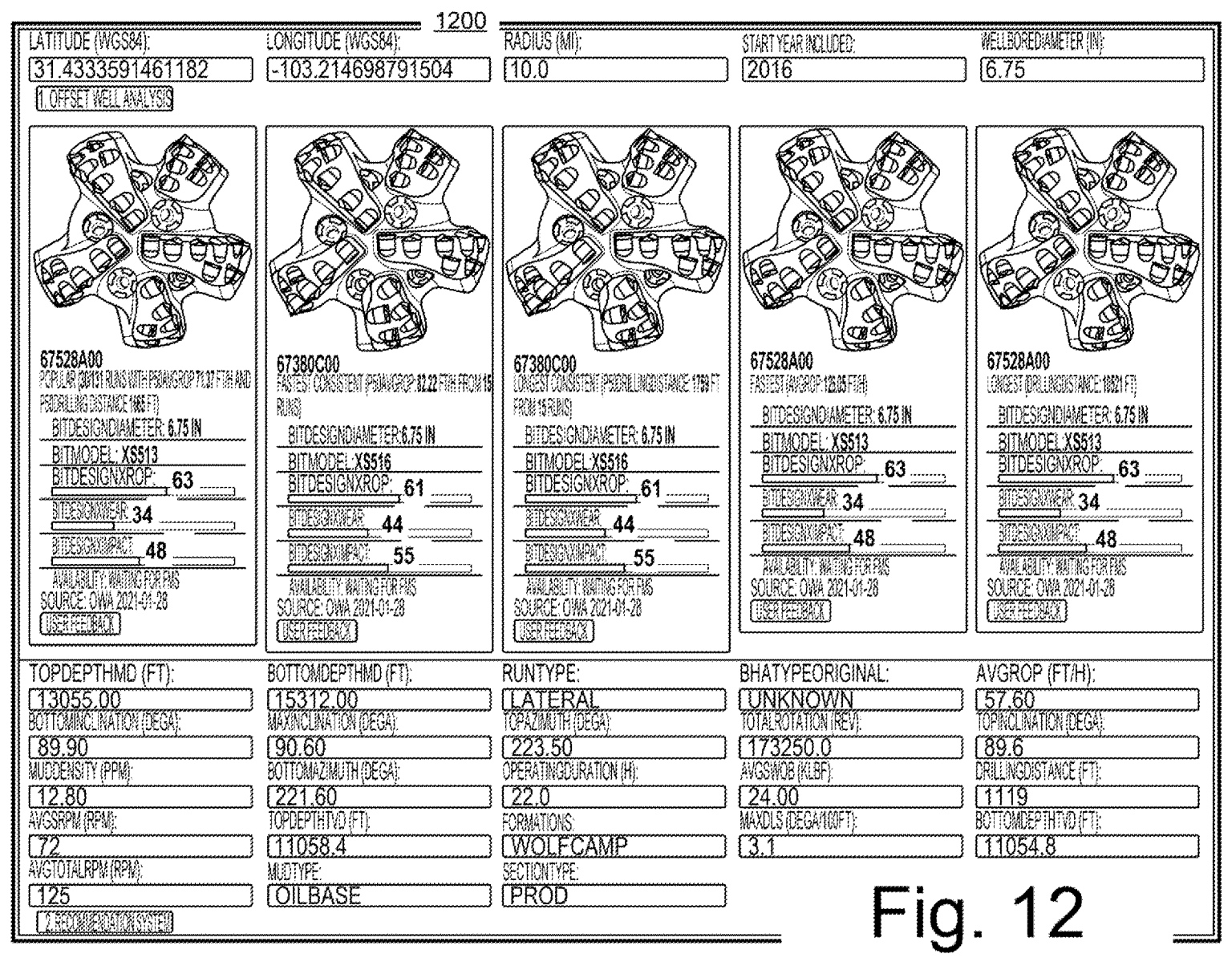

FIG. 12 shows an example of a GUI 1200 that includes various fields, control graphics, etc. The GUI 1200 may be generated using output from a system such as the system 1100.

Figure 13:
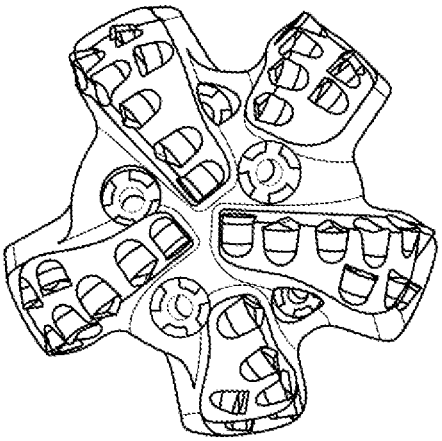
FIG. 13 illustrates an example of a graphical user interface and example of a method.
Figure 13:
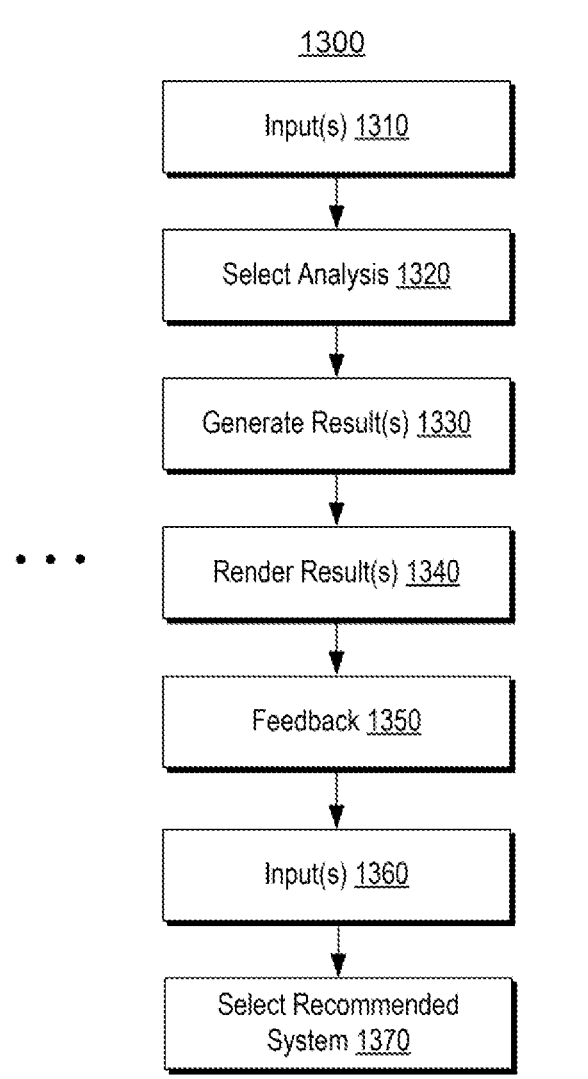

FIG. 13 shows an example of a method 1300 and an example of a portion 1305 of the GUI 1200 of FIG. 12. The method includes an input block 1310 for inputting information, a selection block 1320 for selecting an analysis, a generation block 1330 for generating results, a render block 1340 for rendering generated results, a feedback block 1350 for receiving feedback, an input block 1360 for inputting information and a selection block 1370 for selecting a recommended system. As explained, one or more techniques may be utilized, which may involve clustering, OSI computations, etc.

In the example of FIG. 13, input can include, for example, one or more of latitude, longitude, radius, start year, wellbore diameter, etc. As shown, the radius of 10.0 miles can be ascertained with respect to the latitude and the longitude, for example, to determine a region for offset wells, etc. As to wellbore diameter, it may correspond to one or more sections of a well.

The particular bit design illustrated in FIG. 13 has an identifier 67528A00, which is associated with information such as "Popular (30/131 runs with P50AvgROP 71.37 ft/h and P50 Drilling Distance 1665 ft)". In the example of FIG. 13, input can include particular factors such as top depth as a measured depth in feet (e.g., 13055.00 ft), bottom inclination in degrees (e.g., 89.90 degrees), mud density in ppm (e.g., 12.80 ppm), average surface RPM (e.g. 72 rpm), and average total RPM (e.g., 125 rpm), bottom depth as MD in feet (e.g., 15312.00 ft), maximum inclination in degrees (e.g., 90.60 degrees), bottom azimuth in degrees (e.g., 221.60 degrees), top depth total vertical depth (TVD) in feet (e.g., 11058.4 ft), mud type (e.g., oil base, etc.), run type (e.g., lateral), top azimuth in degrees (e.g., 223.50 degrees), operating duration in hours (e.g., 22.0 h), formation(s) (e.g., WOLFCAMP), section type (e.g., production), BHA type (e.g., unknown), total rotation in revolutions (e.g., 173250.0 rev), average surface weight on bit in thousands of pound-feet (e.g., 24 klbf), maximum dogleg severity (DLS) in degrees per 100 ft (e.g., 3.1 degrees/100 ft), average ROP in feet per hour (e.g., 57.60 ft/h), top inclination in degrees (e.g., 89.6 degrees), drilling distance in feet (e.g., 1119 ft), bottom depth TVD in ft (e.g., 11054.8 ft), etc. In the example of FIG. 13, the GUI 1305 also shows color coded scales for bit design ROP, bit design wear and bit design impact. Factors such as availability may also be rendered in the GUI 1305.

As explained, the system 1100 can include multiple machine learning (ML) models. The model 1130 can utilize an unsupervised ML algorithm to cluster individual bit designs of available bit designs (e.g., from a bit design catalog, etc.), which may be based on features/characteristics of the bit designs such as the number of blades, the primary PDC cutter diameter, and the shaped cutter technology utilized. The model 1150 can use a classification model to label the planned run with the bit design cluster number, based on the bit designs which were used on historical runs. The model 1170 can rank the performance of bit designs which belong to the given cluster and provide the top performing bit designs as the recommendation. As explained for a set of top performing bit designs, these may be filtered based on one or more planned run criteria. For example, consider filtering for recommendation of bit designs that are of the same diameter as is planned for the run (see, e.g., bit design diameter of 6.75 inch in the GUI 1305 of FIG. 13).

The system 1100 can be operatively coupled to one or more components for purposes of rendering such as rendering of a graphical user interface (GUI). A GUI may be a web app interface that can allow a user to enter one or more parameters of a planned run, and then get a set of recommended bit designs.

As an example, data entry can be staged, tiered, phased, etc. For example, consider a two stage process. In the example GUI 1200 of FIG. 12 and 1305 of FIG. 13, twenty-three separate input features can be provided as fields, graphical controls, etc., for example, as shown below the bit graphics; whereas, near the top of the GUIs 1200 and 1305 are five inputs, which may be considered four inputs if latitude and longitude are considered a single input (e.g., location).

The method 1300 of FIG. 13 includes two input blocks 1310 and 1360 and includes two selection blocks 1320 and 1370. Such an approach aims to facilitate user inputs. For example, consider entry of 4 features: surface location of planned well (lat/long), radial distance from surface location considered relevant for offset selection, starting date (year) considered relevant for offset selection and diameter of planned run (wellbore diameter). Such an approach can provide for searching historical run data in a system to find available offset runs and, from this dataset, a set of bit designs that are statistically relevant can be generated.

As an example, a system can provide for various types of output, which may, for example, be selectable by a user, a system administrator, etc. As to some examples of types of output consider most popular bit design (e.g., the greatest number of runs), most consistent performing bit designs (e.g., highest median ROP and highest median drilled footage), highest performing bit designs (highest overall ROP and highest overall drilled footage), etc.

As shown in the GUI 1305, the 23 input fields can be populated, automatically (e.g., via data stored in memory, etc.) and/or manually (e.g., via user input). Such values can include, for example, median numerical values and mode categorical values from the offset runs. Values can be a statistically type of run based on an offset well analysis. The GUI 1305 can provide for user input, automatic population, user modification, etc. For example, a user can modify input values, which can be validated to ensure that they are within known physical limits. Once input, as shown in the method 1300, the selection block 1370 can be utilized to submit a planned run to a recommender system (e.g., consider the system 1100 of FIG. 11). As an example, the GUI 1305 may change, for example, to render various initial candidates and then to render various final, recommended candidates. For example, consider an initial set being rendered and scrollable, etc., where upon submission for a recommendation, a final set may be rendered.

As explained, the GUI 1305 can include a feedback graphical control that can allow a user to provide feedback on statistically relevant or recommended bit designs. Such feedback may be suitable for utilization in one or more machine learning models, for example, akin to a rating type of system, etc.

Figure 14:
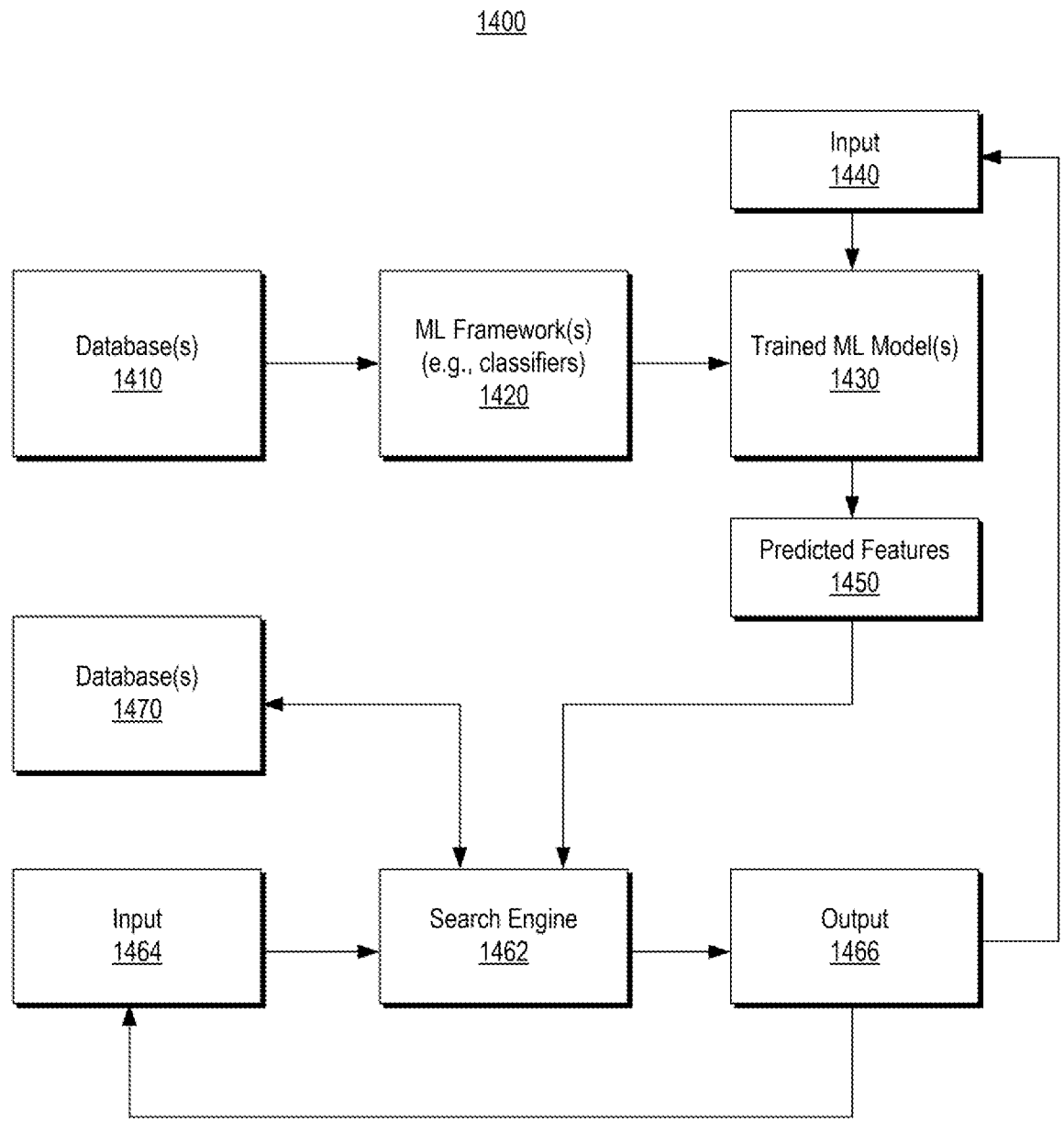
FIG. 14 illustrates an example of a system.

FIG. 14 shows an example of a system 1400, which may be part of an equipment framework and may be utilized with or without a system such as the system 1100. As an example, a system may include one or more features of the system 1100 and/or the system 1400.

In the example of FIG. 14, the system includes one or more databases 1410, one or more ML frameworks 1420, and one or more trained ML models 1430. As shown, the one or more ML frameworks 1420 may operate using data from the one or more databases 1410 where data can include labels and/or otherwise be processed to include labels. The one or more ML frameworks 1420 can include one or more types of ML models that can perform classification such that, once trained, input 1440 can be received to generate predicted features 1450. In such an example, input can include information concerning a drilling run where the predicted features are equipment features suitable for performing the drilling run. In such an example, the equipment features can be or include bit features.

As shown in FIG. 14, the predicted features 1450 can be utilized by a search engine 1462 that may accept input 1464 where the predicted features 1450 and optionally the input 1464 can be utilized by the search engine 1462 to search one or more databases 1470 to generate output 1466 (e.g., search results). In such an example, one or more GUIs may be utilized for purposes of input, output, model selection, database selection, etc. As shown, one or more loops may exist such that the output 1466 can be utilized for new input, modified input, etc. (see, e.g., blocks 1440 and 1464).

In various instances, a specific bit design may not physically exist in inventory or may not be in the right location to be delivered to a drilling rig within a desired timeframe. In such an example, the system 1400 may be particularly helpful where the predicted features 1450 are output. For example, a GUI may render the predicted features 1450 to a display where a user can visualize and understand the features that may be suitable for a drilling run with or without progressing to the search engine 1462. Where the user desires additional information (e.g., output), the user may progress to the search engine 1462.

As to some examples of bit features, consider bit body material, number of blades, primary PDC cutter diameter, and shaped cutter technology utilized. Such features may be suitable for a user to make a determination as to what type of bit to select.

As an example, a bit may be characterized in one or more manners. For example, consider a bit being characterized according to features that may be suitable for use in a type of recognition framework (e.g., consider a facial recognition framework which operates on facial features). As an example, a plan image (e.g., CAD, graphical rendering and/or photograph) may be utilized for a bit, where, for example, a scale is included such that dimensions (e.g., sizes, etc.) can be determined. As an example, a framework may classify bit "images" such that features can be recognized, which may include number of blades, cutter diameter, etc. As an example, an "image" may be a data-based image that characterizes a bit. For example, consider a 2D pixel image where pixel intensity, color, etc., represent a particular bit design feature. In such an example, consider bit diameter as being indicated by an intensity and/or a row or column of pixels that may range from a small diameter to a large diameter. The pixel dimensions of such a 2D pixel image may range from approximately 2×2 to a greater size and may be in color, black and white, greyscale, etc.

As an example, an "image" type of approach may be utilized for one or more purposes by an equipment framework (EF). For example, consider data handling, classification, search, output, input, etc. In various instances, a bit may be characterized by a number of features that may be akin to the basic features of a human face (e.g., eyes, ears, nose, and mouth). In such an example, a facial recognition framework may be utilized where bit features are transformed into image features. As an example, an output such as an output of predicted features may be a coded image that can be decoded to provide a set of a combination of desirable bit features (e.g., for a particular drilling run, etc.). As an example, as to drilling fluid, an image approach may be utilized for microscope imagery of drilling fluid, which may provide an indication of water content, oil content, particulate content, etc. In such an approach, drilling fluid can be characterized by imagery that can be processed using one or more image analysis techniques, which can include ML modeling techniques. As an example, drilling fluid imagery may be analyzed using fractal features of microstructure of drilling fluid, which may be under one or more types of shear regimens (e.g., shearing action, etc.).

As explained with respect to the system 1400 of FIG. 14, where the one or more trained ML models 1430 system can output the predicted features 1450, these may be utilized by the search engine 1462. In the example of FIG. 14, the one or more databases 1470 may include catalog data for bit designs where a match (e.g., exact, closest match, etc.) may be found and returned as search results.

The one or more databases 1470 may include information from one or more bit suppliers. As an example, where a particular mud motor demands a certified bit, the one or more databases 1470 may be limited to certified bits. In various instances, a feature may be in a catalog or may not be in a catalog. For example, certain features may be trade secret. As an example, where a feature is not specified in a catalog, the system 1400 may generate results that indicate possible matches with a notification to research further such as by contacting a representative of a manufacturer.

As shown in the system 1400, one or more classification-type ML models can be generated (e.g., selected, built, trained, etc.). In such an example, a one-to-one correspondence can be established for each of a plurality of features and at least one ML model. For example, number of blades may be classified by four or more ML models while bit diameter may be classified suitably by a single ML model. Where multiple ML models are utilized, they may be referred to as an ensemble. As an example, many ML models may be trained where a number of top performing trained ML models are utilized for purposes of generating predicted features based on input.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model, may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As to some examples of classifiers, consider the lazypredict framework, the xgboost and lightgbm PYTHON packages, etc. As to the lazypredict framework, it can utilize the scikit-learn framework, which can involve use of code such as the example code below.

Example Code

```
from lazypredict.Supervised import LazyClassifier
from sklearn.datasets import load_DATA1
from sklearn.model_selection import train_test_split
data = load_DATA1 ( )
X = data.data
y= data.target
X_train, X_test, y_train, y_test = train_test_split(X,
y,test_size=.5,random_state =123)
clf = LazyClassifier(verbose=0,ignore_warnings=True, custom_metric=
None)
models,predictions = clf.fit(X_train, X_test, y_train, y_test)
models . . .
```

As to models, consider one or more of LinearSVC, SGDClassifier, MLPClassifier, Perceptron, LogisticRegression, LogisticRegressionCV, SVC, CalibratedClassifierCV, PassiveAggressiveClassifier, LabelPropagation, LabelSpreading, RandomForestClassifier, GradientBoostingClassifier, QuadraticDiscriminantAnalysis, HistGradientBoostingClassifier, RidgeClassifierCV, RidgeClassifier, AdaBoostClassifier, ExtraTreesClassifier, KNeighborsClassifier, BaggingClassifier, BernoulliNB, LinearDiscriminantAnalysis, GaussianNB, NuSVC, DecisionTreeClassifier, NearestCentroid, ExtraTreeClassifier, CheckingClassifier, DummyClassifier, etc.

Figure 15:
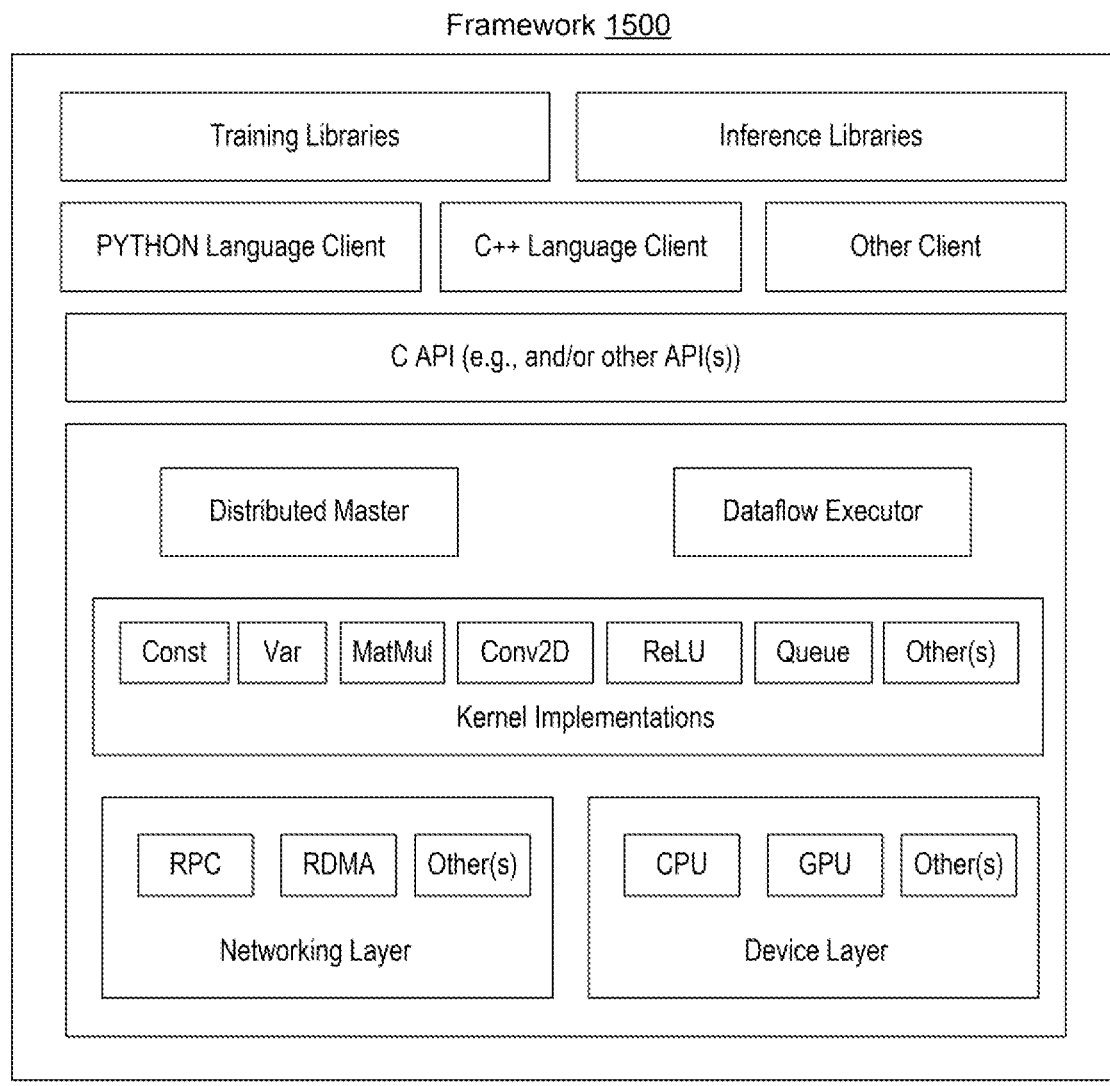
FIG. 15 illustrates an example of a framework.

FIG. 15 shows an architecture 1500 of a framework such as the TENSORFLOW framework. As shown, the architecture 1500 includes various features. As an example, in the terminology of the architecture 1500, a client can define a computation as a dataflow graph and, for example, can initiate graph execution using a session. As an example, a distributed master can prune a specific subgraph from the graph, as defined by the arguments to "Session.run( )"; partition the subgraph into multiple pieces that run in different processes and devices; distributes the graph pieces to worker services; and initiate graph piece execution by worker services. As to worker services (e.g., one per task), as an example, they may schedule the execution of graph operations using kernel implementations appropriate to hardware available (CPUs, GPUs, etc.) and, for example, send and receive operation results to and from other worker services. As to kernel implementations, these may, for example, perform computations for individual graph operations.

Figure 16:
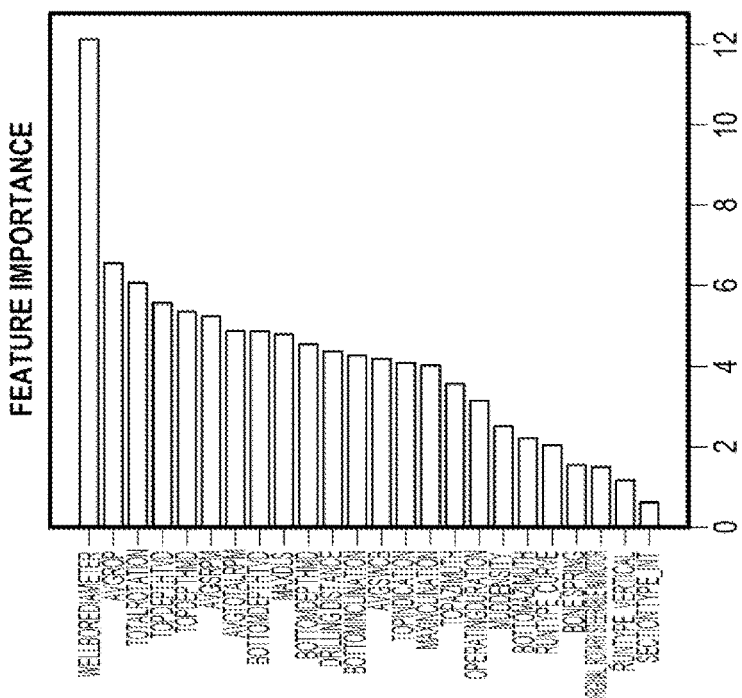
FIG. 16 illustrates an example of a graphical user interface.
Figure 16:
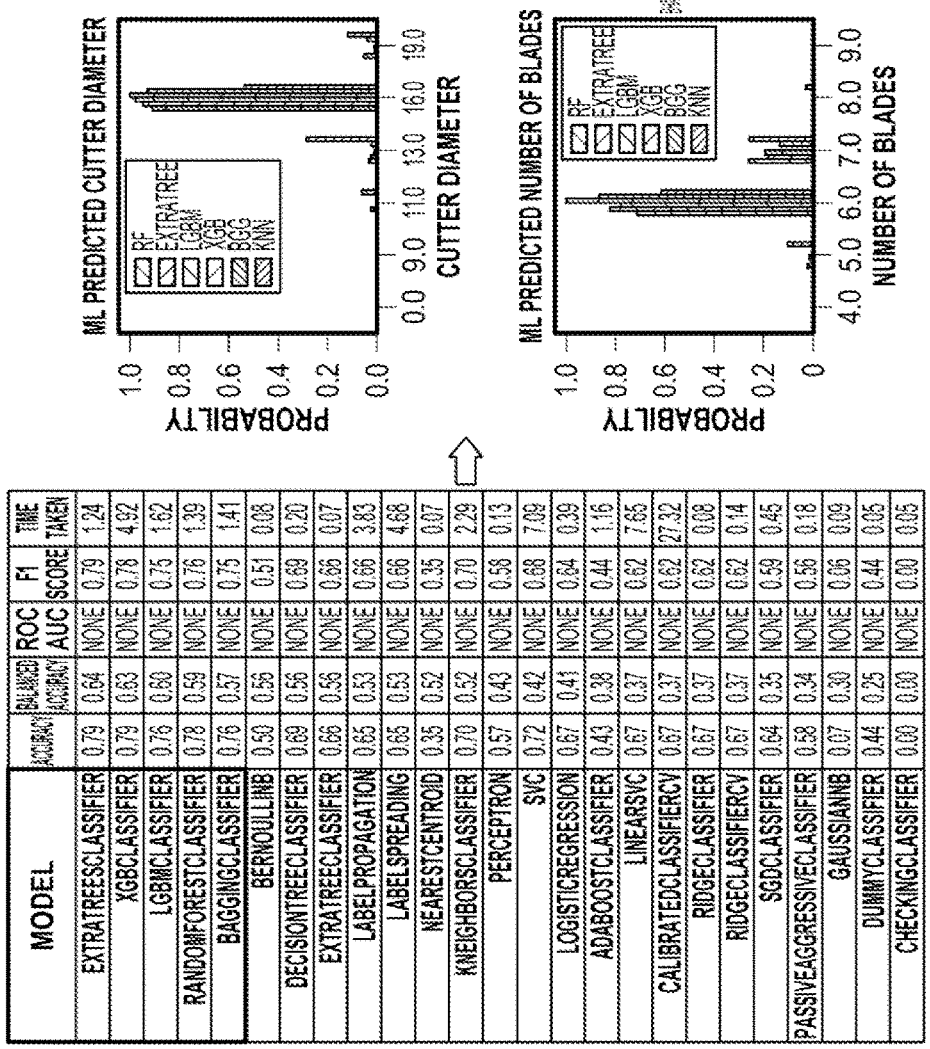

FIG. 16 shows an example of a GUI 1600 that includes a listing of ML models (e.g., an ensemble, etc.) where a top five of the ML models can be selected, for example, using one or more metrics (e.g., accuracy, balanced accuracy, ROC AUC, F1 score, time taken, etc.). As shown, the top five include an ExtraTreesClassifier, an XGBClassifier, an LGBMClassifier, a RandomForestClassifier, and a BaggingClassifier where accuracy is at 0.76 or greater (BGG: BaggingClassifier, ExtraTree: ExtraTreesClassifier, KNN: KNeighborsClassifier, LGBM: LightGBMClassifier, RF: Random ForestClassifier, XGB: XGBoostClassifier). The GUI 1600 shows plots of predicted cutter diameter and predicted number of blades for the top five plus a KNN ML model where the plots show probability versus the feature. The GUI 1600 further shows a listing of features with respect to "importance" where "importance" refers to a relative importance with respect to other features. As shown, the wellbore diameter has the highest relative importance.

Figure 17:
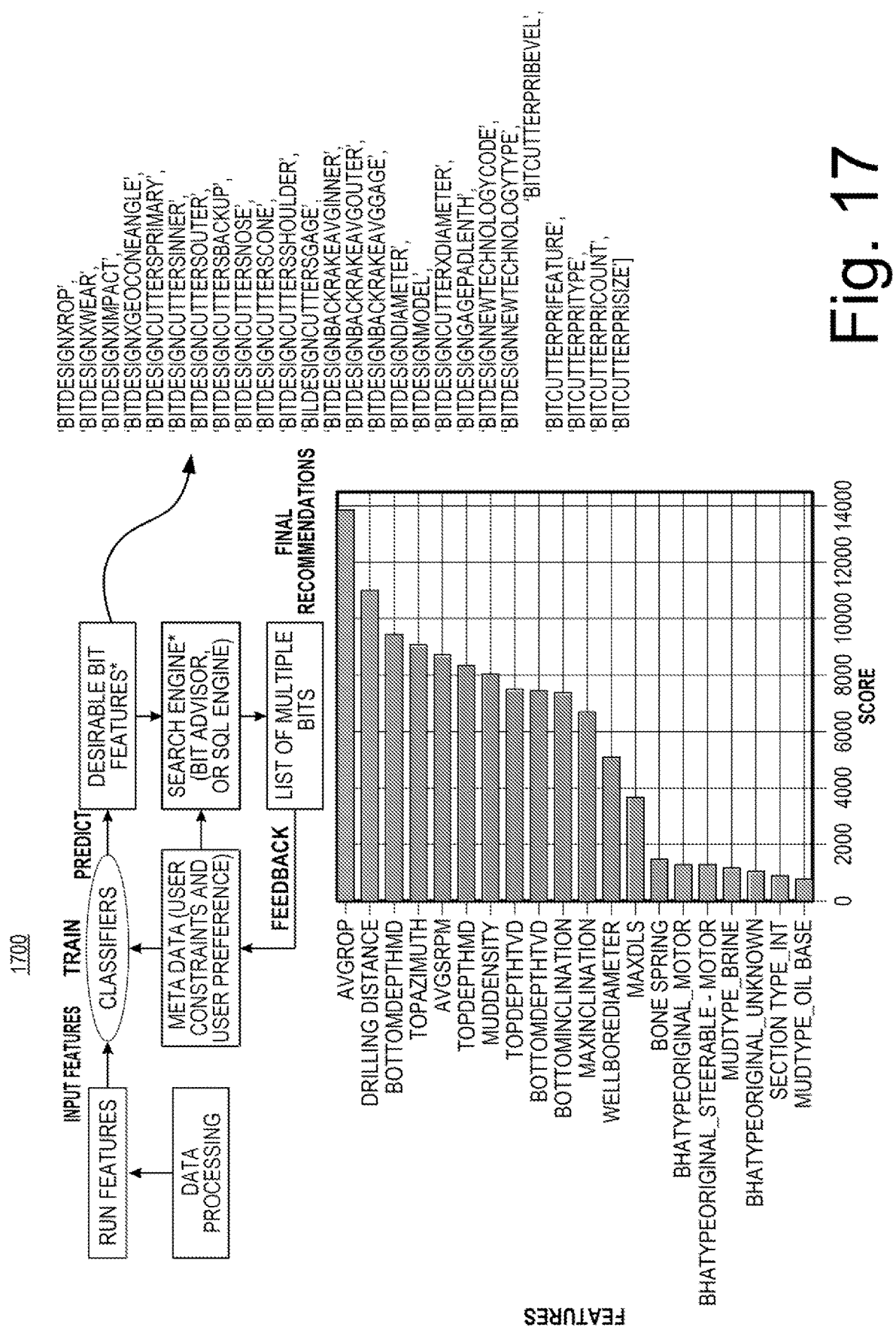
FIG. 17 illustrates an example of a system.

FIG. 17 shows an example of a system 1700 that can include one or more features of the example system 1400 of FIG. 14. As shown, classifiers can be ML models that can be trained using run features and run data as may be in one or more databases. The system 1700 can output desirable bit features and through utilization of a search engine output a set of recommended bits.

As explained, models can use run characteristics as input features and can be trained with historical run data. Each of these models can be utilized to predict, for example, a single bit feature such as the number of blades. Once predictions are generated for each of the desirable bit features, a search engine (e.g., SQL, etc.) can search through one or more bit design catalogs to arrive at a list of specific bit designs which have the desirable bit features.

As an example, a system can include features such that a user can input constraints and user preferences before displaying the bits. For example, consider one or more of available inventory of a given bit design, cost of bit design, client preference for bit technologies (example: Client A dislikes StingBlade designs and likes AxeBlade designs), other desirable bit features (example: Client B has a strong preference for 6-bladed bit designs), etc.

Figure 18:
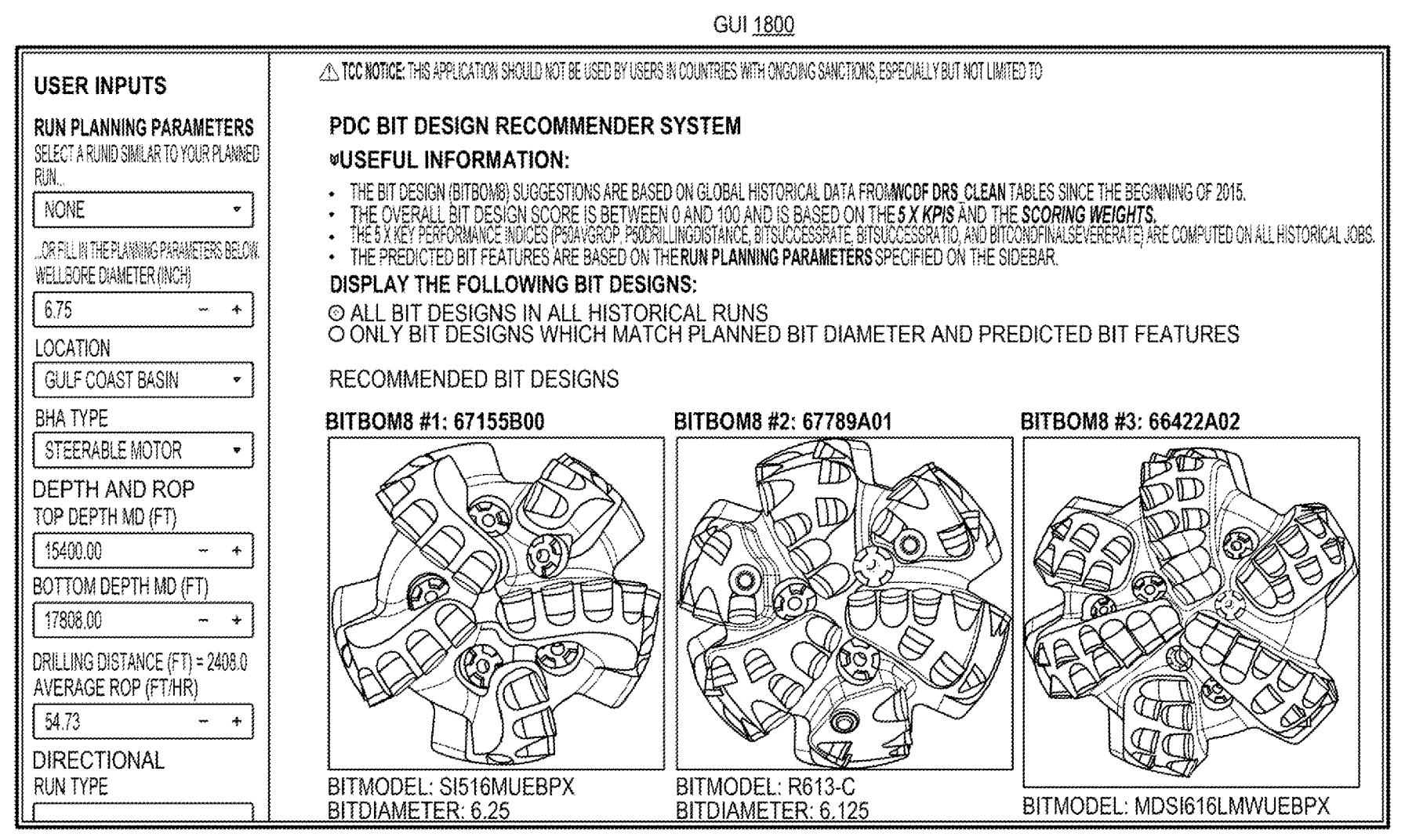

FIG. 18 shows an example of a GUI 1800 that can provide for interactions with a PDC bit design recommender system. For example, consider various user inputs that may be part of a planning workflow, which may be for a section of a well that is to be drilled where drilling operations may be underway at the well.

Figure 19:
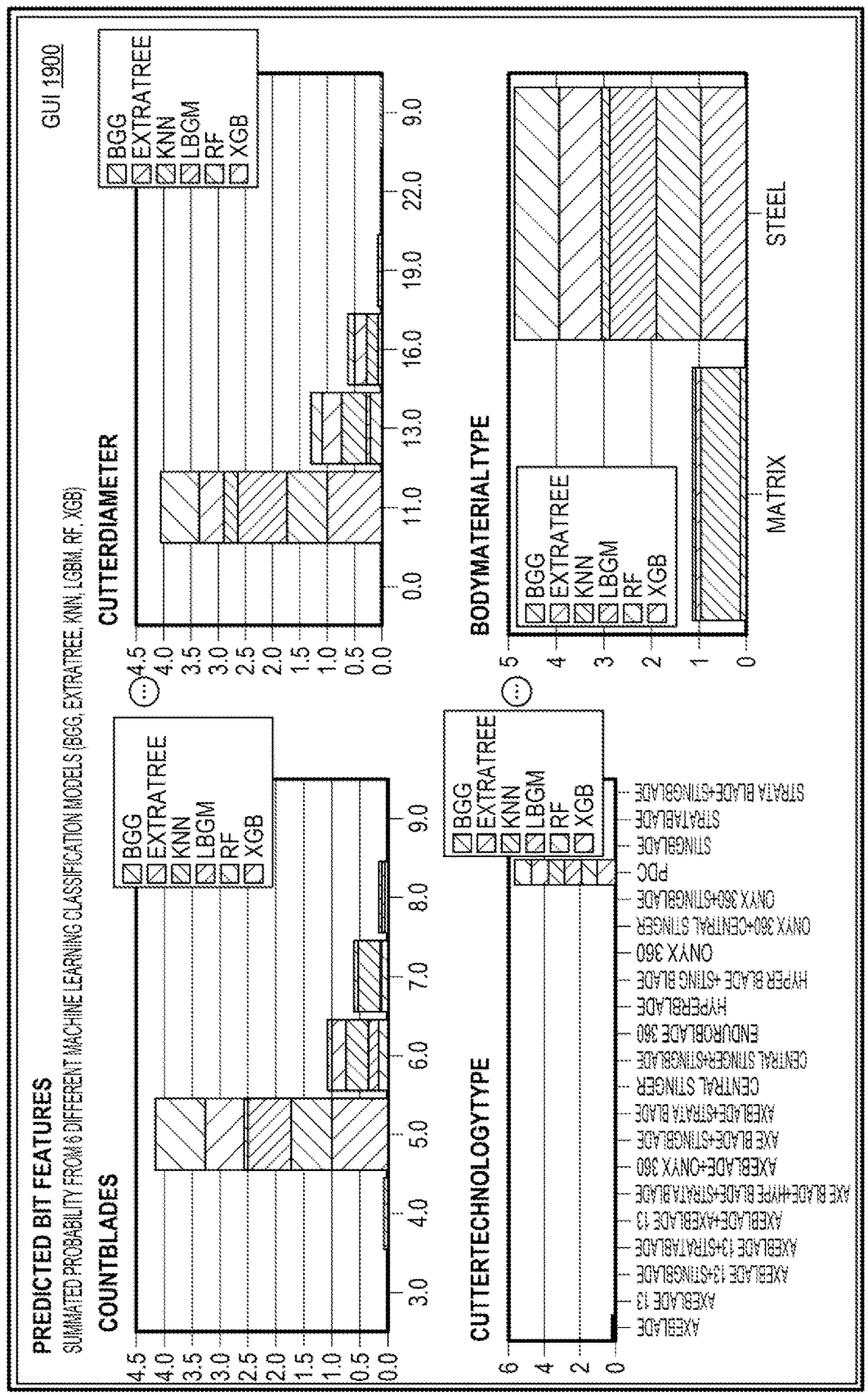
FIG. 19 illustrates an example of a graphical user interface.

FIG. 19 shows an example of a GUI 1900 that can provide for interactions with a bit recommender system. As shown, the GUI 1900 includes graphics that correspond to ML models and predicted features. In such an approach, a user may hover and/or select a portion of a graphic such that a model and/or model information is rendered to a display. In the example of FIG. 19, graphics are shown for features including blade count, cutter diameter, cutter technology type and body material type.

As explained, a drillstring can include a motor, which may be referred to as a motor power section. As an example, a system can be or include a motor power section recommender. As an example, a motor can be a mud motor drive by drilling fluid (mud) where a system can be or include a drilling fluid recommender, which may be selectively utilized, for example, in combination with one or more of bit and motor power section recommenders.

Figure 20:
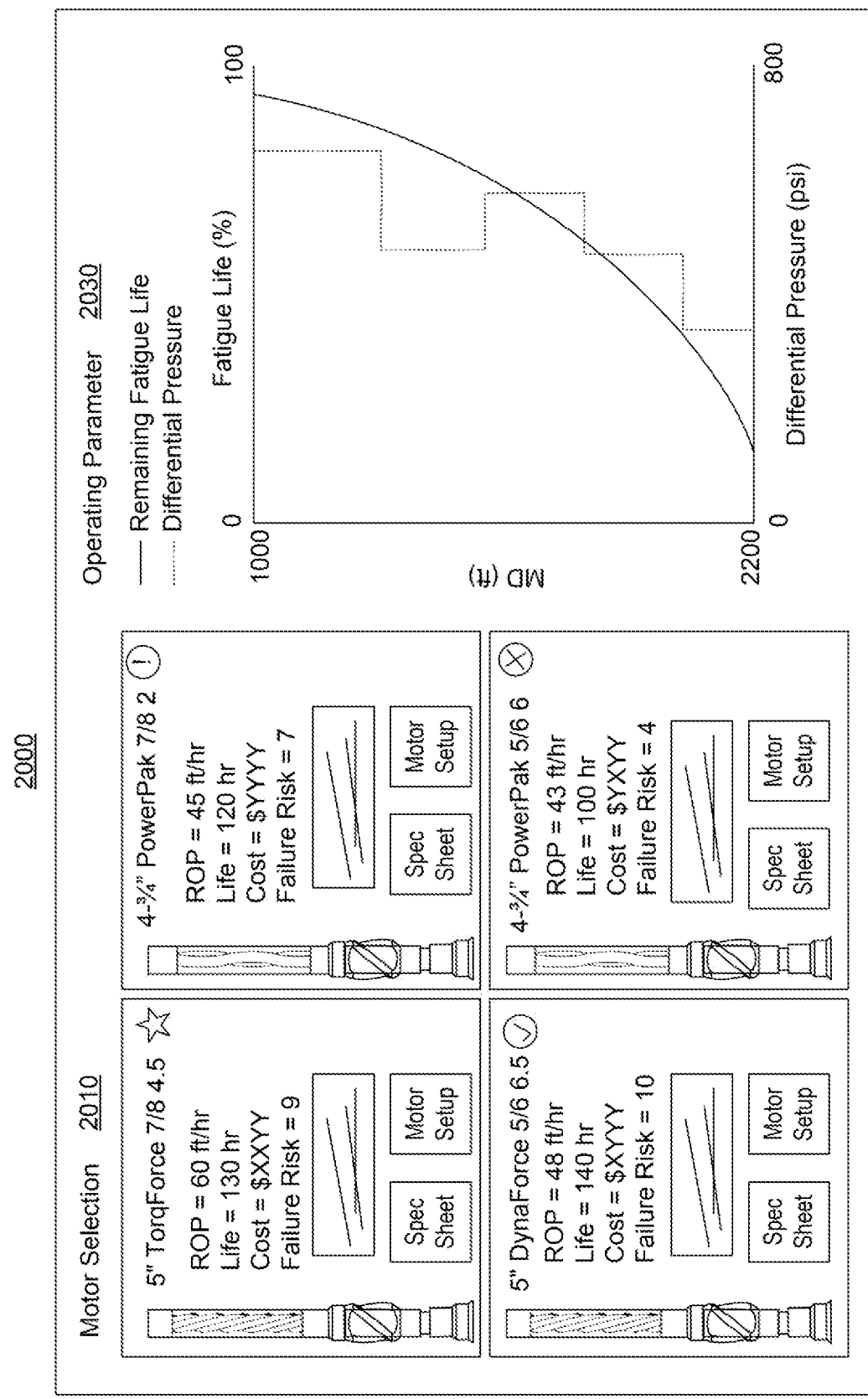
FIG. 20 illustrates an example of a graphical user interface.

FIG. 20 shows an example of a GUI 2000 that includes motor power sections 2010 and operating parameter information 2030. As an example, a recommender system may generate recommended motor power sections and/or rate/rank motor power sections.

Figure 21:
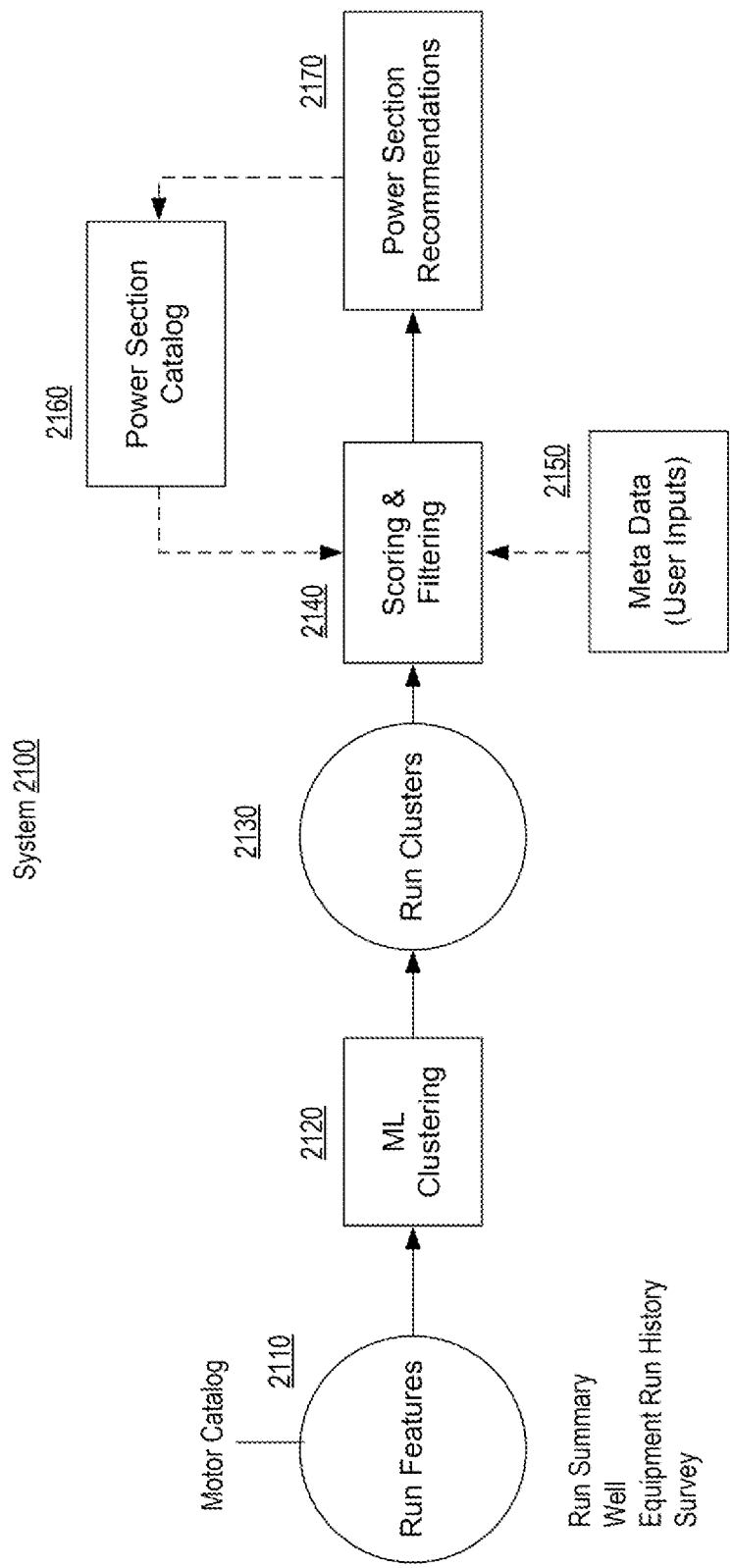
FIG. 21 illustrates an example of a system.

FIG. 21 shows an example of a system 2100 that includes ML model clustering technology. As shown, in a run features component 2110, motor catalog data may be associated with QTRAC features (e.g., data may be acquired and stored for drilling runs where such data can include time series data that may be received and analyzed, etc.). In a ML clustering component 2120, clustering may be performed, which may utilize unsupervised learning to train one or more ML models. In a run clusters component 2130, one or more trained ML models may be utilized to identify run clusters for a proposed drilling run. In such an example, a GUI may be rendered that allows a user to visualize run clusters, which can include interaction, investigation, etc., as to one or more runs. Such a GUI may include a map that shows where runs as in a run database were performed. Through a user input component 2150, a user may input and/or select information that can be utilized by a scoring and filtering component 2140 that can utilize power section information 2160 to generate one or more power section recommendations 2170.

Figure 22:
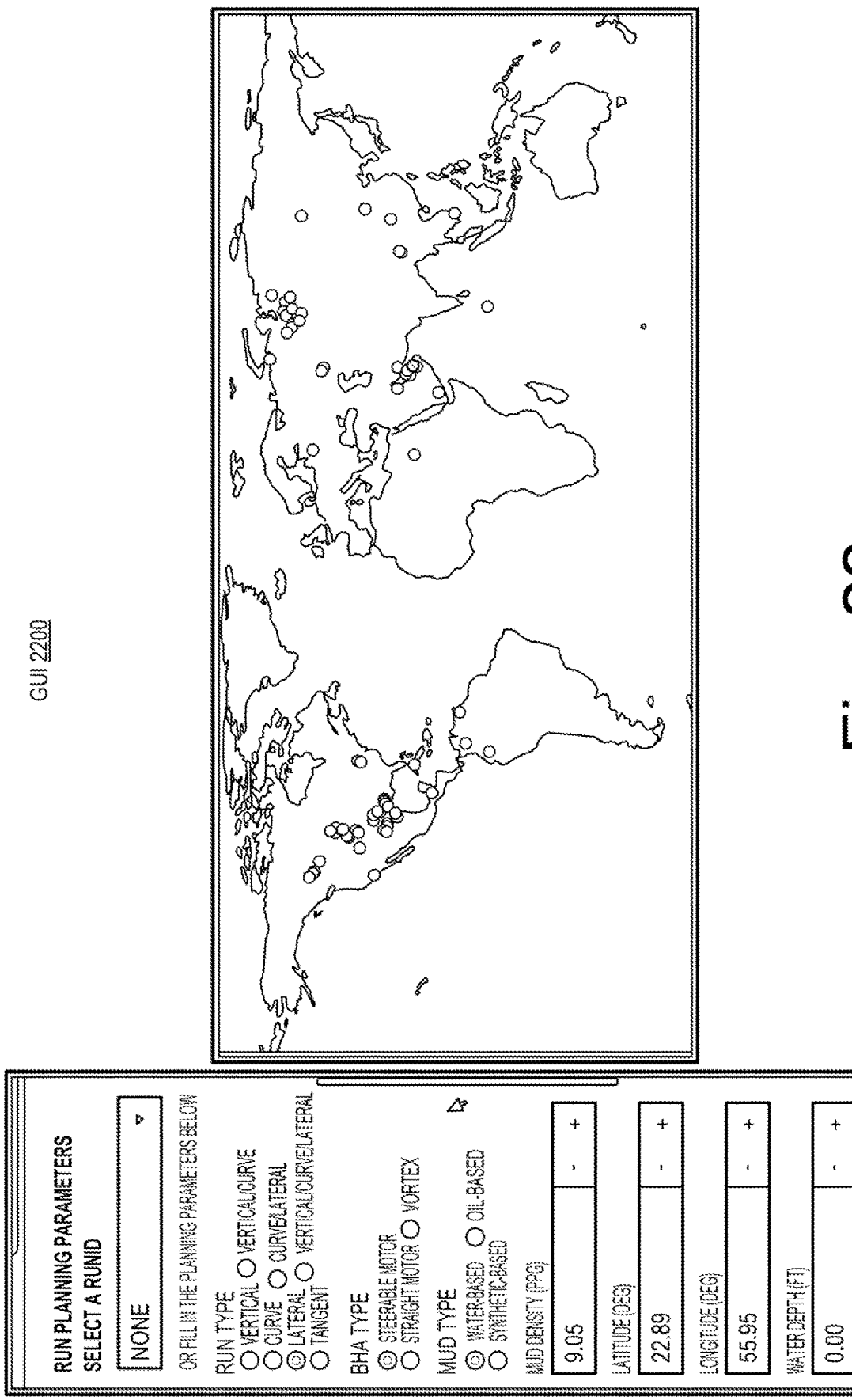
FIG. 22 illustrates an example of a graphical user interface.

FIG. 22 shows an example GUI 2200 that includes a map with location information for prior runs (e.g., offset well runs, etc.) where the GUI 2200 may indicate, for example: "The planned run is similar to 884 previous runs". As shown, the GUI 2200 can include various graphical controls that can allow a user to select, adjust, etc., various inputs such as, for example, run planning parameters. In the GUI 2200, fields are included for run type (e.g., lateral selected), BHA type (e.g., steerable motor selected), mud type (e.g., water-based selected from options of water-based, oil-based and synthetic-based), mud density (e.g., 9.05 PPG), latitude, longitude, water depth, etc. In the GUI 2200, above the map are various parameters for a listing of motor power sections (e.g., 6.75, 7/8, 6.8, etc.). Such parameters may be accompanied by graphics, for example, as shown in the GUI 2000 of FIG. 20.

Figure 23:
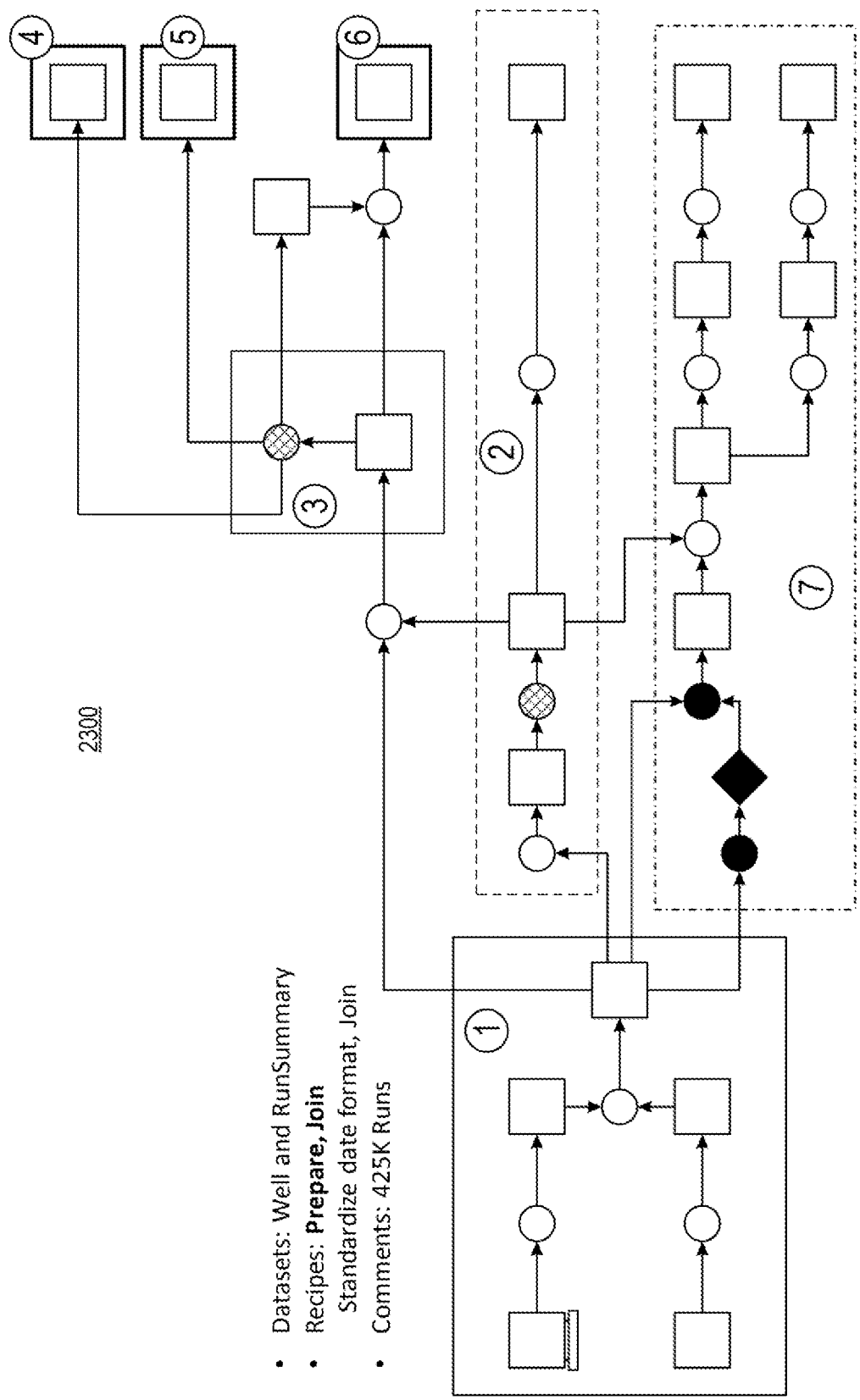
FIG. 23 illustrates an example of a system.

FIG. 23 shows an example of a system 2300 that can be organized as a workflow. The system 2300 may utilize various DATAIKU framework features (e.g., AI, machine learning, etc.). In the DATAIKU framework, datasets appear as blue squares with an icon in the center of each square that represents the type of dataset. For example, an upward pointing arrow indicates that the dataset was uploaded where two cubes represent AMAZON S3 where an elephant represents HDFS. In the DATAIKU framework, visual recipes appear as yellow circles where an icon inside of the visual recipe indicates the type of recipe. For example, a broom icon represents a prepare recipe; a funnel represents a filter recipe; and a pile of squares represents a stack recipe. In the DATAIKU framework, processes related to machine learning are shown in green where a barbell represents a model training event; a scatter plot represents model scoring; and a trophy shows an application of the model to a new dataset. In the DATAIKU framework, code recipes are represented by orange circles where an icon inside a circle indicates the programming language of the recipe. For example, a two snakes logo represents a PYTHON recipe, and a honeycomb icon represents a HIVE recipe.

In the system 2300, various blocks are identified using numerals 1, 2, 3, 4, 5, 6 and 7 within circles, which represent various process blocks along various workflows of the system 2300. As to the block labeled 1, it represents an initial dataset. As to the block labeled 2, it represents mapping of equipment configurations to unique codes. In the example of FIG. 23, the squares are datasets, which may be AZURE platform datasets. In the block labeled 7, two circles and one rotated square are filled in black and represent machine learning components and/or actions. In the blocks labeled 2 and 3, cross-hatched circles represent code recipes.

Figure 24:
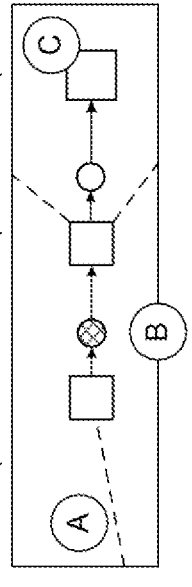
FIG. 24 illustrates examples of portions of a system.

FIG. 24 shows examples of portions 2400 of the system 2300 where the portions 2400 pertain to power section configurations, along with programming commands in PYTHON. In the example of FIG. 24, the block labeled 2 in FIG. 23 is broken into components and actions labeled A, B and C within circles. As shown, action A can include grouping, action B can include executing script (e.g., code), and action C can include outputting a dataset such as, for example, a data table for configurations.

The system 2300 may be utilized to recommend one or more components of a bottom hole assembly (BHA), one or more drilling fluids, etc., for a planned run. As explained, the system 2300 can process historical runs. Then, for the processed runs, equipment and/or fluids that have been used on historical runs can be ranked in terms of performance. In such an approach, performance may be ranked in one or more manners, for example, consider ranking based on the average overall run ROP for the runs. In such an approach, a planned run may be assigned to a cluster and the system 2300 can return a list of ranked items (e.g., historical objects, etc.).

Figure 25:
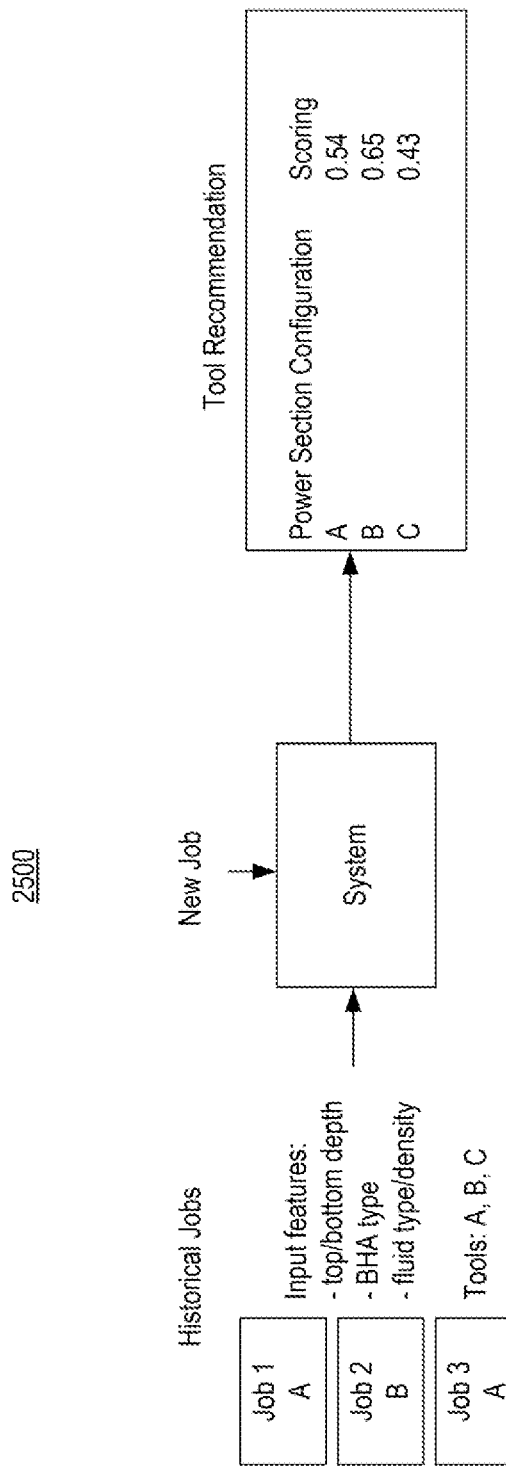
FIG. 25 illustrates an example of a system.

FIG. 25 shows an example of a system 2500, which is illustrated with various workflow arrows. As shown, data from historical jobs (e.g., runs) can be input or otherwise received by a knowledge system (e.g., a ML framework, etc.), where data as to a new job (e.g., a proposed run, etc.) can be received. As shown, the system 2500 can output equipment recommendations, which may be, for example, ranked (e.g., scored, etc.).

As an example, a workflow can include importing data (e.g., run ID, drilling parameters, power section info, etc.), selecting features, performing data cleaning, feature engineering (e.g., encode categorical, standardization of numerical values, etc.), splitting into a test set and a training set, performing unsupervised learning on the test set (e.g., k-means, etc., to cluster similar jobs), checking individual jobs, and validation (e.g., for automation, etc.).

As to k-means for clustering, it can aim to partition a number of observations into a number of clusters, which can be represented by a parameter, k. In such an approach, each observation belongs to a cluster with the nearest mean (e.g., cluster center or cluster centroid) to minimize within-cluster variances (e.g., squared Euclidean distances). K-means clustering can be implemented in an unsupervised manner. K-means clustering can utilize a set of observations where each observation is a d-dimensional real vector where partitioning occurs to place the observations into k sets so as to minimize the within-cluster sum of squares (WCSS). K-means, as with one or more other clustering techniques, can compute feature distances in one or more dimensions of a feature space or feature spaces. For example, a method can include processing historical feature data by computing feature distances where such feature distances can characterize the historical feature data (e.g., as to similarity, etc.). K-means clustering can commence with an assignment that assigns each observation to a cluster with the nearest mean and then proceed to update, which re-computes means (e.g., centroids) for the observations assigned to each cluster. Such an approach can proceed iteratively until assignments do not change. As an example, an elbow technique may be implemented to find an optimal value for k, the number of clusters. The elbow technique may be implemented using one or more frameworks (e.g., consider the scikit-learn framework) where the KElbowVisualizer implements the elbow technique to help fine an optimal number of clusters by fitting a model with a range of values for k. In such an approach, if a line chart resembles an arm, then the elbow (the point of inflection on the curve) can be an acceptable indication that the underlying model fits best at that point.

As an example, k-means and/or other clustering can utilize a distance in a feature space such as Euclidean distance as a metric for a feature space along with, for example, variance as a measure of cluster scatter in a feature space. In a k-means approach, the number of clusters k is an input parameter where an inappropriate choice of k may yield poor results, which may be addressed by running diagnostic checks for determining an appropriate number of clusters in a dataset.

As explained, a system can receive information pertaining to a new job (e.g., a new run, etc.), where the system can automatically generate a set of recommended power section features (e.g., power section configurations). Such features may include, for example, size, lobe, stage, etc., optionally in an order of expected performance.

As explained, a workflow can include data engineering to import and prepare the data; exploratory analysis to extract meaningful insights and understand the features that feed the system; training a ML model or models to create a trained model or model (as learned from data); validating results, for example, on individual jobs.

As an example, a system may access a database or databases with hundreds, thousand, hundreds of thousands, etc., of runs. Run and well summaries can provide information such as distance and duration, tool choices, location and average performance output as ROP. As explained, data cleansing can be performed, which may facilitate unsupervised machine learning (e.g., consider outlier detection, range feasibility and outlier, standardization important for distance based algorithms).

As an example, a workflow can include feature engineering and data analysis. For example, consider generation of labels for power section configurations such as stage/size/lobes that appear in a dataset. As an example, statistical analysis and graph visualization may be utilized to reveal that out of hundreds of possible configurations, 80 percent of the jobs use less than 30 configurations. Out of a large proportion of data covered by QTRAC data, a large scale insight can be obtained for rationalization and improvement.

As to machine learning, appropriate choices can reduce computational time and provide focus. For example, when a system receives a new run, the system may compare it with past jobs and based on output performance to recommend a list of power section configuration choices. Rather than comparing with every single job (e.g., computationally expensive when processing millions of data), a ML approach can aggregate similar jobs. As an example, a system may employ unsupervised learning for purposes of clustering (e.g., consider k-means, etc.). A clustering approach may implement a distance-based algorithm that tries to partition the data into several predefined distinct non overlapping subgroups (e.g., consider "k" as being a number of predefined subgroups). A system can provide for drilling run characterization and creating profiles of similar runs that can be distinct from others.

The aforementioned k-means approach can be implemented as a centroid based algorithm that can scale linearly with the number of examples. As an example, a system may utilize multiple ML models, for example, consider mini-batch, which has some features of k-means but uses subsets of datasets, which can be helpful when handling a huge amount of data. Agglomerative is hierarchical clustering that merges points based on their proximity (e.g., suited for taxonomies). Interactive is a combination of k-means and agglomerative. DBSCAN connects areas of high density into clusters and leaves noise or outliers on a background cluster. For complicated geometries of data, spectral clustering in a similar manner of support vector machines with a kernelized k-means uses nearest neighbor to compute higher dimensional representation of the data and find relations.

In a trial, a system was trained using 80 percent of an initial dataset using preplanned features on 50K runs. Features included: 'WellboreDiameter', 'SectionType', 'BottomAzimuth', 'Topinclination', 'BHAType', 'MudType', 'TopDepthMD', 'L5GeoMarketCode', 'TopDepthTVD', 'TopAzimuth', 'MudDensity', 'BottomDepthTVD', 'Bottom Inclination', 'RunType', 'BottomDepthMD', 'MaxDLS'.

To decide the "k" number of these clusters, a subproblem was formulated. To determine the optimal number of clusters, the training proceeded with different number of clusters and checking against inertia metric performance which is the sum of square distances from each point to its assigned center. As the number of clusters increases, the sum of squared distance tends to zero. An optimal "k" or cluster number can be chosen using an "elbow", which can be defined as the point after which the inertia starts decreasing in a linear fashion. A method can include labeling and assigning each run to its cluster followed by grouping them by configurations and ranking each configuration linked to an average ROP performance metric (e.g., as a selected metric, etc.).

For purposes of testing/validating, the remaining 20 percent of the dataset was utilized. In a test phase, a user can choose one run ID and the ML model can predict the cluster with similar jobs. As an example, a table of available power section configurations may be automatically generated and show the suggested ones with the average expected score.

For validating, a method can include checking whether the power section configuration used historically for specific jobs appears in the list and how close is the expected average ROP to the one achieved. For the percentage of 26.62 percent of the runs tested, the configuration used historically is within the top 10 configurations suggested for better performance. Another 47.26 percent fall within the 10-20 ranking. Additionally, in the trial, the choice of a power section configuration that systematically appears in the top recommendations leads to a better drilling performance than an alternative one. The validation process demonstrates value in extending the approach/results to one or more other related aspects (e.g., inventory optimization, etc.).

As explained, an equipment framework (EF) can be implemented in combination with a framework such as the DRILLPLAN framework. As explained, an EF can include one or more graphical controls, fields, etc., for feedback. For example, consider a survey-based feedback, a star ranking, a numeric ranking, etc. In such an example, the feedback may be employed as an additional feature for recommendations. For example, where a particular company is using the EF, the feedback from users of that company may help to guide recommendations and/or provide additional information as to recommendations (e.g., how many stars, etc.). As an example, a feedback review can provide criteria that can be utilized in selecting one or more recommended pieces of equipment. Such criteria may include ROP, distance and pumping hours where a weighted combination may be utilized.

Figure 26:
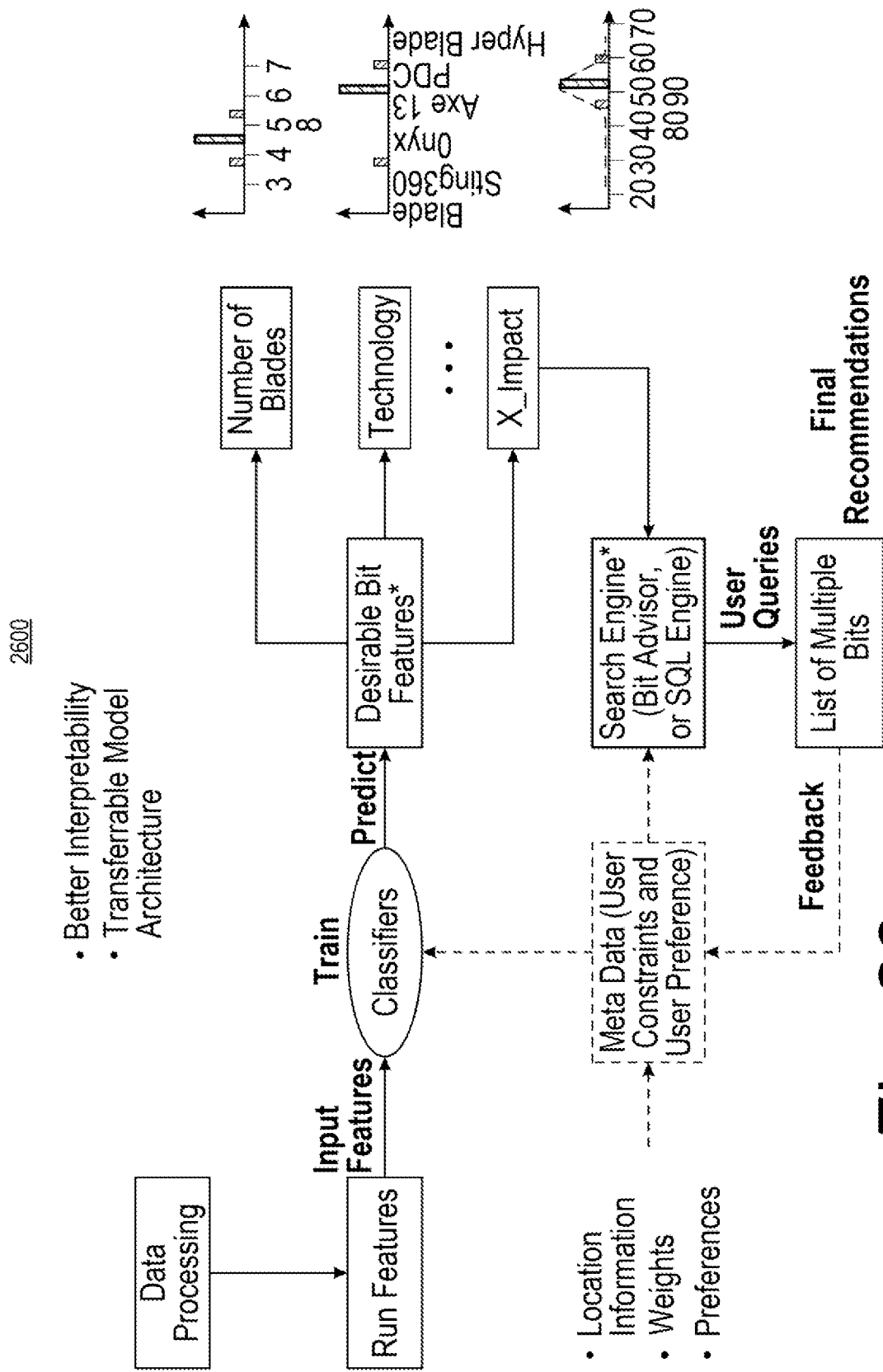
FIG. 26 illustrates an example of a system.

FIG. 26 shows an example of a system 2600 that can utilize content-based recommendation, extensibility of new data, etc. As shown, various types of output may be generated for various equipment features (e.g., bits, etc.).

Figure 27:
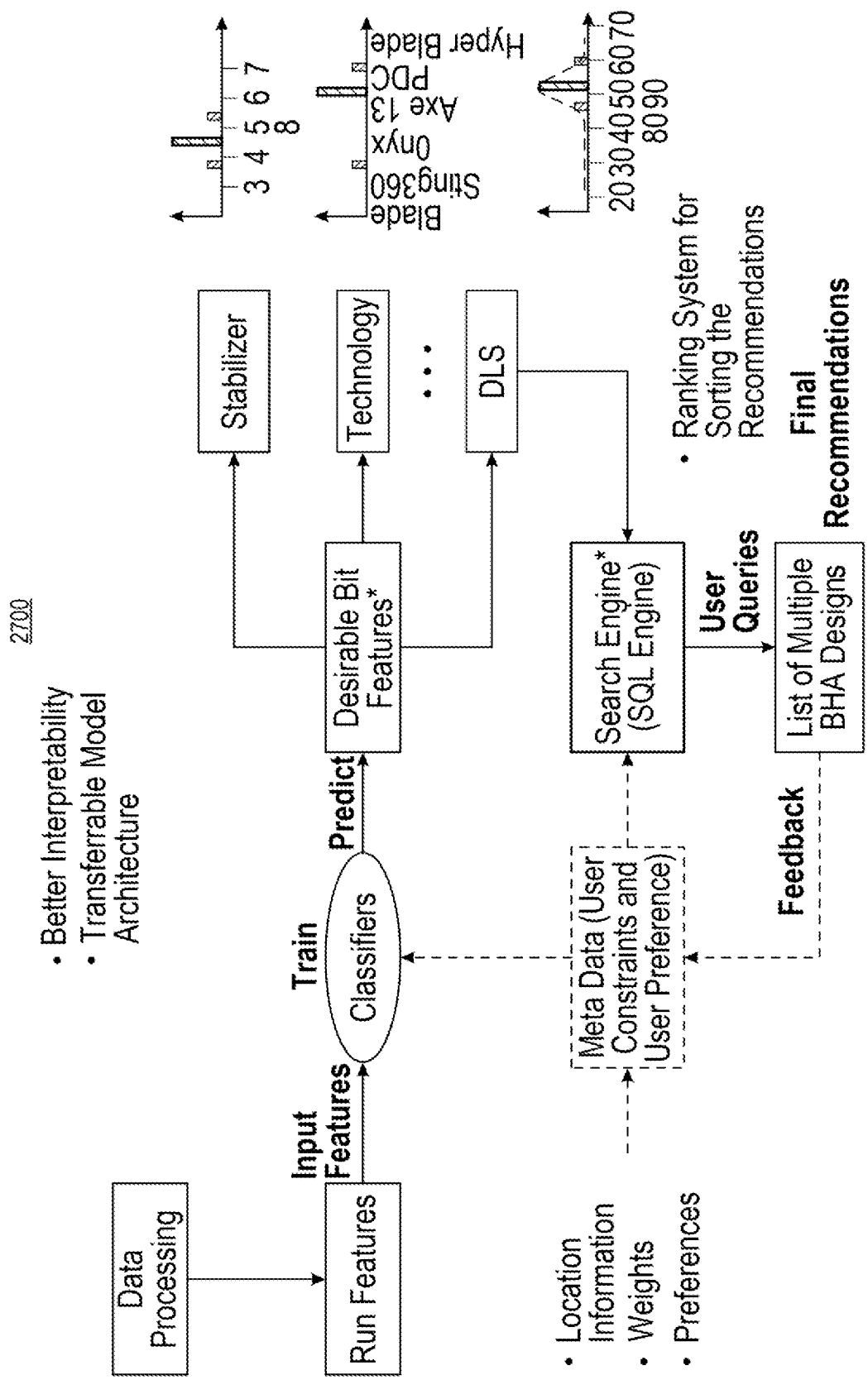
FIG. 27 illustrates an example of a system.

FIG. 27 shows an example of a system 2700 that can utilize content-based recommendation, extensibility of new data, etc. As shown, various types of output may be generated for various equipment features (e.g., BHA designs, etc.).

Figure 28:
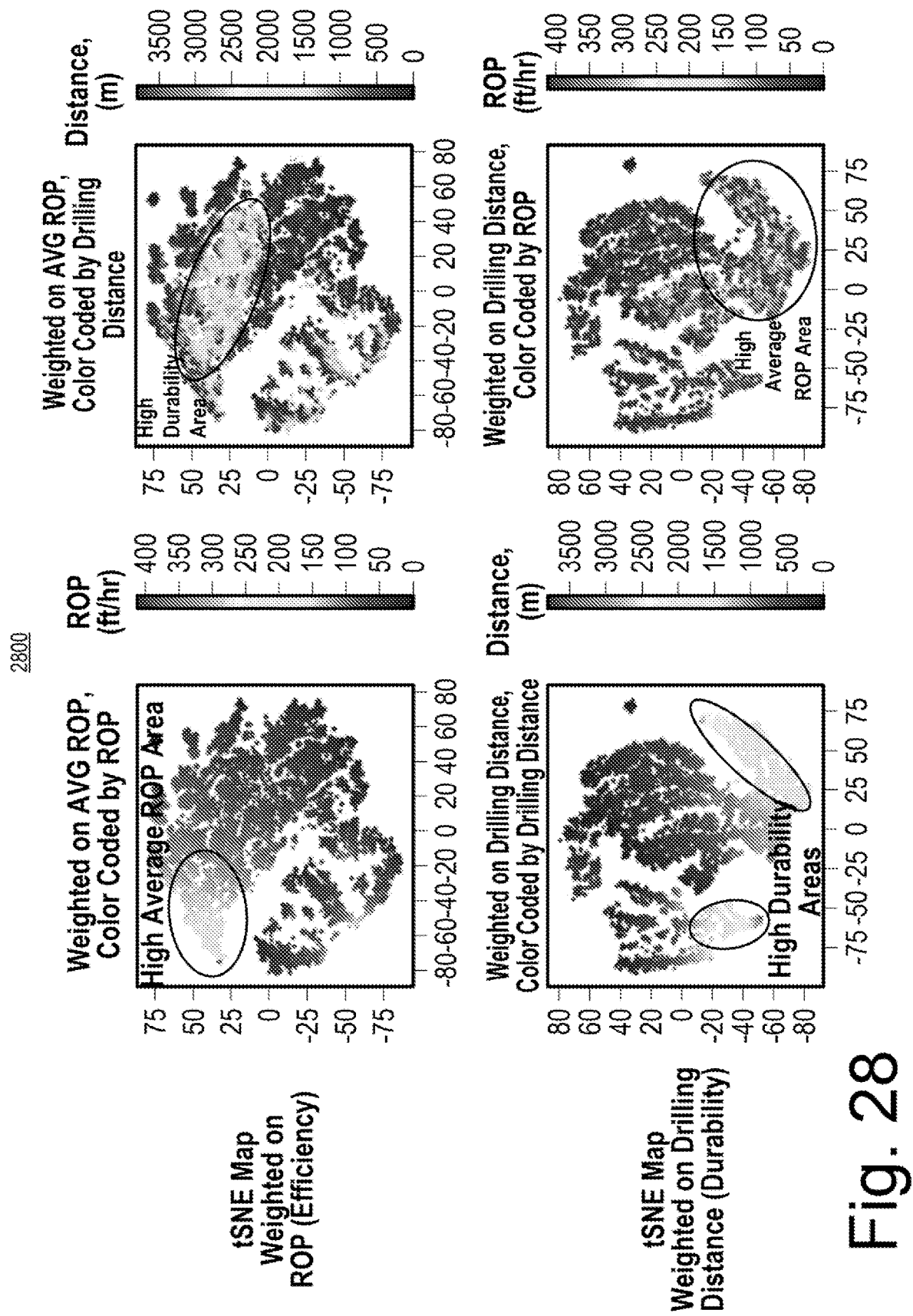
FIG. 28 illustrates an example of a graphical user interface.

FIG. 28 shows an example of a workflow 2800 that can provide for spatial analysis in a feature space. As shown, a tSNE (t-distributed stochastic neighbor embedding) can be utilized as a statistical approach that can facilitate analysis and visualization of high-dimensional data. In such an approach, each data point can be assigned a location in a multidimensional map. As shown, weighting may be with respect to ROP for understanding efficiency and may be with respect to drilling distance for understanding durability. In FIG. 28, regions can be identified with high average ROP and high durability.

Figure 29:
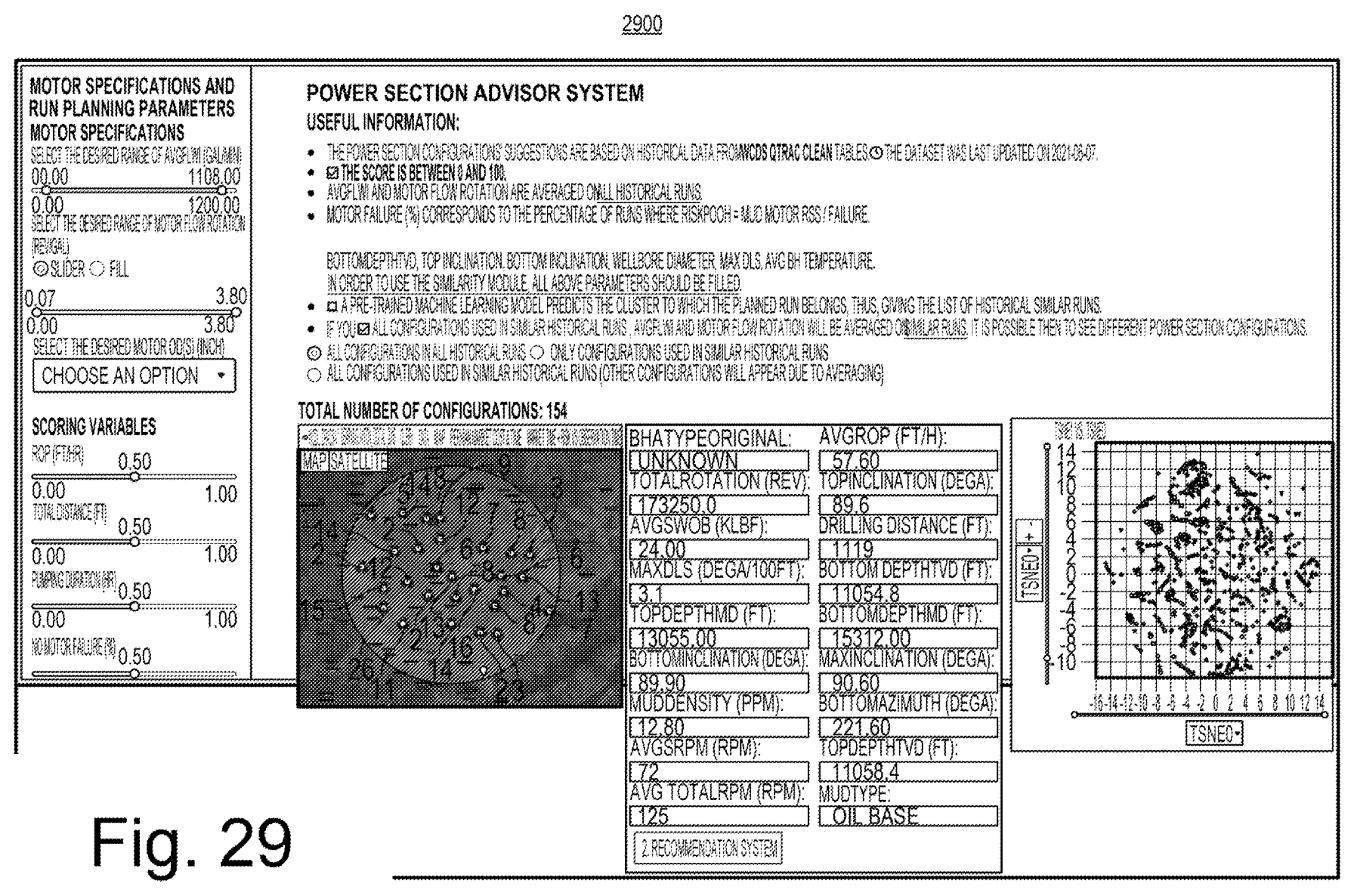

FIG. 29 shows an example of a GUI 2900 that includes graphics as to a workflow that includes performing a radial search for offset wells based on a location, finding run similarity (e.g., using a ML model-based approach, a non-ML model-based approach, etc.), and finding run and well feature similarity using a tSNE (or t-SNE) approach. The GUI 2900 can be part of a power section advisor system that can recommend one or more pieces of equipment of a drillstring and/or one or more fluid systems.

Figure 30:
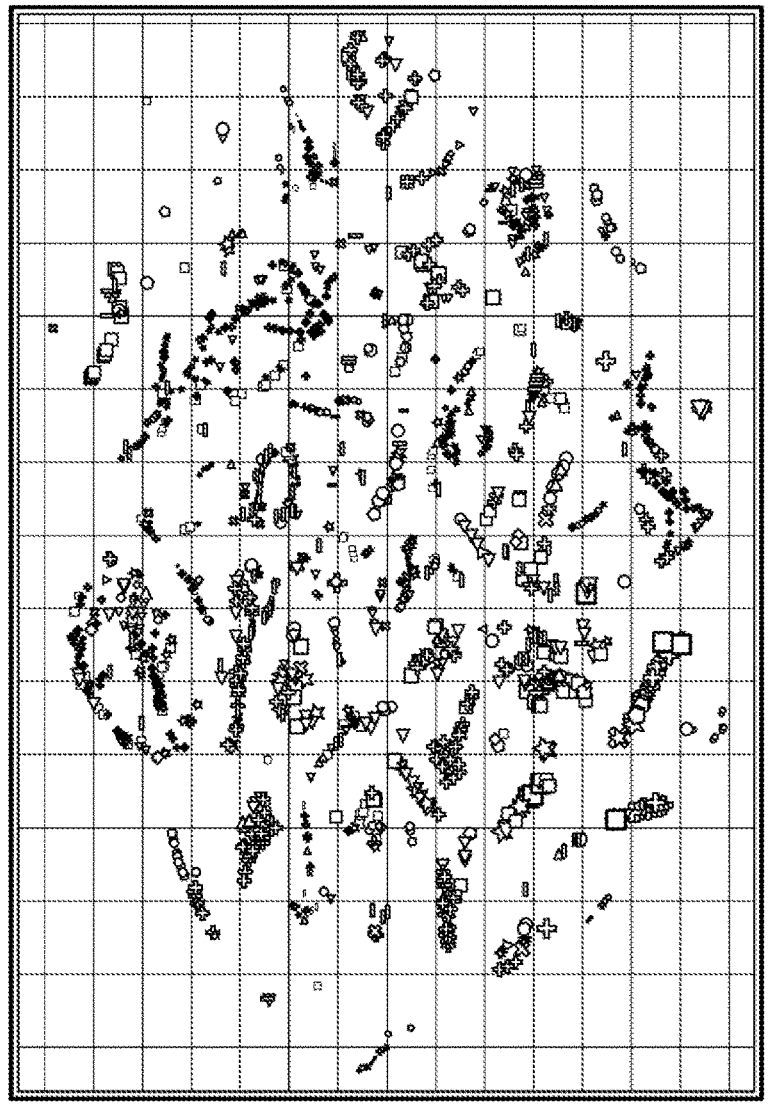
FIG. 30 illustrates examples of graphical user interfaces.

FIG. 30 shows an example of GUIs 3010 and 3030 for a tSNE approach applied to BHAs. The GUI 3030 shows a listing of various features of a BHA and the GUI 3010 shows a 2D projection of features. In such an example, color coding may be utilized for one or more purposes such as, for example, entities such as companies. The data in the GUI 3010 may be filtered based on one or more criteria.

Figure 31:
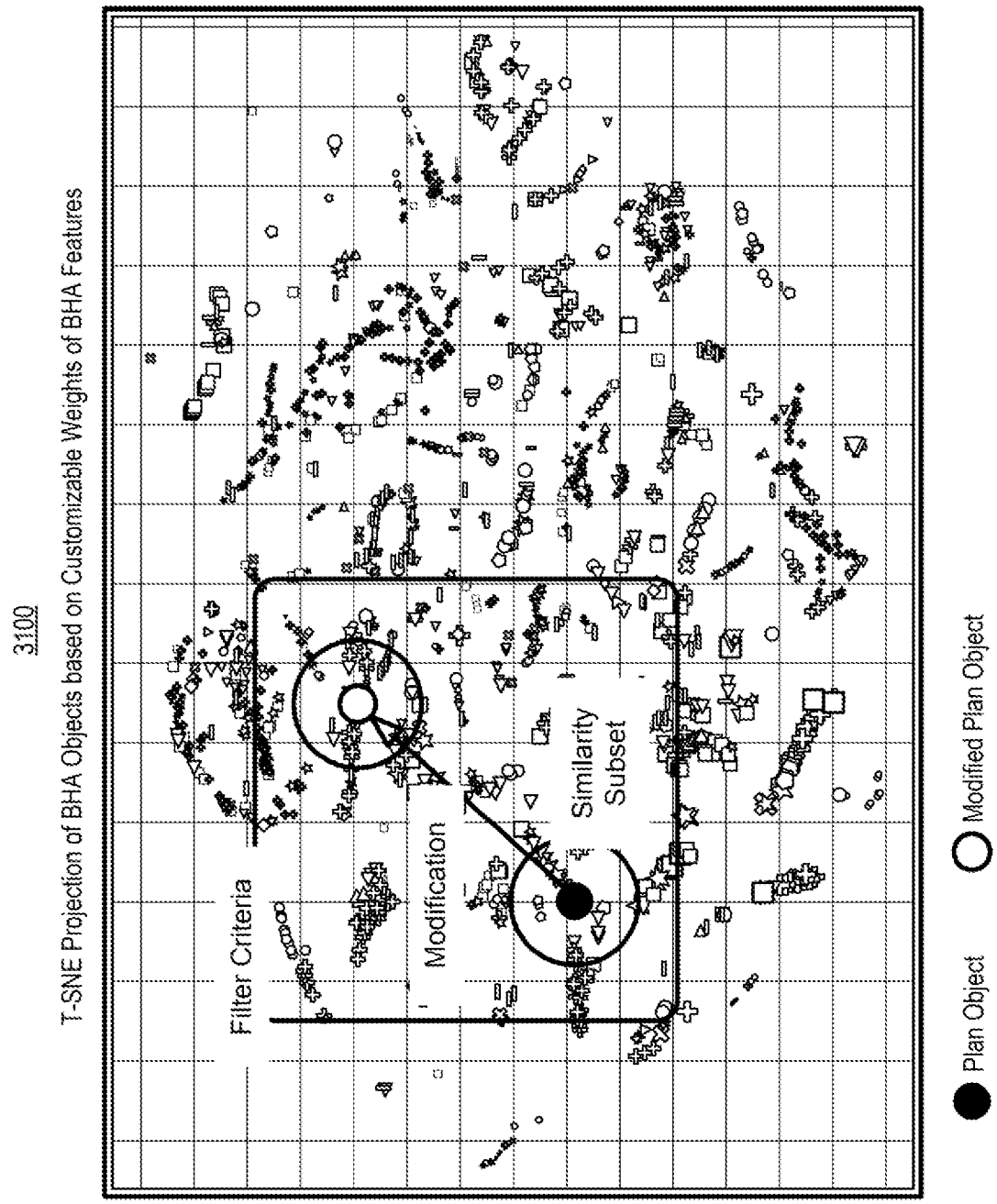
FIG. 31 illustrates an example of a graphical user interface and an example of a workflow.

FIG. 31 shows an example of a GUI 3100 where one or more filter criteria can be applied. As shown, an interactive modification may be performed using the GUI 3100. Specifically, the GUI 3100 shows a filter criteria region that encompasses the plan object, which is associated with a similarity subset. As explained, interactive modification can be performed such that a modified plan object is generated, which can be located within the filter criteria region and which can be associated with a similarity subset about the modified plan object.

As explained, various techniques can involve offset object selection, which can allow for calculation of an offset similarity index (OSI) for historical oilfield objects in a database (e.g., wells, intervals, drilling runs, etc.) and ranking historical oilfield objects by similarity with a planned target object. Such techniques can help to streamline offset well analysis, for example, in drill planning, which can improve relevancy, reliability, and accuracy.

Offset well analysis (OWA) can allow a drilling engineer, in a job planning phase, to review historical data associated with different drilling and related operations performed under similar conditions. Such information facilitates job planning and optimization. As an example, a system can provide for using techniques beyond filtering. For example, where filtering alone is utilized, similar wells, which are not in close proximity to the target, may be missed and not utilized or included in an analysis. Furthermore, searching for relevant offset wells can be a challenging iterative process that involves multiple attempts to apply different filters in different combinations. As an example, a system can include various techniques as tools that can extent functionality beyond filtering. As an example, a system can provide for ranking selected offset wells by similarity with a target well, which can indicate that some wells can be closer offsets than others such that they may provide more relevant and/or representative drilling information.

As explained, a system can utilize an offset similarity index (OSI) to improve relevancy, reliability, and accuracy of the offset well (or other object) analyses. As an example, a system can provide for offset interval (well section) analysis and drilling fluid recommendations and/or drilling equipment recommendations. Various types of oilfield objects, as wells, sections, drilling runs, drilling fluids, etc., can be ranked by similarity and various types of recommendations can be made (e.g., bits, mud motors, BHAs, drilling fluids, etc.).

With OSI values computed for historical objects in a database, a system can facilitate identification of relevant offset information. As an example, a threshold OSI value can be defined by a user to filter out irrelevant objects. As explained, a slider tool can be provided for OSI value selection that allows quick tuning of a value and checking the number of offset data objects for further analysis. As explained, the higher the selected OSI value, the smaller the returned number of pre-selected offset objects. As an example, a function can be generated and rendered to a display that indicates the number of offset objects as a function of OSI. A user may visualize such a graphic to understand how an OSI value can be utilized to narrow down a number of candidates for assessment and/or recommendation.

As an example, an OSI feature space and weighting factors can be fixed such that a user is not allowed to arbitrarily change them. In such an example, the OSI meaning will remain the same for different target object runs (with different input parameters), as the runs will result in different offset objects, yet with directly comparable OSI values.

As an example, a user can be allowed to select features and/or apply different weighting factors individually for each feature. Such an approach provides greater flexibility in finding the most relevant offset objects for a variety of conditions. However, such an approach makes OSI values feature and weighting factor dependent (e.g., lack of an ability to compare OSI across different feature spaces). For example, object similarity in just one feature (e.g., top depth) can be more relaxed than similarity in two features (e.g., top depth and bottom depth), as the addition of a new feature to the feature space reduces the degree of freedom and makes the OSI more restricted.

As an example, various filters can be optionally applied to the pre-selected offset objects, for example, to focus analysis on particular object properties.

Figure 32:
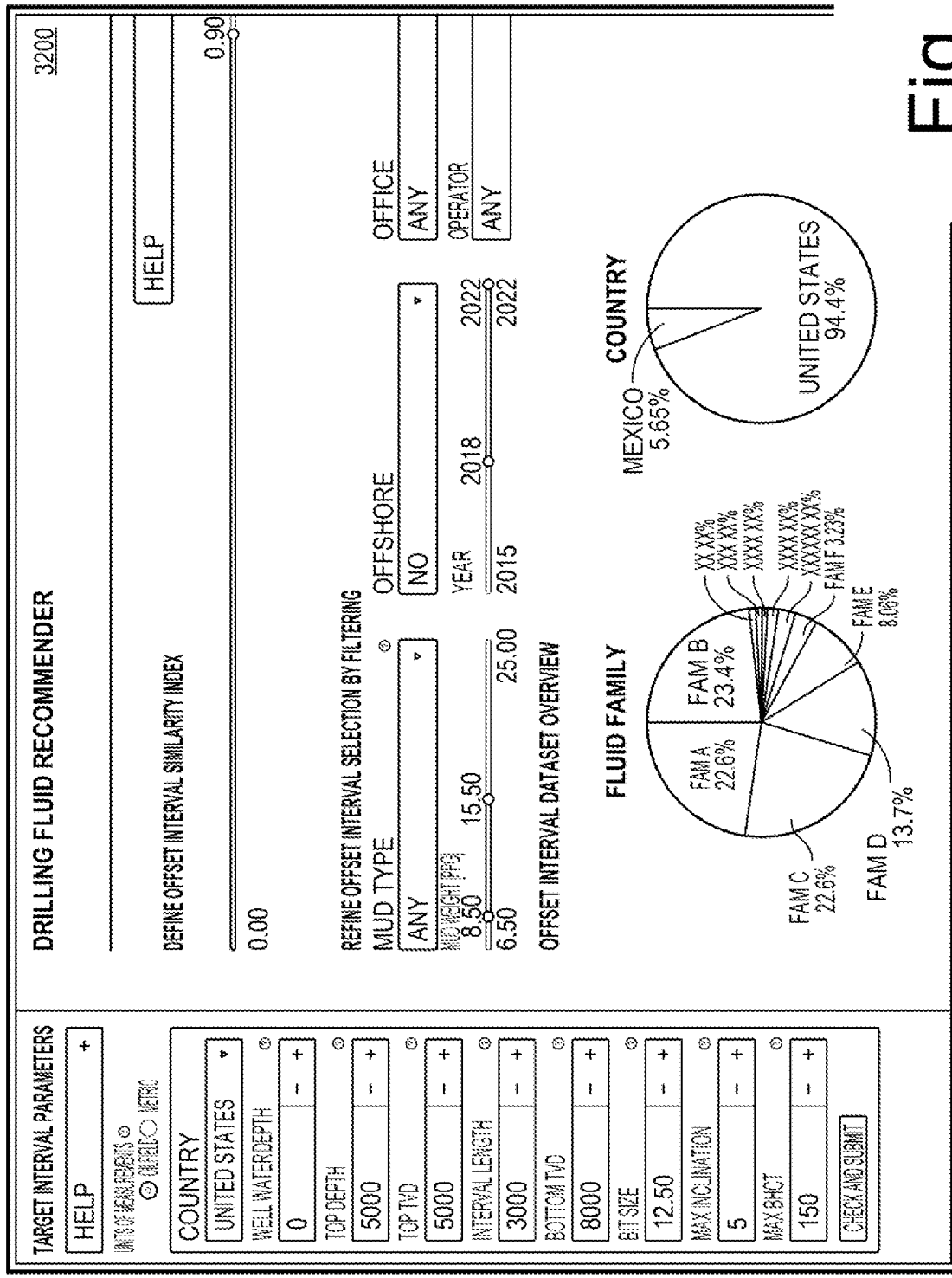
FIG. 32 illustrates an example of a graphical user interface.

FIG. 32 shows an example of a GUI 3200 for drilling fluid recommendations, which includes a slider graphic for defining an OSI value, along with filters for mud type, offshore/onshore, office, etc., which may or may not include additional slider graphics. As to results, pie charts may be utilized such that a user can quickly ascertain how fluid families, regions, etc., break out amongst the members that comport with the OSI value and the filters. In the example of FIG. 32, for a set of arbitrary target interval parameters (left-hand side bar) out of over 42,000 historical intervals in a clean database, 234 offset interval candidates are returned with the interval OSI of 0.9. As explained, additional filters (for mud density, onshore wells and just for the three last years) further reduce the number of offset intervals to 57. Distributions of these offset intervals by fluid family, country and operator can be visualized, for example, in pie charts, allowing the end-user to quickly review the offset selection dataset.

FIG. 33 shows an example of a GUI 3300 that can be for a table of data for recommended members (e.g., objects). The GUI 3300 provides a high-level view of recommendations for fluid systems with rankings of different fluids by various performance metrics. As indicated, ranking can be from 1 to 11 where ties may result in common ranking amongst two or more members.

Figure 34:
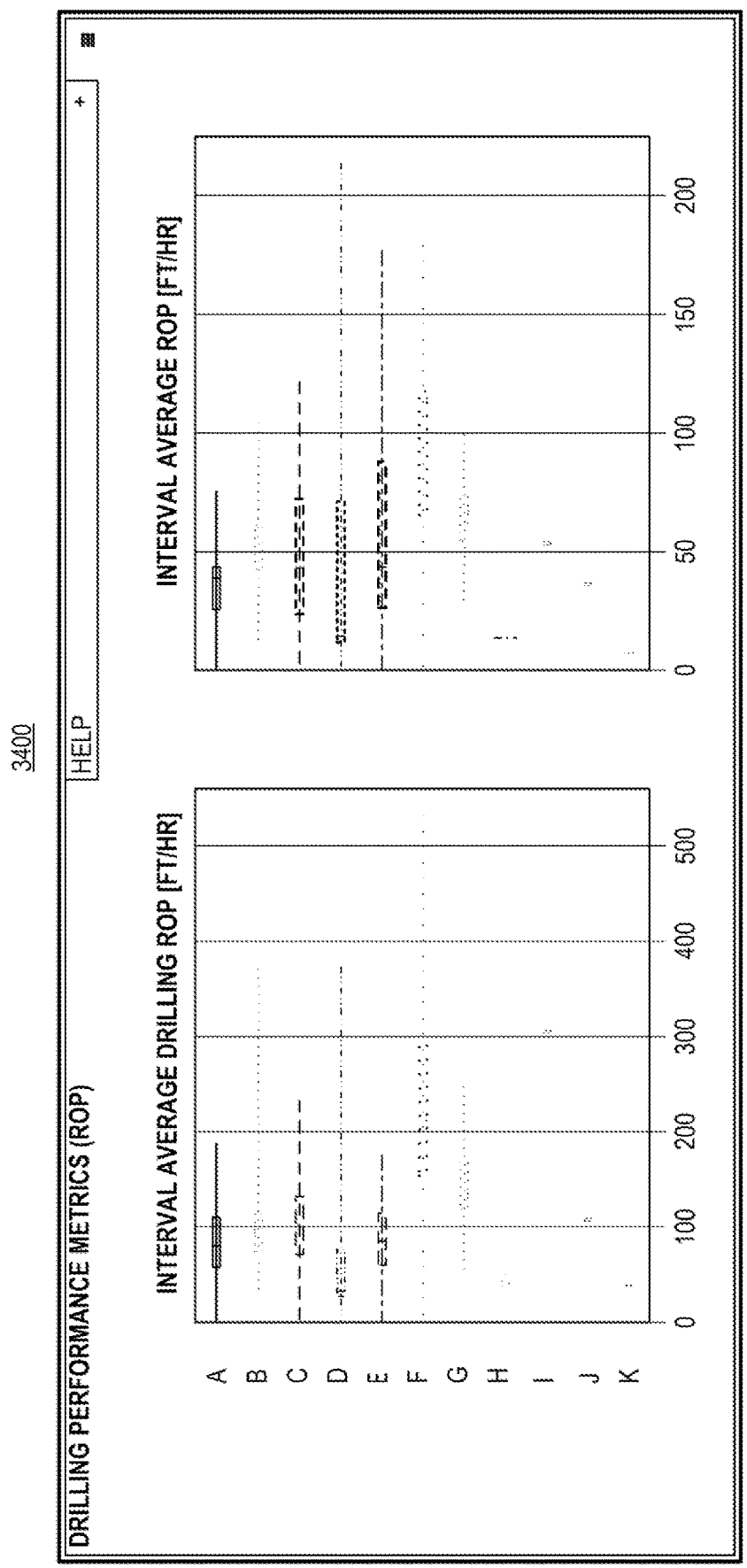
FIG. 34 illustrates an example of a graphical user interface.

FIG. 34 shows an example of a GUI 3400 that can provide drilling performance metrics such as ROP for various members (e.g., fluid system options as recommended). The GUI 3400 shows distributions of selected performance metrics, aggregated for drilling fluid systems based on offset intervals. Such data complements a high-level ranking, allowing for more vigorous analysis.

Figure 35:
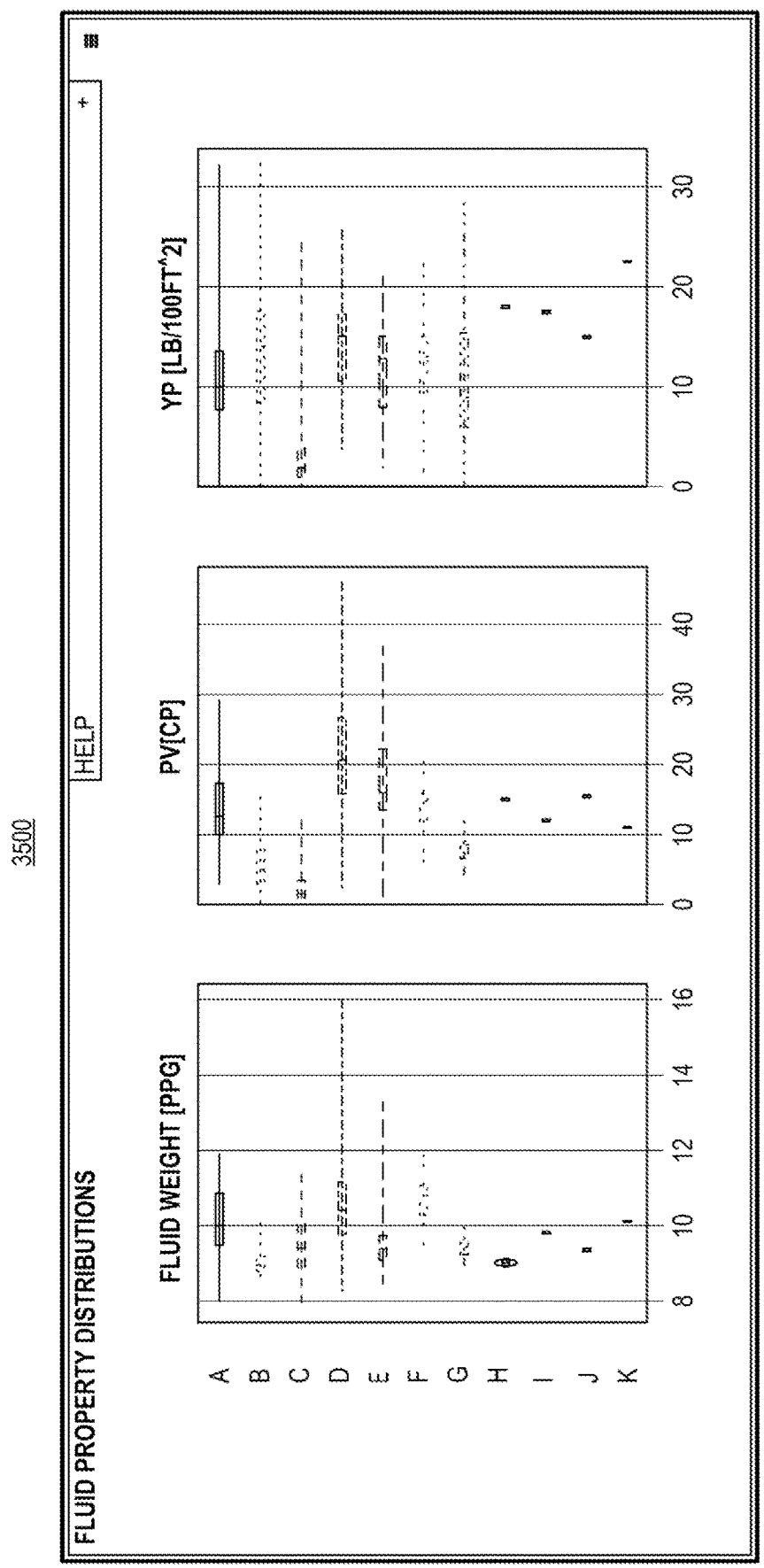
FIG. 35 illustrates an example of a graphical user interface.

FIG. 35 shows an example of a GUI 3500 that can provide fluid property distributions for the various members, which can allow a user to further assess members. As shown, fluid weight, fluid viscosity and yield point data may be provided.

As an example, a GUI may provide for rendering of a time distribution plot to visualize reported activities, which can be aggregated for individual objects and/or families of objects and normalized to a total of 100 percent. For example, consider activities such as drilling and tripping and remedial activities such as, for example, hole conditioning, stuck pipe, NPT, etc. In such an approach, a user may visual types of activities and time associated with such activities for one or more objects. As an example, where drilling is low and a remedial activity is high, a user may be dissuaded from selection of a particular object (e.g., piece of equipment, drilling fluid, etc.).

In an example, a target interval was chosen in US land, with the plan to drill a 2,500 ft interval with previous casing set at 5,500 ft, planned interval bit size set at 12.25 in and maximum BHCT equal to 145 degrees F. As to drilling fluids, classes can include water-based muds (WBM) and non-aqueous fluids (NAF) where, within the latter group, oil-based muds (OBM) and synthetic-based muds (SBM) may be distinguished. In this example, a system computed approximately 150 preselected intervals with OSI threshold at a default of 0.90. To widen the range of preliminary chosen offset intervals, OSI value was changed to 0.85, which generated about 1,000 different intervals in US land or close to it. To filter out unnecessary data, mud weight was narrowed to the range of 8.5 to 12.0 lb/galUS, considering planned pore and fracturing pressures; noting that chosen mud weight range and location of drilling can be an indirect representation of well pressures and formations, which may be utilized where actual data are unavailable. In the foregoing example, 761 final offset intervals were generated for further analysis. Statistically, these indicated that similar intervals were drilled mainly with WBM with some rare intervals drilled with NAF. A summary table indicated that WBM-6 showed the highest prevalence over other types of fluid systems with high similarity to target interval parameters. Drilling ROP using WBM-6 provided excellent performance while also resulting in medium remedial time activities, low quantity of fluid treatments, and low level of fluid complexity. Additionally, additives cost for the WBM-6 fluid system was relatively small. The closest different fluid system was NAF-1 where a comparison using the recommender system indicated that WBM-6 was superior as NAF-1 had lower drilling ROP and higher additives cost, while being somewhat similar to WBM-6 on other metrics. Hence, the WBM-6 fluid system was selected from the drilling fluid recommender (DFR) system.

As an example, a system can retrieve information for tens of thousands of wells and associated sections from up-to-date historical drilling databases where cleaning and processing may be applied to data. In such an example, a user can input information for an upcoming (target) interval of a well (e.g., an interval of a trajectory to be drilled, etc.), which may be via a GUI of a web-browser accessible application. In such an approach, the information can be processed and intervals with similar properties identified. As an example, offset intervals may be grouped (e.g., equipment type, fluid name, etc.) and reported along with various performance metrics aggregated for each feature or set of features. Offset intervals may be ranked by various criteria (prevalence, similarity, average drilling rate of penetration (ROP), fluid complexity, etc.) to assist in decision making, output of recommendations, etc.

As an example, raw offset interval data may be retrieved, for example, as a table, which in addition to well and interval properties, can also include OSI values to facilitate an in-depth analysis of offset intervals (e.g., objects, members, etc.).

As an example, a method for offset oilfield object identification can include retrieving one or more historical datasets with oilfield objects and their features; selecting relevant features (e.g., properties, etc.) for object similarity determination; receiving input of oilfield target object features; processing features in a joint historical dataset and a target object by applying at least one of the following operations, as continualization, imputation, normalization, and assignment of weighting factors; calculating an object (dis)similarity metric for objects in the joint dataset; and applying the (dis)similarity metric filtering the historical dataset and selecting offset oilfield objects according to a (dis)similarity threshold value as recommended offset oilfield objects. In such an example, an OSI-based approach can provide for predicting offset oilfield objects as recommendations with respect to a target oilfield object.

As an example, an oilfield object may be a well, a section, an interval, a drilling run or other drilling, well completion or production operation. As an example, a similarity metric can be computed using a multidimensional distance between a target object and historical oilfield objects in a feature space. As an example, a multidimensional distance between a target object and historical oilfield objects can be computed using one or more of Euclidean, Manhattan, Minkowski, Chebyshev, Hamming, cosine, Jaccard, and haversine techniques, amongst others.

As an example, a similarity metric may be normalized by a maximum multidimensional distance or dissimilarity between oilfield objects in a historical database, or its estimated value.

As explained, a system can be an oilfield technology recommender system that can be based on offset oilfield object identification. In such an approach, recommendations can be provided for one or more pieces of equipment and/or one or more drilling fluids (e.g., fluid systems). For example, consider recommendations as to drilling fluids, bits, bottom-hole assemblies, power sections/motors, rotary steerable tools, etc.

Figure 36:
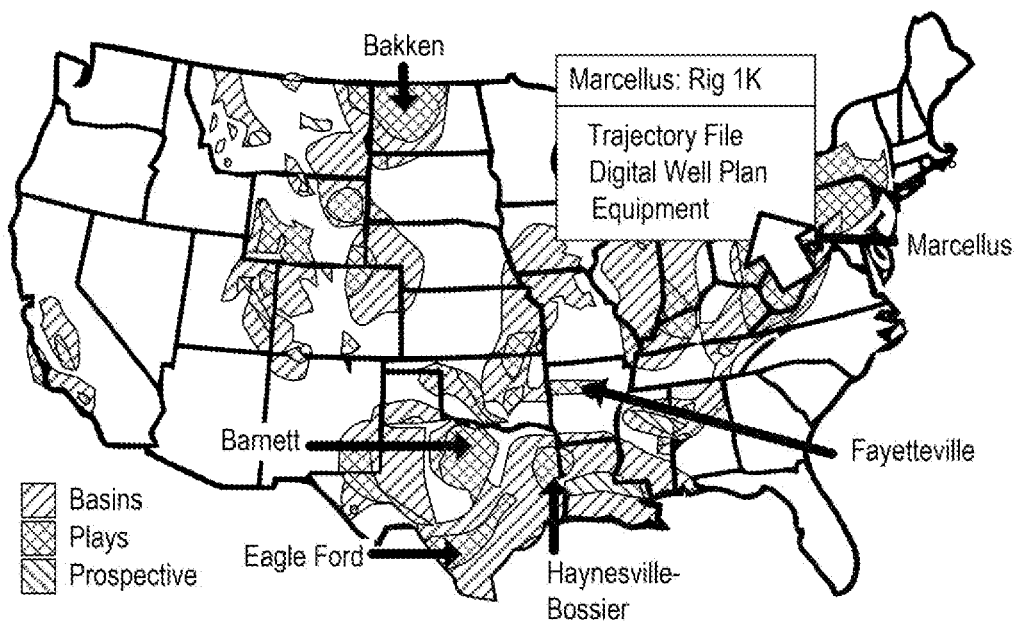
FIG. 36 illustrates an example of a graphical user interface.

FIG. 36 shows an example of a GUI 3600 that include various types of regions, formations, basins, etc. As an example, an EF may be tailored to a particular region, which may provide for access to local regulations, local weather, etc. For example, consider selecting a rigsite in the Marcellus region where the GUI 3600 can provide for selection of related information, frameworks, etc. In such an example, one or more comparisons may be made with respect to one or more other sites, etc. As shown, a digital well plan may be accessed and equipment may be accessed, selected, etc. using one or more equipment frameworks (EFs). As explained, these may be linked and/or generated in combination via a framework environment such as that shown in FIG. 1.

As an example, a system may include a computational framework that can utilize a Representational State Transfer (REST) API, which is of a style that defines a set of constraints to be used for creating web services. Web services that conform to the REST architectural style, termed RESTful web services, provide interoperability between computer systems on the Internet. RESTful web services can allow one or more requesting systems to access and manipulate textual representations of web resources by using a uniform and predefined set of stateless operations. One or more other kinds of web services may be utilized (e.g., such as SOAP web services) that may expose their own sets of operations.

As an example, a computational controller operatively coupled to equipment at a rigsite (e.g., a wellsite, etc.) can utilize one or more APIs to interact with a computational framework that includes an agent or agents. In such an example, one or more calls may be made where, in response, one or more actions are provided (e.g., control actions for drilling). In such an example, a call may be made with various types of data (e.g., observables, etc.) and a response can depend at least in part on such data. For example, observables may be transmitted and utilized by an agent to infer a state where an action is generated based at least in part on the inferred state and where the action can be transmitted and utilized by a controller to control activities at a rigsite.

Figure 37:
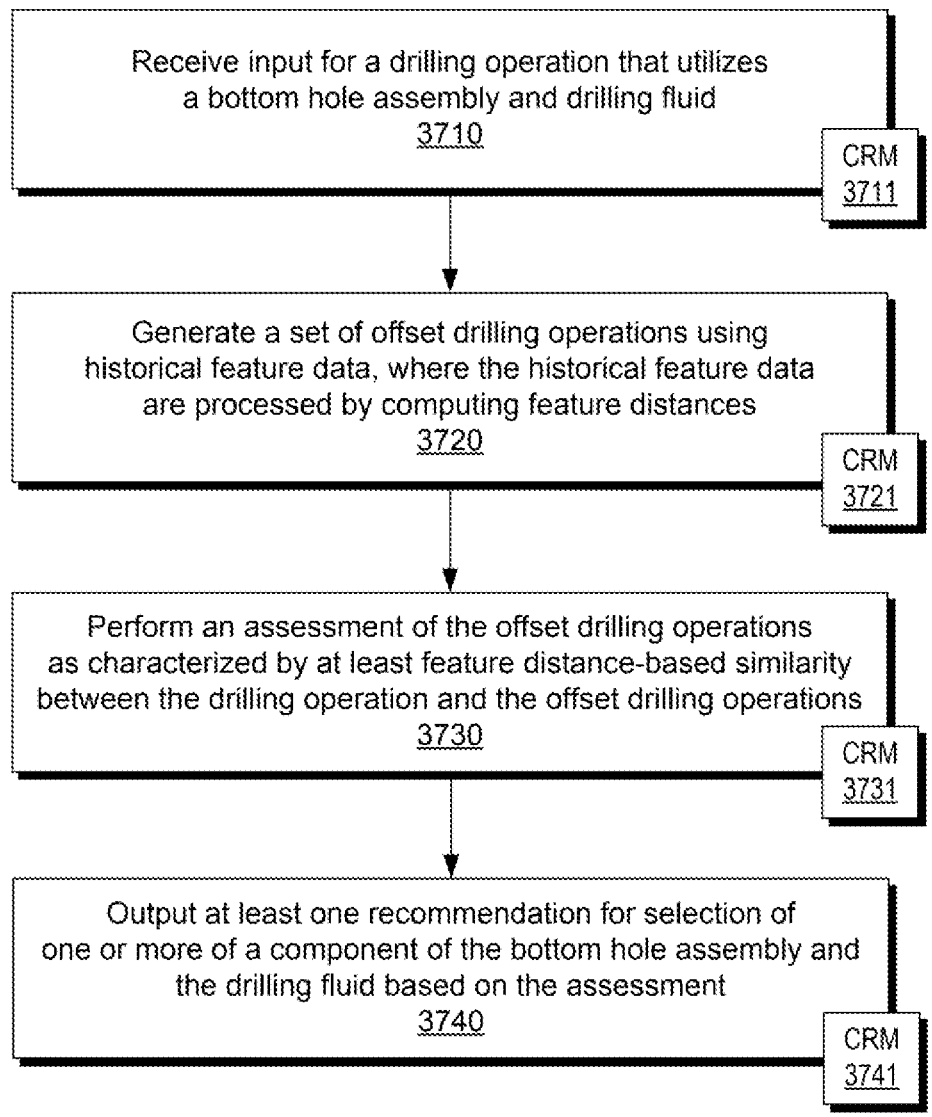
FIG. 37 illustrates an example of a method and an example of a system.
Figure 37:
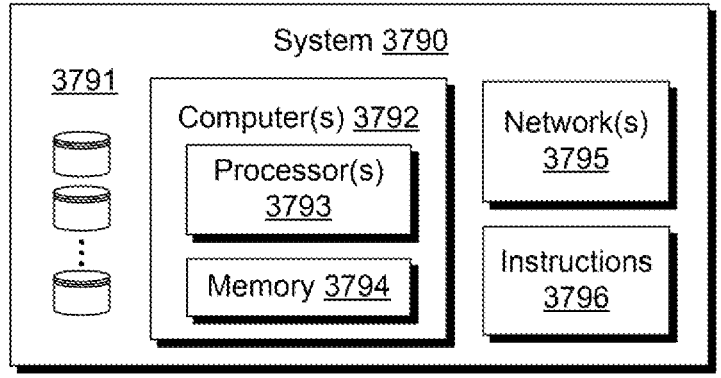

FIG. 37 shows an example of a method 3700 and an example of a system 3790. As shown, the method 3700 can include a reception block 3710 for receiving input for a drilling operation that utilizes a bottom hole assembly and drilling fluid; a generation block 3720 for generating a set of offset drilling operations using historical feature data, where the historical feature data are processed by computing feature distances; a performance block 3730 for performing an assessment of the offset drilling operations as characterized by at least feature distance-based similarity between the drilling operation and the offset drilling operations; and an output block 3740 for outputting at least one recommendation for selection of one or more of a component of the bottom hole assembly and the drilling fluid based on the assessment.

The method 3700 is shown as including various computer-readable storage medium (CRM) blocks 3711, 3721, 3731 and 3741 that can include processor-executable instructions that can instruct a computing system, which can be a control system, to perform one or more of the actions described with respect to the method 3700.

In the example of FIG. 37, the system 3790 includes one or more information storage devices 3791, one or more computers 3792, one or more networks 3795 and instructions 3796. As to the one or more computers 3792, each computer may include one or more processors (e.g., or processing cores) 3793 and memory 3794 for storing the instructions 3796, for example, executable by at least one of the one or more processors 3793 (see, e.g., the blocks 3711, 3721, 3731 and 3741). As an example, a computer may include one or more network interfaces (e.g., wired or wireless), one or more graphics cards, a display interface (e.g., wired or wireless), etc.

As an example, the method 3700 may be a workflow that can be implemented using one or more frameworks that may be within a framework environment. As an example, the system 3790 can include local and/or remote resources. For example, consider a browser application executing on a client device as being a local resource with respect to a user of the browser application and a cloud-based computing device as being a remote resources with respect to the user. In such an example, the user may interact with the client device via the browser application where information is transmitted to the cloud-based computing device (or devices) and where information may be received in response and rendered to a display operatively coupled to the client device (e.g., via services, APIs, etc.).

As an example, an equipment framework (EF) may provide for making recommendations for one or more pieces of a drillstring and/or one or more fluid systems where, for example, the drillstring is to be utilized for a drilling run. Various equipment types can be considered (e.g., bit design, motor power section configuration, RSS type and model, BHA type, MWD/LWD tools to utilize, fluid system type, etc.). As explained, some equipment choices may impact other equipment choices. For example, a particular RSS may demand a compatible bit, an oil-based mud may demand particular elastomer properties of a motor power section, etc.

As an example, a system may include backend and frontend subsystems. For example, consider a backend (e.g., framework engine) that can clean data, support direct queries, provide ML model training, ML model lifecycle and updating pipeline, etc. As an example, a frontend can be a web app such that the frontend can be mobile, remote, etc. (e.g., using a PYTHON streamlit library, PYTHON/Docker, GCP hosting, AZURE hosting, CI/CD pipeline, a code repository access for team sharing and collaboration, etc.).

Figure 38:
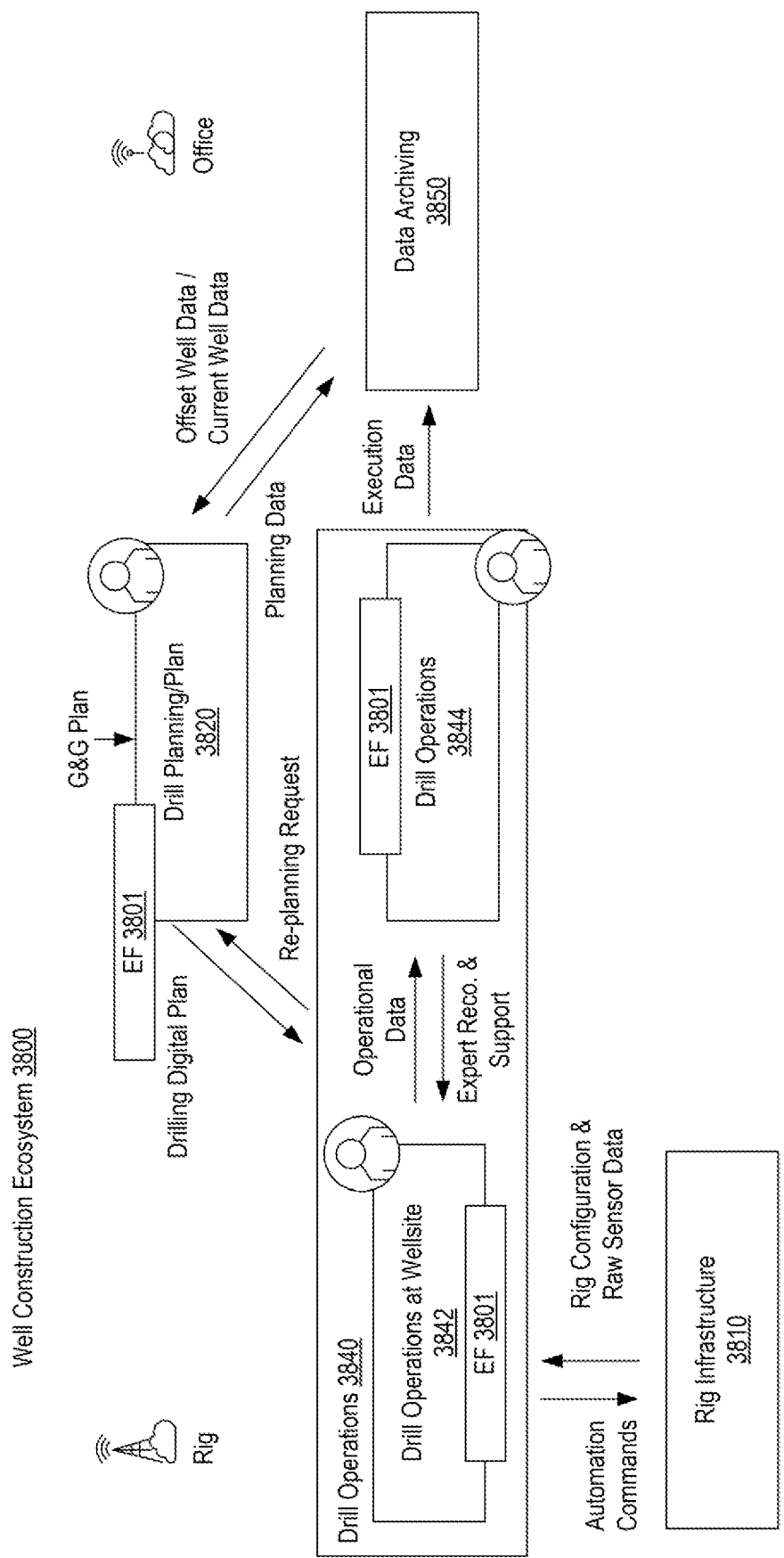
FIG. 38 illustrates an example of a system.

FIG. 38 shows an example of a system 3800 that can be a well construction ecosystem. As shown, the system 3800 can include one or more instances of an EF 3801 and can include a rig infrastructure 3810 and a drill plan component

3820 that can generation or otherwise transmit information associated with a plan to be executed utilizing the rig infrastructure 3810, for example, via a drilling operations layer 3840, which includes a wellsite component 3842 and an offsite component 3844. As shown, data acquired and/or generated by the drilling operations layer 3840 can be transmitted to a data archiving component 3850, which may be utilized, for example, for purposes of planning one or more operations (e.g., per the drilling plan component 3820).

In the example of FIG. 38, the EF 3801 is shown as being implemented with respect to the drill plan component 3820, the wellsite component 3842 and/or the offsite component 3844.

As an example, the EF 3801 can interact with one or more of the components in the system 3800. As shown, the EF 3801 can be utilized in conjunction with the drill plan component 3820. In such an example, data accessed from the data archiving component 3850 may be utilized to assess output of the EF 3801 or, for example, may be utilized as input to the EF 3801. As an example, the data archiving component 3850 can include drilling data for one or more offset wells and/or one or more current wells pertaining to specifications for and/or operations of one or more types of bits, etc.

As shown in FIG. 38, various components of the drilling operations layer 3840 may utilize the EF 3801 and/or a drilling digital plan as output by the drill plan component 3820. During drilling, execution data can be acquired, which may be utilized by the EF 3801. Such execution data can be archived in the data archiving component 3850, which may be archived during one or more drill operations and may be available by the drill plan component 3820, for example, for re-planning, etc.

As an example, a method may be implemented in part using computer-readable media (CRM), for example, as a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

A method can include receiving input for a drilling run; generating equipment feature results based on the input; generating output based at least in part on the equipment feature results; and generating one or more equipment recommendations for equipment that include equipment features of the equipment feature results. In such an example, generating equipment features results can include implementing a trained machine learning model. For example, consider implementing a classifier model, a clustering model, and/or another type of model.

As an example, a method can include training a machine learning model to generate a trained machine learning model. In such an example, training can include supervised and/or unsupervised learning.

As an example, generating output based at least in part on equipment feature results can include implementing a search engine. In such an example, a method can include generating a graphical user interface that includes graphical controls for interacting with the search engine.

As an example, generating output based at least in part on equipment feature results can include implementing feedback-based rating.

As an example, generating equipment feature results based on input can include implementing a plurality of trained machine learning models for generating predictions. Such an approach may include ranking the plurality of trained machine learning models based at least in part on the predictions.

As an example, equipment feature results can include at least one result for each of a plurality of equipment features. In such an example, each of the results for a corresponding one of the plurality of equipment features may be generated using a corresponding trained machine learning model. A method may implement, for example, an ensemble of machine learning models.

As an example, generating output based at least in part on equipment feature results can include generating graphics that represent probabilities for the equipment features results. In such an example, the graphics can include graphics that represent probabilities for predicted values and type of trained machine learning model utilized to generate each of the predicted values.

As an example, generating output based at least in part on equipment feature results can include generating a map with graphics that represent drilling runs that are similar to a drilling run based on one or more similarity measures.

As an example, equipment recommendations can include drillstring equipment recommendations.

As an example, a system can include a processor; memory accessible to the processor; processor-executable instructions stored in the memory and executable by the processor to instruct the system to: receive input for a drilling run; generate equipment feature results based on the input; generate output based at least in part on the equipment feature results; and generate one or more equipment recommendations for equipment that include equipment features of the equipment feature results.

As an example, one or more computer-readable storage media including computer-executable instructions executable to instruct a computing system to: receive input for a drilling run; generate equipment feature results based on the input; generate output based at least in part on the equipment feature results; and generate one or more equipment recommendations for equipment that include equipment features of the equipment feature results.

As an example, a method can include receiving input for a drilling operation that utilizes a bottom hole assembly and drilling fluid; generating a set of offset drilling operations using historical feature data, where the historical feature data are processed by computing feature distances; performing an assessment of the offset drilling operations as characterized by at least feature distance-based similarity between the drilling operation and the offset drilling operations; and outputting at least one recommendation for selection of one or more of a component of the bottom hole assembly and the drilling fluid based on the assessment. In such an example, generating the set can include computing similarity metrics in a multidimensional feature space. For example, consider computing pair-wise similarity metrics, cluster-wise similarity metrics, etc.

As an example, a method can include generating a set by performing clustering that generates clusters. In such an example, the method can include performing classifying using the clusters and using information associated with a drilling operation. For example, consider a system such as the system 1100 of FIG. 11 where a set can be output by a classifier. As explained with respect to the system 1100, generating a set can include utilizing a machine learning model trained using unsupervised learning and utilizing a machine learning model trained using supervised learning. In such an example, the first machine learning model can be a clustering model (e.g., k-means, etc.) while the second machine learning model can be a classification model, which may be utilized to make predictions as to particular candidates of one or more clusters using one or more features of a target drilling operation (e.g., a drilling operation underway, to be planned, to be performed, etc.). Where a drilling operation is underway, a method can include issuing one or more control instructions to control equipment at a site (e.g., to control drilling equipment, etc.).

As mentioned, FIG. 11 also shows an example of a multidimensional space 1190 and a plot 1192 where pairwise distance metrics may be computed as part of a similarity-based approach to generation of a set. For example, a similarity index may be utilized where a target drilling operation can be compared to offset drilling operations, for example, using a similarity index threshold to generate a set that is a portion of the offset drilling operations that are more similar to the target drilling operation. As explained, such a set may be assessed in one or more manners to arrive at a recommendation or recommendations. As explained, weights may be utilized to alter similarity metrics, for example, by applying a weight or weights to one or more feature space dimensions. As an example, a weight may be a constant or may be dependent on value along a feature space dimension (e.g., consider a weight as a discrete or a continuous function of value along a feature space dimension).

As an example, a method can include performing an assessment via filtering using one or more filter criteria. In such an example, filtering can include at least content based filtering. As an example, filtering may include collaborative filtering. As an example, one or more types of filtering may be utilized to generate a recommendation or recommendations.

As an example, a method can include performing an assessment by receiving a similarity index threshold value that splits a set of offset drilling operations into a more similar portion and a less similar portion with respect to a drilling operation (e.g., a target drilling operation).

As an example, feature distances can include multidimensional feature distances that correspond to pairs of individual offset drilling operations in historical feature data.

As an example, performing an assessment can include receiving input responsive to interaction with a graphical user interface rendered to a display. In such an example, the input can include one or more scoring weight values.

As an example, performing an assessment can include ranking at least a portion of offset drilling operations, which may be represented as objects (e.g., one or more features, etc.).

As an example, a method can include receiving at least one rating as feedback to at least one recommendation and training a machine learning model based at least in part on the at least one rating. In such an example, the machine learning model can be improved. For example, consider the system 1100 of FIG. 11 where feedback as to a list of multiple bits as recommended bits can be utilized to improve one or more of the models of the system 1100 (e.g., consider improving classification where a low feedback can indicate a classification issue and where a high feedback can confirm proper classification).

As an example, at least one recommendation can include feature results that include at least one feature result for each of a plurality of features. In such an example, each of the feature results for a corresponding one of the plurality of features may be generated using a corresponding trained machine learning model. In such an example, a method can include generating graphics that represent probabilities for the features results, where the graphics represent probabilities for predicted features and type of trained machine learning model utilized to generate each of the predicted features. As an example, an ensemble approach may be utilized where multiple machine learning models are involved and where each may be appropriate for a particular feature. As mentioned, some features may be continuous and some features may be discrete. Where a mixture of continuous and discrete features exists, one or more machine learning models may be tailored to handling such a mixture of features. As explained, in various examples, continualization and/or one or more other techniques may be applied to make a non-continuous feature more continuous, which may be appropriate for computing feature distances in a feature space.

As an example, a method can include generating a map with graphics that represent offset drilling operations that are similar to a drilling operation based on one or more feature distance-based similarity metrics.

As an example, at least one recommendation can be a recommended component of a bottom hole assembly and a recommended drilling fluid for a drilling operation. As an example, a system may account for equipment concerns and drilling fluid concerns. As explained, drilling fluid can flow through openings of a bit during drilling to help lubricate the bit and to carry broken rock away from the bit. As another example, consider a mud motor that can be driven by flow of drilling fluid (mud) to rotate a bit.

As an example, a system can include a processor; memory accessible to the processor; processor-executable instructions stored in the memory and executable by the processor to instruct the system to: receive input for a drilling operation that utilizes a bottom hole assembly and drilling fluid; generate a set of offset drilling operations using historical feature data, where the historical feature data are processed by computing feature distances; perform an assessment of the offset drilling operations as characterized by at least feature distance-based similarity between the drilling operation and the offset drilling operations; and output at least one recommendation for selection of one or more of a component of the bottom hole assembly and the drilling fluid based on the assessment.

As an example, one or more computer-readable storage media can include computer-executable instructions executable to instruct a computing system to: receive input for a drilling operation that utilizes a bottom hole assembly and drilling fluid; generate a set of offset drilling operations using historical feature data, where the historical feature data are processed by computing feature distances; perform an assessment of the offset drilling operations as characterized by at least feature distance-based similarity between the drilling operation and the offset drilling operations; and output at least one recommendation for selection of one or more of a component of the bottom hole assembly and the drilling fluid based on the assessment.

As an example, a computer program product can include executable instructions that can be executed to cause a system to operate according to one or more methods. For example, consider a computer program product that can include instructions executable to instruct a computing system to: receive input for a drilling run; generate equipment feature results based on the input; generate output based at least in part on the equipment feature results; and generate one or more equipment recommendations for equipment that include equipment features of the equipment feature results.

Figure 39:
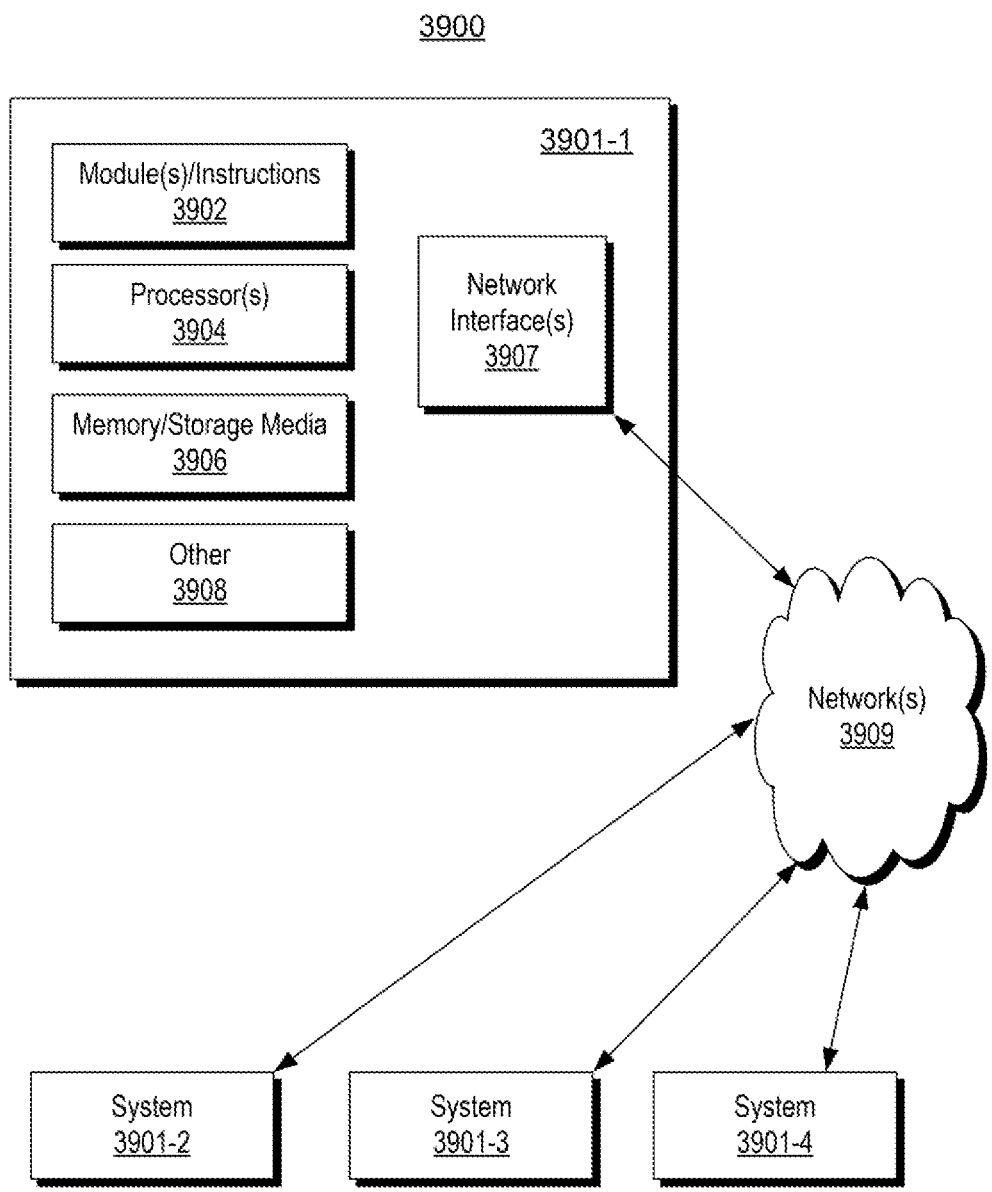
FIG. 39 illustrates an example of a computing system.

In some embodiments, a method or methods may be executed by a computing system. FIG. 39 shows an example of a system 3900 that can include one or more computing systems 3901-1, 3901-2, 3901-3 and 3901-4, which may be operatively coupled via one or more networks 3909, which may include wired and/or wireless networks.

As an example, a system can include an individual computer system or an arrangement of distributed computer systems. In the example of FIG. 39, the computer system 3901-1 can include one or more modules 3902, which may be or include processor-executable instructions, for example, executable to perform various tasks (e.g., receiving information, requesting information, processing information, simulation, outputting information, etc.).

As an example, a module may be executed independently, or in coordination with, one or more processors 3904, which is (or are) operatively coupled to one or more storage media 3906 (e.g., via wire, wirelessly, etc.). As an example, one or more of the one or more processors 3904 can be operatively coupled to at least one of one or more network interface 3907. In such an example, the computer system 3901-1 can transmit and/or receive information, for example, via the one or more networks 3909 (e.g., consider one or more of the Internet, a private network, a cellular network, a satellite network, etc.).

As an example, the computer system 3901-1 may receive from and/or transmit information to one or more other devices 3908, which may be or include, for example, one or more of the computer systems 3901-2, etc. A device may be located in a physical location that differs from that of the computer system 3901-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 3906 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 40:
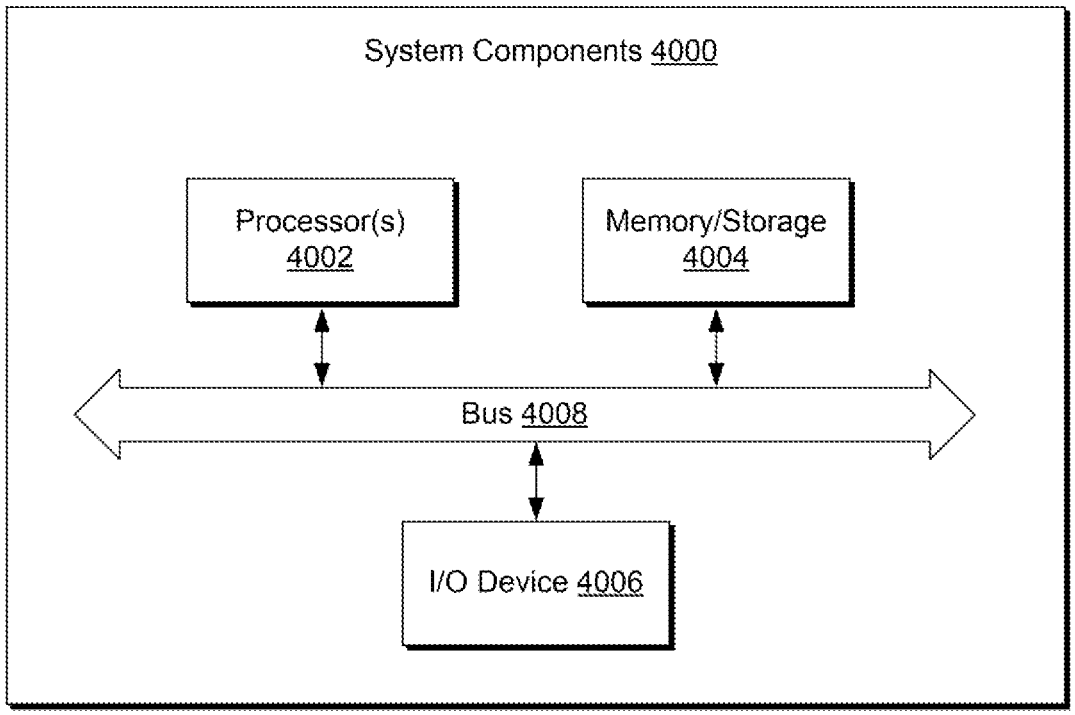
FIG. 40 illustrates example components of a system and a networked system.
Figure 40:
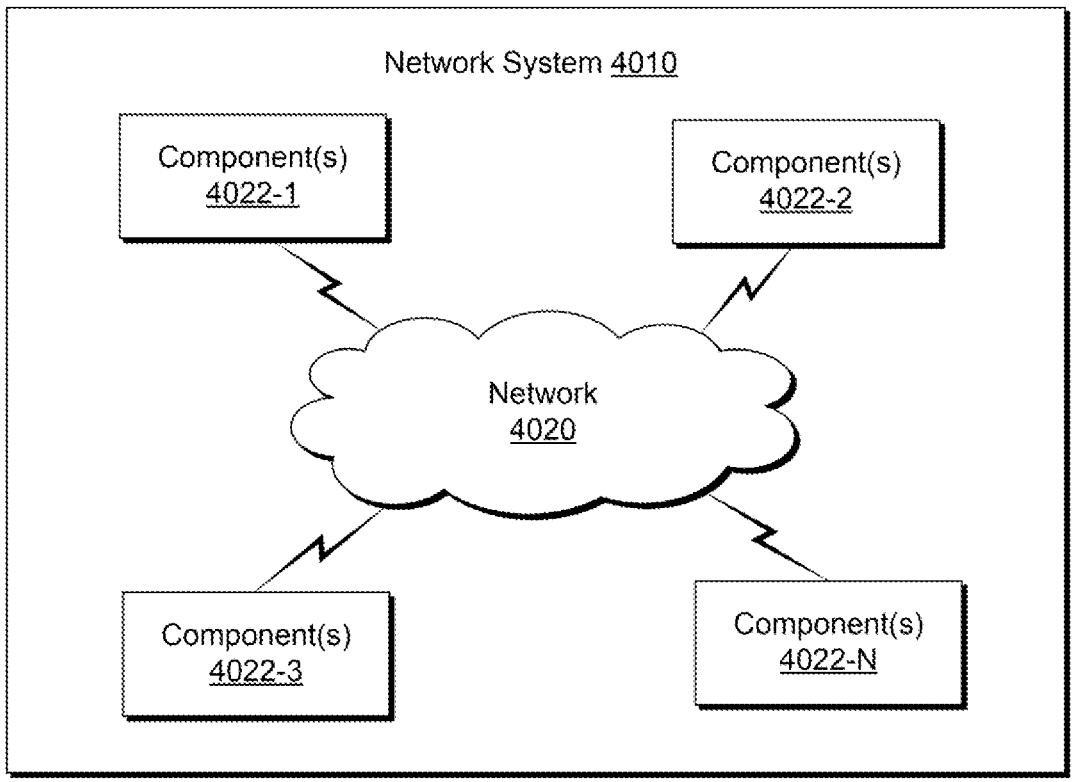

FIG. 40 shows components of a computing system 4000 and a networked system 4010 with a network 4020. The system 4000 includes one or more processors 4002, memory and/or storage components 4004, one or more input and/or output devices 4006 and a bus 4008. According to an embodiment, instructions may be stored in one or more computer-readable media (e.g., memory/storage components 4004). Such instructions may be read by one or more processors (e.g., the processor(s) 4002) via a communication bus (e.g., the bus 4008), which may be wired or wireless. The one or more processors may execute such instructions to implement (wholly or in part) one or more attributes (e.g., as part of a method). A user may view output from and interact with a process via an I/O device (e.g., the device 4006). According to an embodiment, a computer-readable medium may be a storage component such as a physical memory storage device, for example, a chip, a chip on a package, a memory card, etc.

According to an embodiment, components may be distributed, such as in the network system 4010. The network system 4010 includes components 4022-1, 4022-2, 4022-3, . . . 4022-N. For example, the components 4022-1 may include the processor(s) 4002 while the component(s) 4022-3 may include memory accessible by the processor(s) 4002. Further, the component(s) 4022-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
    receiving input for a drilling operation that utilizes a bottom hole assembly and drilling fluid;
    generating a set of offset drilling operations using historical feature data and predicted feature data from one or more machine learning models based on at least a portion of the input, wherein the historical feature data is processed by computing feature distances;
    performing an assessment of the set of offset drilling operations as characterized by feature distance-based similarity between the drilling operation and the set of offset drilling operations, wherein the feature distance-based similarity is determined by:
        receiving a first selection of one or more pair-wise distance metrics of a set of data points within a multidimensional space plot via a graphical user interface (GUI), wherein each of the one or more pair-wise distance metrics corresponds to the drilling operation and one of the set of offset drilling operations;
        receiving one or more weights associated with the one or more pair-wise distance metrics via the GUI;
        generating one or more weighted pair-wise distance metrics based on the one or more pair-wise distance metrics and the one or more weights;
        determining a similarity index for each of the one or more weights associated with the one or more pair-wise distance metrics; and
        generating, based on the similarity index, at least one recommendation of an adjustment to a trajectory of the drilling operation by the bottom hole assembly and a flow of the drilling fluid;
    outputting the at least one recommendation for selection via the GUI;
    receiving at least one rating as feedback, via the GUI, to the at least one recommendation and training at least one of the one or more machine learning models based at least in part on the at least one rating;
    receiving the selection of the at least one recommendation via the GUI; and
    sending one or more commands to the bottom hole assembly in response to receiving the selection, wherein the one or more commands are configured to cause the bottom hole assembly to adjust the trajectory of the drilling operation or the flow of the drilling fluid according to the selection.

2. The method of claim 1, wherein the feature distances correspond to one or more pairs of individual offset drilling operations within the historical feature data.

3. The method of claim 1, wherein generating the set comprises performing clustering that generates clusters.

4. The method of claim 3, wherein generating the set of offset drilling operations comprises performing classifying using the clusters and using information associated with the drilling operation.

5. The method of claim 1, wherein generating the set of offset drilling operations comprises utilizing multiple machine learning models that comprise at least a machine learning model trained using unsupervised learning and a machine learning model trained using supervised learning.

6. The method of claim 1, wherein performing the assessment comprises filtering using one or more filter criteria.

7. The method of claim 6, wherein the one or more filter criteria comprise at least content based filtering.

8. The method of claim 1, wherein performing the assessment comprises receiving a similarity index threshold value that splits the set of offset drilling operations into a more similar portion and a less similar portion with respect to the drilling operation.

9. The method of claim 1, wherein the feature distances comprise multidimensional feature distances that correspond to pairs of individual offset drilling operations in the historical feature data.

10. The method of claim 1, wherein performing the assessment comprises receiving additional input responsive to interaction with the graphical user interface rendered to a display.

11. The method of claim 10, wherein the additional input comprises one or more scoring weight values.

12. The method of claim 1, wherein performing the assessment comprises ranking at least a portion of the set of offset drilling operations.

13. The method of claim 1, wherein the at least one recommendation comprises feature results that comprise at least one feature result for each of a plurality of features.

14. The method of claim 13, wherein each of the feature results for a corresponding one of the plurality of features is generated using a corresponding trained machine learning model.

15. The method of claim 13, comprising generating graphics that represent probabilities for the features results, wherein the graphics represent probabilities for predicted features and a type of trained machine learning model utilized to generate each of the predicted features.

16. The method of claim 1, comprising generating a map with graphics that represent the set of offset drilling operations based on one or more feature distance-based similarity metrics.

17. The method of claim 1, wherein the at least one recommendation comprises a recommended component of the bottom hole assembly and a recommended drilling fluid for the drilling operation.

18. A system comprising:
a processor;
memory accessible to the processor;
processor-executable instructions stored in the memory and executable by the processor to instruct the system to:
receive input for a drilling operation that utilizes a bottom hole assembly and drilling fluid;
generate a set of offset drilling operations using historical feature data and predicted feature data from one or more machine learning models based on at least a portion of the input, wherein the historical feature data is processed by computing feature distances;
perform an assessment of the set of offset drilling operations as characterized by feature distance-based similarity between the drilling operation and the set of offset drilling operations, wherein the feature distance-based similarity is determined by:
receiving a first selection of one or more pair-wise distance metrics of a set of data points within a multidimensional space plot via a graphical user interface (GUI), wherein each of the one or more pair-wise distance metrics corresponds to the drilling operation and one of the set of offset drilling operations;
receiving one or more weights associated with the one or more pair-wise distance metrics via the GUI;
generating one or more weighted pair-wise distance metrics based on the one or more pair-wise distance metrics and the one or more weights;
determining a similarity index for each of the one or more weights associated with the one or more pair-wise distance metrics; and
generating, based on the similarity index, at least one recommendation of an adjustment to a trajectory of the drilling operation by the bottom hole assembly and a flow of the drilling fluid;
output the at least one recommendation for selection via the GUI;
receive at least one rating as feedback, via the GUI, to the at least one recommendation and training at least one of the one or more machine learning models based at least in part on the at least one rating;
receive the selection of the at least one recommendation via the GUI; and
send one or more commands to the bottom hole assembly in response to receiving the selection, wherein the one or more commands are configured to cause the bottom hole assembly to adjust the trajectory of the drilling operation or the flow of the drilling fluid according to the selection.

19. One or more non-transitory computer-readable storage media comprising computer-executable instructions executable to instruct a computing system to:
receive input for a drilling operation that utilizes a bottom hole assembly and drilling fluid;
generate a set of offset drilling operations using historical feature data and predicted feature data from one or more machine learning models based on at least a portion of the input, wherein the historical feature data is processed by computing feature distances;
perform an assessment of the offset drilling operations as characterized by at least feature distance-based similarity between the drilling operation and the offset drilling operations, wherein the feature distance-based similarity is determined by:
receiving a first selection of one or more pair-wise distance metrics of a set of data points within a multidimensional space plot via a graphical user interface (GUI), wherein each of the one or more pair-wise distance metrics corresponds to the drilling operation and one of the set of offset drilling operations;
receiving one or more weights associated with the one or more pair-wise distance metrics via the GUI;
generating one or more weighted pair-wise distance metrics based on the one or more pair-wise distance metrics and the one or more weights;
determining a similarity index for each of the one or more weights associated with the one or more pair-wise distance metrics; and
generating, based on the similarity index, at least one recommendation of an adjustment to a trajectory of the drilling operation by the bottom hole assembly and a flow of the drilling fluid;
output the at least one recommendation for selection via the GUI;
receive at least one rating as feedback, via the GUI, to the at least one recommendation and training at least one of the one or more machine learning models based at least in part on the at least one rating;
receive the selection of the at least one recommendation via the GUI; and
send one or more commands to the bottom hole assembly in response to receiving the selection, wherein the one or more commands are configured to cause the bottom hole assembly to adjust the trajectory of the drilling operation or the flow of the drilling fluid according to the selection.

* * * * *